(12) United States Patent
Farag

(10) Patent No.: US 12,096,408 B2
(45) Date of Patent: Sep. 17, 2024

(54) METHOD AND APPARATUS FOR LOW POWER SENSING FOR SIDELINK IN WIRELESS COMMUNICATION SYSTEMS

(71) Applicant: Samsung Electronics Co., Ltd., Suwon-si (KR)

(72) Inventor: Emad N. Farag, Flanders, NJ (US)

(73) Assignee: Samsung Electronics Co., Ltd., Suwon-si (KR)

(*) Notice: Subject to any disclaimer, the term of this patent is extended or adjusted under 35 U.S.C. 154(b) by 385 days.

(21) Appl. No.: 17/653,105

(22) Filed: Mar. 1, 2022

(65) Prior Publication Data
US 2022/0295482 A1 Sep. 15, 2022

Related U.S. Application Data

(60) Provisional application No. 63/250,560, filed on Sep. 30, 2021, provisional application No. 63/168,823, filed on Mar. 31, 2021, provisional application No. 63/158,228, filed on Mar. 8, 2021, provisional application No. 63/156,300, filed on Mar. 3, 2021.

(51) Int. Cl.
*H04W 72/0446* (2023.01)
*H04W 72/56* (2023.01)

(52) U.S. Cl.
CPC ....... *H04W 72/0446* (2013.01); *H04W 72/56* (2023.01)

(58) Field of Classification Search
CPC ............. H04W 72/0446; H04W 72/56; H04W 74/0808; H04L 5/0053; H04L 5/0094; H04L 27/0006
See application file for complete search history.

(56) References Cited

U.S. PATENT DOCUMENTS

| | | | |
|---|---|---|---|
| 2020/0296690 A1* | 9/2020 | Lee | H04W 4/40 |
| 2020/0296692 A1 | 9/2020 | Lee et al. | |
| 2022/0232626 A1* | 7/2022 | Li | H04W 76/28 |
| 2022/0312479 A1* | 9/2022 | Farag | H04W 72/02 |
| 2023/0319826 A1* | 10/2023 | Ryu | H04W 72/20 |
| | | | 370/329 |

(Continued)

OTHER PUBLICATIONS

LG Electronics, "Discussion on resource allocation for power saving", 3GPP TSG RAN WG1 Meeting #104-e e-Meeting, Jan. 25-Feb. 5, 2021, R1-2100517 Agenda item: 8.11.1.1 (Year: 2021).*

(Continued)

*Primary Examiner* — Gary Mui

(57) ABSTRACT

Apparatuses and methods for low power sensing operations for a sidelink (SL) a wireless communication system a method of operating a user equipment (UE) is provided. The method includes transmitting, on a sidelink SL interface, traffic with a periodicity; operating in a transmit (TX) resource pool with a parameter sl-MultiReserveResource set to enabled; and performing at least partial sensing including: determining a resource selection window, selecting Y slots within the resource selection window, and for each slot, sensing a set of slots. The method further includes determining candidate resources available in the resource selection window after resource exclusion based on the at least partial sensing and performing resource selection within the available candidate resources.

20 Claims, 21 Drawing Sheets

(56) References Cited

U.S. PATENT DOCUMENTS

| | | | |
|---|---|---|---|
| 2024/0031100 A1* | 1/2024 | Hao | H04L 5/0053 |
| 2024/0080805 A1* | 3/2024 | Lee | H04W 72/40 |
| 2024/0089999 A1* | 3/2024 | Ko | H04W 72/56 |
| 2024/0090009 A1* | 3/2024 | Zhao | H04W 72/541 |
| 2024/0098764 A1* | 3/2024 | Ashraf | H04W 76/14 |

OTHER PUBLICATIONS

Apple, "Sidelink Resource Allocation for Power Saving", 3GPP TSG RAN WG1 #104-e e-Meeting, Jan. 25-Feb. 5, 2021, R1-2101357 Agenda Item: 8.11.1.1 (Year: 2021).*

International Search Report and Written Opinion issued Jun. 17, 2022 regarding International Application No. PCT/KR2022/003032, 6 pages.

Samsung, "On resource allocation for power saving", 3GPP TSG RAN WG1 Meeting #104-e, R1-2101231, Jan. 2021, 7 pages.

CMCC, "Discussion on resource allocation for power saving", 3GPP TSG RAN WG1 #104-e, R1-2101060, Jan. 2021, 8 pages.

CAICT, "Considerations on partial sensing in NR V2X", 3GPP TSG RAN WG1 Meeting #104-e, R1-2100309 , Jan. 2021, 4 pages.

Fujitsu, "Considerations on Partial Sensing and DRX in NR V2X", 3GPP TSG RAN WG1 Meeting #104-e, R1-2100745, Jan. 2021, 23 pages.

"3rd Generation Partnership Project; Technical Specification Group Radio Access Network; NR; Physical channels and modulation (Release 16)", 3GPP TS 38.211 V16.8.0, Dec. 2021, 134 pages.

"3rd Generation Partnership Project; Technical Specification Group Radio Access Network; NR; Multiplexing and channel coding (Release 16)", 3GPP TS 38.212 V16.8.0, Dec. 2021, 153 pages.

"3rd Generation Partnership Project; Technical Specification Group Radio Access Network; NR; Physical layer procedures for control (Release 16)", 3GPP TS 38.213 V16.8.0, Dec. 2021, 189 pages.

"3rd Generation Partnership Project; Technical Specification Group Radio Access Network; NR; Physical layer procedures for data (Release 16)", 3GPP TS 38.214 V16.8.0, Dec. 2021, 172 pages.

"5G; NR; Medium Access Control (MAC) protocol specification (3GPP TS 38.321 version 16.7.0 Release 16)", ETSI TS 138 321 V16.7.0, Jan. 2022, 160 pages.

"5G; NR; Radio Resource Control (RRC); Protocol specification (3GPP TS 38.331 version 16.7.0 Release 16)", ETSI TS 138 331 V16.7.0, Jan. 2022, 950 pages.

"3rd Generation Partnership Project; Technical Specification Group Radio Access Network; Evolved Universal Terrestrial Radio Access (E-UTRA); Physical layer procedures (Release 16)", 3GPP TS 36.213 V16.8.0, Dec. 2021, 577 pages.

* cited by examiner

METHOD AND APPARATUS FOR LOW POWER SENSING FOR SIDELINK IN WIRELESS COMMUNICATION SYSTEMS

CROSS-REFERENCE TO RELATED APPLICATIONS AND CLAIM OF PRIORITY

The present application claims priority to:
U.S. Provisional Patent Application No. 63/156,300, filed on Mar. 3, 2021;
U.S. Provisional Patent Application No. 63/158,228, filed on Mar. 8, 2021;
U.S. Provisional Patent Application No. 63/168,823, filed on Mar. 31, 2021; and
U.S. Provisional Patent Application No. 63/250,560, filed on Sep. 30, 2021. The content of the above-identified patent document is incorporated herein by reference.

TECHNICAL FIELD

The present disclosure relates generally to wireless communication systems and, more specifically, the present disclosure relates to a low power sensing operation for a sidelink (SL) in a wireless communication system.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates to a low power sensing operation for an SL in a wireless communication system.

In one embodiment, a user equipment (UE) is provided. The UE includes a transceiver configured to transmit, on a SL interface, traffic with a periodicity and a processor operably coupled to the transceiver. The processor is configured to operate in a transmit (TX) resource pool with a parameter sl-MultiReserveResource set to enabled and perform at least partial sensing including to: determine a resource selection window, select Y slots $\{t'^{SL}_y\}$ within the resource selection window, wherein y=0 . . . Y−1, and for each slot $t'^{SL}_y$, sense a set of slots, $\{t'^{SL}_{y-K_j \times T'_i}\}$. $T'_1$ is a periodicity of sensing from a set of sensing periodicities $\{T'_1, T'_2, \ldots, T'_I\}$, I is a number of sensing periodicities and I≥1, and $K_i$ is a set of periodic sensing occasions that are sensed $\{k_{i,0}, k_{i,1}, \ldots\}$ and is associated with a sensing periodicity $T'_i$. The processor is further configured to determine candidate resources available in the resource selection window after resource exclusion based on the at least partial sensing and perform resource selection within the available candidate resources.

In another embodiment, a method of operating a UE is provided. The method includes transmitting, on a SL interface, traffic with a periodicity; operating in a TX resource pool with a parameter sl-MultiReserveResource set to enabled; and performing at least partial sensing including: determining a resource selection window, selecting Y slots $\{t'^{SL}_y\}$ within the resource selection window, wherein y=0 . . . Y−1, and for each slot $t'^{SL}_y$, sensing a set of slots, $\{t'^{SL}_{y-K_j \times T'_i}\}$. $T'_i$ is a periodicity of sensing from a set of sensing periodicities $\{T'_1, T'_2, \ldots, T'_I\}$. I is a number of sending periodicities and I≥1. $K_i$ is a set of periodic sensing occasions that are sensed $\{k_{i,0}, k_{i,1}, \ldots\}$ and is associated with a sensing periodicity $T'_1$. The method further includes determining candidate resources available in the resource selection window after resource exclusion based on the at least partial sensing and performing resource selection within the available candidate resources.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 16, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.211 v16.8.0, "NR; Physical channels and modulation"; 3GPP TS 38.212 v16.8.0, "NR; Multiplexing and Channel coding"; 3GPP TS 38.213 v16.8.0, "NR; Physical Layer Procedures for Control"; 3GPP TS 38.214 v16.8.0, "NR; Physical Layer Procedures for Data"; 3GPP TS 38.321 v16.7.0, "NR; Medium Access Control (MAC) protocol specification"; and 3GPP TS 38.331 v16.7.0, "NR; Radio Resource Control (RRC) Protocol Specification;" and 3GPP TS 36.213 v16.8.0, "Evolved Universal Terrestrial Radio Access (E-UTRA); Physical layer procedures."

Figure 1:
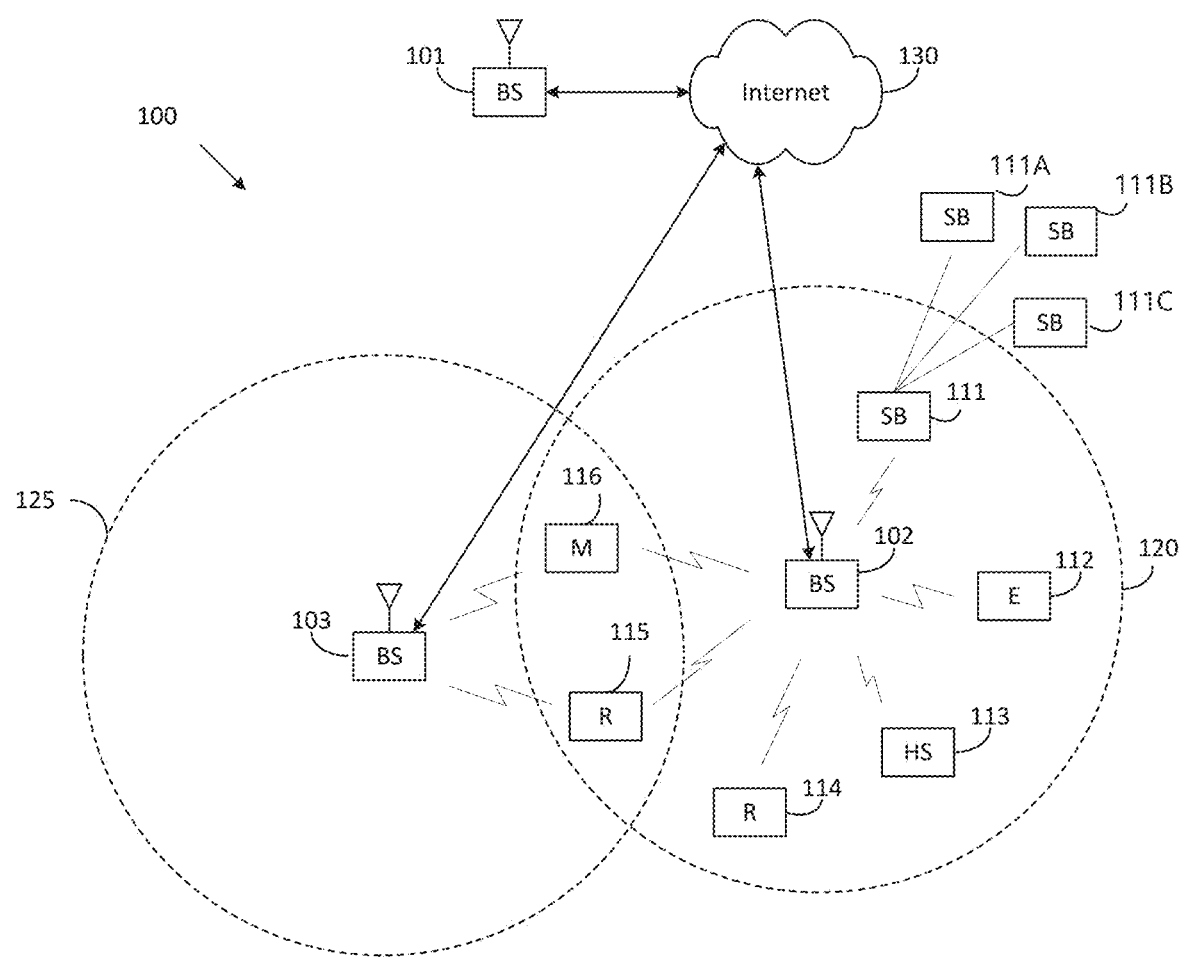
FIG. 1 illustrates an example of wireless network according to embodiments of the present disclosure.
Figure 2:
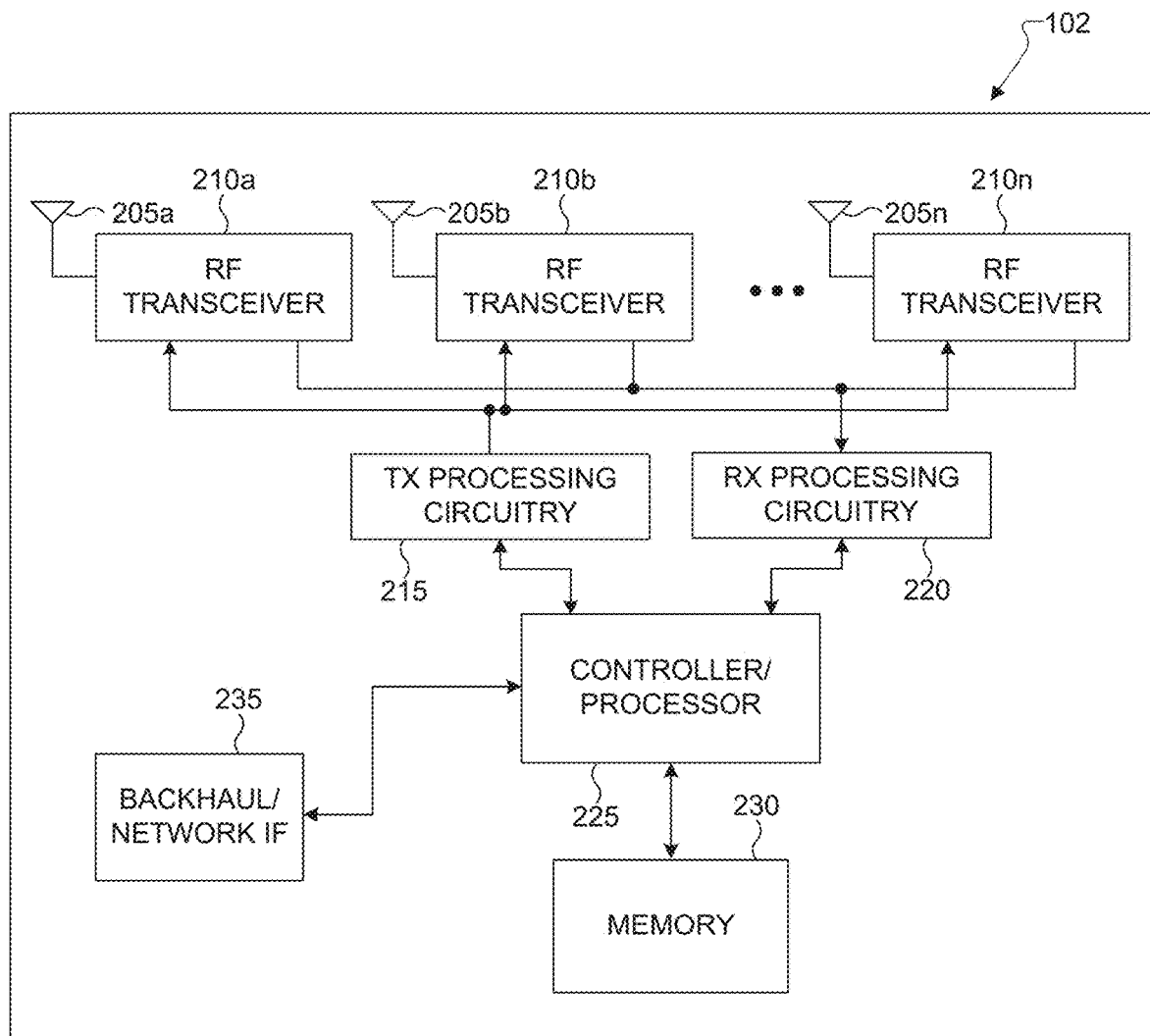
FIG. 2 illustrates an example of gNB according to embodiments of the present disclosure.
Figure 3:
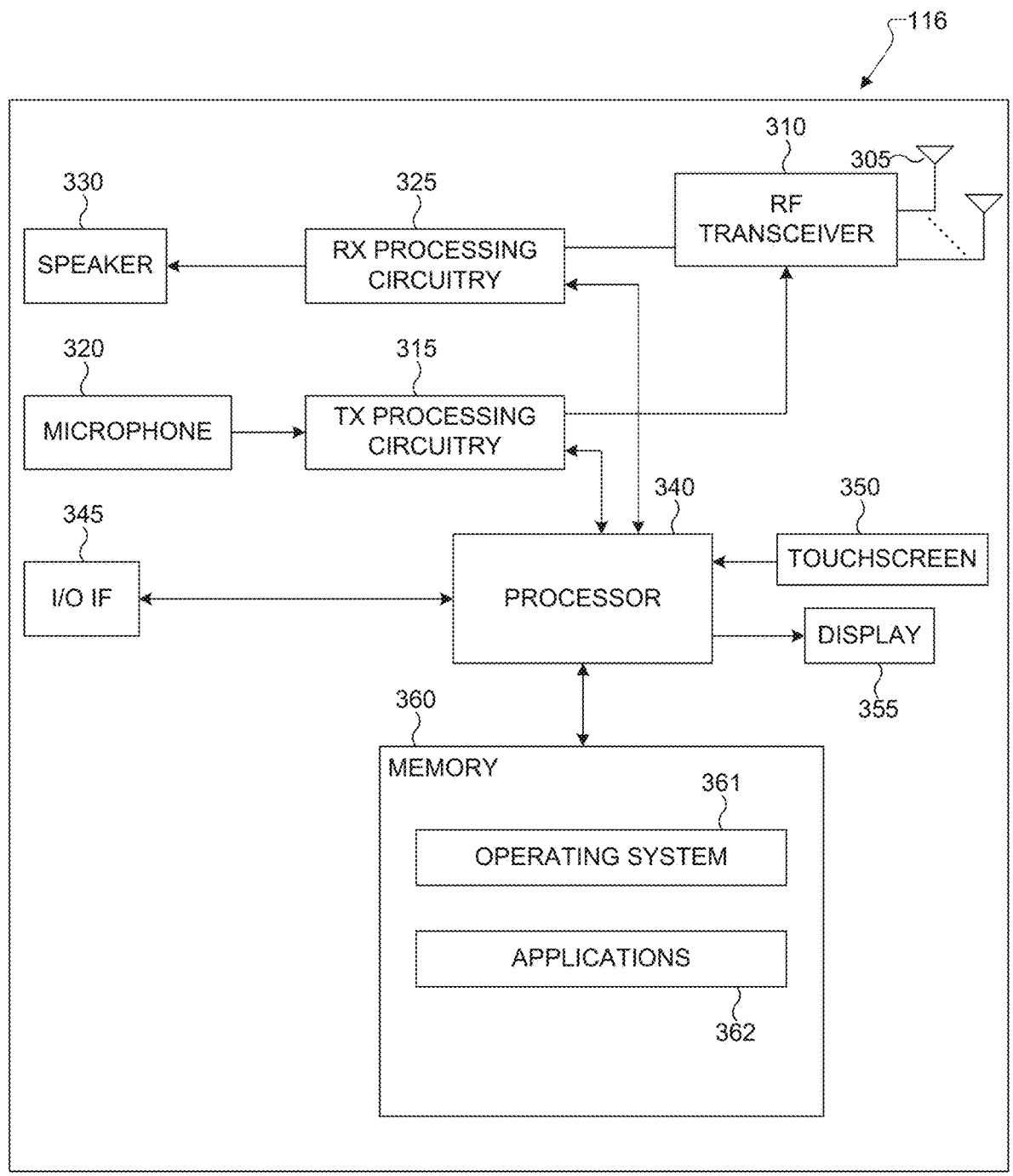
FIG. 3 illustrates an example of UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques. In various embodiments, a UE 116 may communicate with another UE 115 via a sidelink (SL). For example, both UEs 115-116 can be within network coverage (of the same or different base stations). In another example, the UE 116 may be within network coverage and the other UE may be outside network coverage. In yet another example, both UE are outside network coverage. In one embodiment, the small office base station (SB) 111 can communicate with an SB 111A, an SB 111B, and an SB 111c, through the SL. The SBs 111A to 111C can communicate with the BS 102 through the SB 111. In yet another example, SBs 111A to 111C can communicate with another of the SBs 111A to 111C.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3GPP NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for a low power sensing operation for an SL in a wireless communication system. In certain embodiments, and one or more of the gNBs 101-103 includes circuitry, programing, or a combination thereof, for a low power sensing operation for an SL in a wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of downlink (DL) channel signals and the transmission of uplink (UL) channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could allow low power sensing operation for an SL in a wireless communication system. Another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100, or by another UE on an SL. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of DL signals or SL channels and signals and the transmission of UL channel signals or SL channels and signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for a low power sensing operation for an SL in a wireless communication system. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

A communication system includes a downlink (DL) that refers to transmissions from a base station or one or more transmission points to UEs and an uplink (UL) that refers to transmissions from UEs to a base station or to one or more reception points and a SL that refers to transmissions from one or more UEs to one or more UEs.

DL signals include data signals conveying information content, control signals conveying DL control information (DCI), and RS that are also known as pilot signals. A gNB transmits data information or DCI through respective physical DL shared channels (PDSCHs) or PDCCHs. A PDSCH or a PDCCH can be transmitted over a variable number of slot symbols including one slot symbol. For brevity, a DCI format scheduling a PDSCH reception by a UE is referred to as a DL DCI format and a DCI format scheduling a physical uplink shared channel (PUSCH) transmission from a UE is referred to as an UL DCI format.

A gNB transmits one or more of multiple types of RS including channel state information RS (CSI-RS) and demodulation RS (DMRS). A CSI-RS is primarily intended for UEs to perform measurements and provide CSI to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process includes NZP CSI-RS and CSI-IM resources.

A UE can determine CSI-RS transmission parameters through DL control signaling or higher layer signaling, such as radio resource control (RRC) signaling, from a gNB. Transmission instances of a CSI-RS can be indicated by DL control signaling or be configured by higher layer signaling. A DM-RS is transmitted only in the BW of a respective PDCCH or PDSCH and a UE can use the DMRS to demodulate data or control information.

Figure 4:
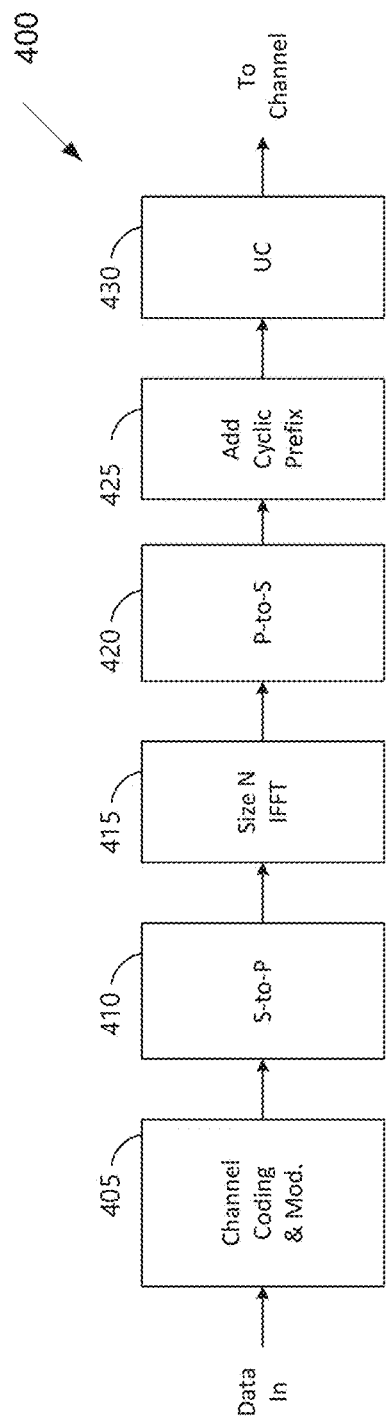
FIGS. 4 and 5 illustrate example of wireless transmit and receive paths according to this disclosure.
Figure 5:
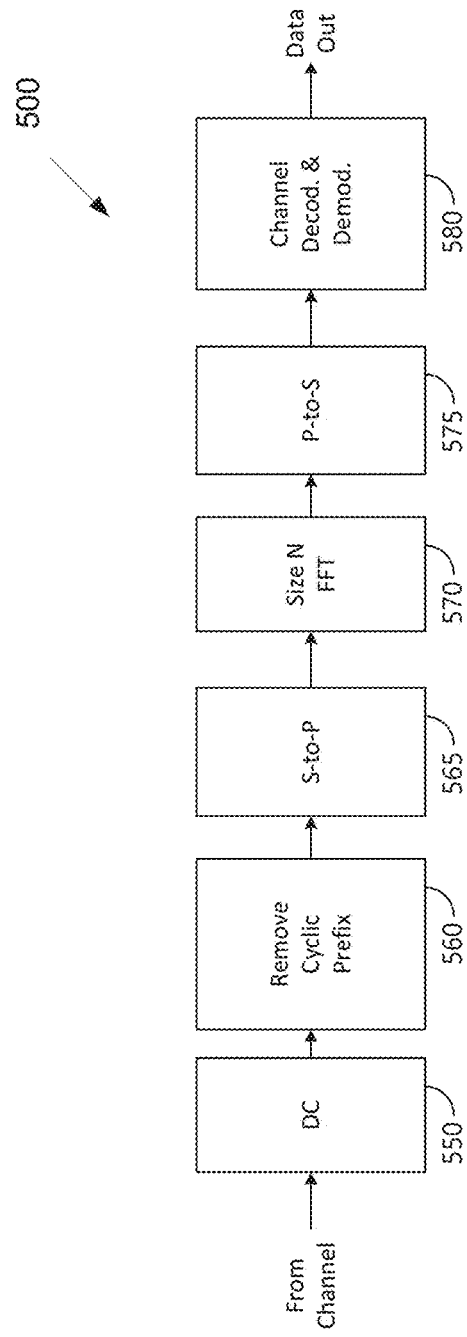

FIG. 4 and FIG. 5 illustrate example wireless transmit and receive paths according to this disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. It may also be understood that the receive path 500 can be implemented in a first UE and that the transmit path 400 can be implemented in a second UE to support SL communications. In some embodiments, the receive path 500 is configured to support SL sensing in SL communication as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and/or transmitting in the sidelink to another UE and may implement the receive path 500 for receiving in the downlink from the gNBs 101-103 and/or receiving in the sidelink from another UE.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

A time unit for DL signaling, for UL signaling, or for SL signaling on a cell is one symbol. A symbol belongs to a slot that includes a number of symbols such as 14 symbols. A slot can also be used as a time unit. A bandwidth (BW) unit is referred to as a resource block (RB). One RB includes a number of sub-carriers (SCs). For example, a slot can have duration of one millisecond and an RB can have a bandwidth of 180 kHz and include 12 SCs with inter-SC spacing of 15 kHz. As another example, a slot can have a duration of 0.25 milliseconds and include 14 symbols and an RB can have a BW of 720 kHz and include 12 SCs with SC spacing of 60 kHz.

An RB in one symbol of a slot is referred to as physical RB (PRB) and includes a number of resource elements (REs). A slot can be either full DL slot, or full UL slot, or hybrid slot similar to a special subframe in time division duplex (TDD) systems. In addition, a slot can have symbols for SL communications. A UE can be configured one or more bandwidth parts (BWPs) of a system BW for transmissions or receptions of signals or channels.

SL signals and channels are transmitted and received on sub-channels within a resource pool, where a resource pool is a set of time-frequency resources used for SL transmission and reception within a SL BWP. SL channels include physical SL shared channels (PSSCHs) conveying data information, physical SL control channels (PSCCHs) conveying SL control information (SCI) for scheduling transmissions/receptions of PSSCHs, physical SL feedback channels (PSFCHs) conveying hybrid automatic repeat request acknowledgement (HARQ-ACK) information in response to correct (ACK value) or incorrect (NACK value) transport block receptions in respective PSSCHs, and physical SL Broadcast channel (PSBCH) conveying system information to assist in SL synchronization.

SL signals include demodulation reference signals DM-RS that are multiplexed in PSSCH or PSCCH transmissions to assist with data or SCI demodulation, CSI-RS for channel measurements, phase tracking reference signals (PT-RS) for tracking a carrier phase, and SL primary synchronization signals (S-PSS) and SL secondary synchronization signals (S-SSS) for SL synchronization. SCI can include two parts/stages corresponding to two respective SCI formats where, for example, the first SCI format is multiplexed on a PSCCH and the second SCI format is multiplexed along with SL data on a PSSCH that is transmitted in physical resources indicated by the first SCI format.

A SL channel can operate in different cast modes. In a unicast mode, a PSCCH/PSSCH conveys SL information from one UE to only one other UE. In a groupcast mode, a PSCCH/PSSCH conveys SL information from one UE to a group of UEs within a (pre-)configured set. In a broadcast mode, a PSCCH/PSSCH conveys SL information from one UE to all surrounding UEs. In NR release 16, there are two resource allocation modes for a PSCCH/PSSCH transmission. In resource allocation mode 1, a gNB schedules a UE on the SL and conveys scheduling information to the UE transmitting on the SL through a DCI format transmitted from the gNB on a DL. In resource allocation mode 2, a UE schedules a SL transmission. SL transmissions can operate within network coverage where each UE is within the communication range of a gNB, outside network coverage where all UEs have no communication with any gNB, or with partial network coverage, where only some UEs are within the communication range of a gNB.

In case of groupcast PSCCH/PSSCH transmission, a UE can be (pre-)configured one of two options for reporting of HARQ-ACK information by the UE as shown below.

In one example of HARQ-ACK reporting option (1), a UE can attempt to decode a transport block (TB) in a PSSCH reception if, for example, the UE detects a SCI format scheduling the TB reception through a corresponding PSSCH. If the UE fails to correctly decode the TB, the UE multiplexes a negative acknowledgement (NACK) in a PSFCH transmission. In this option, the UE does not transmit a PSFCH with a positive acknowledgment (ACK) when the UE correctly decodes the TB.

In another example of HARQ-ACK reporting option (2), a UE can attempt to decode a TB if, for example, the UE detects a SCI format that schedules a corresponding PSSCH. If the UE correctly decodes the TB, the UE multiplexes an ACK in a PSFCH transmission; otherwise, if the UE does not correctly decode the TB, the UE multiplexes a NACK in a PSFCH transmission.

In HARQ-ACK reporting option (1), when a UE that transmitted the PSSCH detects a NACK in a PSFCH reception, the UE can transmit another PSSCH with the TB (retransmission of the TB). In HARQ-ACK reporting option (2), when a UE that transmitted the PSSCH does not detect an ACK in a PSFCH reception, such as when the UE detects a NACK or does not detect a PSFCH reception, the UE can transmit another PSSCH with the TB.

A sidelink resource pool includes a set/pool of slots and a set/pool of RBs used for sidelink transmission and sidelink reception. A set of slots which can belong to a sidelink resource pool can be denoted by $\{t_0^{SL}, t_1^{SL}, t_2^{SL}, \ldots\}$. A set of slots which belong to a resource pool can be denoted by $\{t'_0^{SL}, t'_1^{SL}, t'_2^{SL}, \ldots, t'_{T'_{MAX}-1}^{SL}\}$ and can be configured, for example, at least using a bitmap. Where, $T'_{MAX}$ is the number of SL slots in a resource pool. Within each slot $t'_y^{SL}$ of a sidelink resource pool, there are $N_{subCH}$ contiguous subchannels in the frequency domain for sidelink transmission, where $N_{subCH}$ is provided by a higher-layer parameter. Subchannel m, where m is between 0 and $N_{subCH}-1$, is given by a set of $n_{subCHsize}$ PRBs, given by $n_{PRB}=n_{subCHstart}+m \cdot n_{subCHsize}+j$, where $j=0, 1, \ldots, n_{subCHsize}-1$. $n_{subCHstart}$ and $n_{subCHsize}$ are provided by higher layer parameters.

The slots of a SL resource pool are determined as shown below examples.

In one example, let set of slots that may belong to a resource be denoted by $\{t_0^{SL}, t_1^{SL}, t_2^{SL}, \ldots, t_{T_{MAX}-1}^{SL}\}$, where $0 \le t_i^{SL} < 10240 \times 2^\mu$, and $0 \le i < T_{max}$, $\mu$ is the sub-carrier spacing configuration. $\mu=0$ for a 15 kHz sub-carrier spacing. $\mu=1$ for a 30 kHz sub-carrier spacing. $\mu=2$ for a 60 kHz sub-carrier spacing. $\mu=8$ for a 120 kHz sub-carrier spacing. The slot index is relative to slot #0 of SFN #0 of the serving cell, or DFN #0. The set of slots includes all slots except: (1) $N_{S-SSB}$ slots that are configured for SL SS/PBCH Block (S-SSB); (2) $N_{nonSL}$ slots where at least one SL symbols is not not-semi-statically configured as UL symbol by higher layer parameter tdd-UL-DL-ConfigurationCommon or sl-TDD-Configuration. In a SL slot, OFDM symbols Y-th, (Y+1)-th, ..., (Y+X-1)-th are SL symbols, where Y is determined by the higher layer parameter sl-StartSymbol and X is determined by higher layer parameter sl-LengthSymbols; and (3) $N_{reserved}$ reserved slots. Reserved slots are determined such that the slots in the set $\{t_0^{SL}, t_1^{SL}, t_2 SL, \ldots, t_{T_{MAX}-1}^{SL}\}$ is a multiple of the bitmap length ($L_{bitmap}$), where the bitmap ($b_0, b_1, \ldots, b_{L_{bitmap}-1}$) is configured by higher layers.

In such example, the reserved slots are determined as follows: (1) let $\{l_0, l_1, \ldots, l_{2\mu \times 10240-N_{S-SSB}-N_{nonSL}-1}\}$ be the set of slots in range $0 \ldots 2\mu \times 10240-1$, excluding S-SSB slots and non-SL slots. The slots are arranged in ascending order of the slot index; (2) the number of reserved slots is given by: $N_{reserved}=(2^\mu \times 10240 - N_{S-SSB} - N_{nonSL})$ mod $L_{bitmap}$; and (3) the reserved slots $l_r$ are given by:

$$r = \left\lfloor \frac{m \cdot (2^\mu \times 10240 - N_{S-SSB} - N_{nonSL})}{N_{reserved}} \right\rfloor,$$

where, m=0, 1, . . . , $N_{reserved}$−1; $T_{max}$ is given by: $T_{max}$=2µ× 10240 $N_{S\text{-}SSB}$−$N_{nonSL}$−$N_{reserved}$.

In another example, the slots are arranged in ascending order of slot index.

In yet another example, the set of slots belonging to the SL resource pool, $\{t'_0{}^{SL}, t'_1{}^{SL}, t'_2{}^{SL}, \ldots t'_{T'_{MAX}-1}{}^{SL}\}$ are determined as follows: (1) each resource pool has a corresponding bitmap ($b_0, b_1, \ldots b_{L_{bitmap}-1}$) of length $L_{bitmap}$; (2) a slot $t_k{}^{SL}$ belongs to the resource pool if $b_{k\ mod\ L_{bitmap}}$=1; and (3) the remaining slots are indexed successively staring from 0, 1, . . . $T'_{MAX}$−1. Where, $T'_{MAX}$ is the number of remaining slots in the set.

Slots can be numbered (indexed) as physical slots or logical slots, wherein physical slots include all slots numbered sequential, while logical slots include only slots that belong to a sidelink resource pool as described above numbered sequentially. The conversion from a physical duration, $P_{rsvp}$, in milli-second to logical slots, $P'_{rsvp}$, is given by $$P'_{rsvp} = \left\lceil \frac{T'_{max}}{10240\ ms} \times P_{rsvp} \right\rceil.$$

For resource (re-)selection or re-evaluation in slot n, a UE can determine a set of available single-slot resources for transmission within a resource selection window [n+$T_1$, n+$T_2$], such that a single-slot resource for transmission, $R_{x,y}$ is defined as a set of $L_{subCH}$ contiguous subchannels x+i, where i=0, 1, . . . , $L_{subCH}$−1 in slot $t_y{}^{SL}$. $T_1$ is determined by the UE such that, 0≤$T_1$≤$T_{proc,1}{}^{SL}$, where $T_{proc,1}{}^{SL}$ is a PSSCH processing time for example as defined in 3GPP standard specification. For example, $T_{proc,1}{}^{SL}$ is the resource selection processing time. $T_2$ is determined by the UE such that $T_{2min}$≤$T_2$≤Remaining Packet Delay Budget, as long as $T_{2min}$<Remaining Packet Delay Budget, else $T_2$ is equal to the Remaining Packet Delay Budget. $T_{2min}$ is a configured by higher layers and depends on the priority of the SL transmission.

The resource (re-)selection is a two-step procedure: (1) the first step (e.g., performed in the physical layer) is to identify the candidate resources within a resource selection window. Candidate resources are resources that belong to a resource pool, but exclude resources (e.g., resource exclusion) that were previously reserved, or potentially reserved by other UEs. The resources excluded are based on SCIs decoded in a sensing window and for which the UE measures a SL RSRP that exceeds a threshold. The threshold depends on the priority indicated in a SCI format and on the priority of the SL transmission. Therefore, sensing within a sensing window involves decoding the first stage SCI, and measuring the corresponding SL RSRP, wherein the SL RSRP can be based on PSCCH DMRS or PSSCH DMRS. Sensing is performed over slots where the UE doesn't transmit SL. The resources excluded are based on reserved transmissions or semi-persistent transmissions that can collide with the excluded resources or any of reserved or semi-persistent transmissions; the identified candidate resources after resource exclusion are provided to higher layers and (2) the second step (e.g., performed in the higher layers) is to select or re-select a resource from the identified candidate resources for PSSCH/PSCCH transmission.

During the first step of the resource (re-)selection procedure, a UE can monitor slots in a sensing window [n−$T_0$, n−$T_{proc,0}{}^{SL}$), where the UE monitors slots belonging to a corresponding sidelink resource pool that are not used for the UE's own transmission. For example, $T_{proc,0}{}^{SL}$ is the sensing processing latency time. To determine a candidate single-slot resource set to report to higher layers, a UE excludes (e.g., resource exclusion) from the set of available single-slot resources for SL transmission within a resource pool and within a resource selection window, the following: (1) single slot resource $R_{x,y}$, such that for any slot $t'_m{}^{SL}$ not monitored within the sensing window with a hypothetical received SCI Format 1-0, with a "Resource reservation period" set to any periodicity value allowed by a higher layer parameter reseverationPeriodAllowed, and indicating all sub-channels of the resource pool in this slot, satisfies condition 2.2. below; and/or (2) single slot resource $R_{x,y}$, such that for any received SCI within the sensing window. In such an example, the associated L1-RSRP measurement is above a (pre-)configured SL-RSRP threshold, where the SL-RSRP threshold depends on the priority indicated in the received SCI and that of the SL transmission for which resources are being selected.

In another example (condition 2.2), the received SCI in slot $t'_m{}^{SL}$, or if "resource reservation field" is present in the received SCI the same SCI is assumed to be received in slot $t'_{m+q\times R'_{rsvp\_Rx}}{}^{SL}$, indicates a set of resource blocks that overlaps $R_{x,y+j\times P'_{rsvp\_Tx}}$, where, q=1, 2, . . . , Q, where, if $P_{rsvp\_Rx}$≤$T_{scal}$ and $$n' - m < P'_{rsvp\_Rx} \Rightarrow Q = \left\lceil \frac{T_{scal}}{P_{rsvp\_RX}} \right\rceil.$$

$T_{scal}$ is $T_2$ in units of milli-seconds, else Q=1. If n belongs to $(t'_0{}^{SL}, t'_1{}^{SL}, \ldots, t'_{T'_{max-1}}{}^{SL})$, n'=n, else n' is the first slot after slot n belonging to set $(t'_0{}^{SL}, t'_1{}^{SL}, \ldots t'_{T'_{max-1}}{}^{SL})$—, where j=0, 1, . . . , $C_{reset}$−1; $P_{rsvp\_Rx}$ is the indicated resource reservation period in the received SCI in physical slots, and $P'_{rsvp\_Rx}$ is that value converted to logical slots; and $P'_{rsvp\_Tx}$ is the resource reservation period of the SL transmissions for which resources are being reserved in logical slots.

In yet another example, if the candidate resources are less than a (pre-)configured percentage, such as 20%, of the total available resources within the resource selection window, the (pre-)configured SL-RSRP thresholds are increased by a predetermined amount, such as 3 dB.

An NR sidelink introduced two new procedures for mode 2 resource allocation; re-evaluation and pre-emption.

Re-evaluation check occurs when a UE checks the availability of pre-selected SL resources before the resources are first signaled in an SCI Format, and if needed re-selects new SL resources.

For a pre-selected resource to be first-time signaled in slot m, the UE performs a re-evaluation check at least in slot m−$T_3$. The re-evaluation check includes: (1) performing the first step of the SL resource selection procedure as defined in 3GPP standard specification (i.e., clause 8.1.4 of TS 38.214), which involves identifying a candidate (available) sidelink resource set in a resource selection window as previously described; (2) if the pre-selected resource is available in the candidate sidelink resource set, the resource is used/signaled for sidelink transmission; and (3) else, the pre-selected resource is not available in the candidate sidelink resource set, a new sidelink resource is re-selected from the candidate sidelink resource set.

Pre-emption check occurs when a UE checks the availability of pre-selected SL resources that have been previously signaled and reserved in an SCI Format, and if needed re-selects new SL resources. For a pre-selected and reserved resource to be signaled in slot m, the UE performs a pre-emption check at least in slot m−T$_3$.

The pre-emption check includes: (1) performing the first step of the SL resource selection procedure as defined in 3GPP standard specification (i.e., clause 8.1.4 of TS 38.214), which involves identifying candidate (available) sidelink resource set in a resource selection window as previously described; (2) if the pre-selected and reserved resource is available in the candidate sidelink resource set, the resource is used/signaled for sidelink transmission; and (3) else, the pre-selected and reserved resource is NOT available in the candidate sidelink resource set. The resource is excluded from the candidate resource set due to an SCI, associated with a priority value P$_{RX}$, having an RSRP exceeding a threshold. Let the priority value of the sidelink resource being checked for pre-emption be P$_{TX}$.

In such instances, if the priority value P$_{RX}$ is less than a higher-layer configured threshold and the priority value P$_{Rx}$ is less than the priority value P$_{TX}$. The pre-selected and reserved sidelink resource is pre-empted. A new sidelink resource is re-selected from the candidate sidelink resource set. Note that, a lower priority value indicates traffic of higher priority. Else, the resource is used/signaled for sidelink transmission.

As described above, the monitoring procedure for resource (re)selection during the sensing window requires reception and decoding of a SCI format during the sensing window, as well as measuring the SL RSRP. This reception and decoding process and measuring the SL RSRP increases a processing complexity and power consumption of a UE for sidelink communication.

3GPP Release 16 is the first NR release to include sidelink through work item "5G V2X with NR sidelink," the mechanisms introduced focused mainly on vehicle-to-everything (V2X), and can be used for public safety when the service requirement can be met. Release 17 extends sidelink support to more use cases through work item "NR Sidelink enhancement" One of the motivations for the sidelink enhancement in Release 17 is power savings.

Power saving enables UEs with battery constraint to perform sidelink operations in a power efficient manner. Rel-16 NR sidelink is designed based on the assumption of "always-on" when UE operates sidelink, e.g., only focusing on UEs installed in vehicles with sufficient battery capacity. Solutions for power saving in Rel-17 are required for vulnerable road users (VRUs) in V2X use cases and for UEs in public safety and commercial use cases where power consumption in the UEs needs to be minimized.

One of the objectives of the Release 17 sidelink enhancement is to specify resource allocation enhancements that reduce power consumption, taking the principle of the release 14 LTE sidelink random resource selection and partial sensing as baseline with potential enhancements.

Resource allocation enhancement is to specify resource allocation to reduce power consumption of the UEs. For the resource allocation enhancement, a baseline is to introduce the principle of Rel-14 LTE sidelink random resource selection and partial sensing to Rel-16 NR sidelink resource allocation mode 2. Note that taking Rel-14 as the baseline does not preclude introducing a new solution to reduce power consumption for the cases where the baseline cannot work properly.

To alleviate the issues associated with sensing, various schemes have been provided, e.g., random resource selection (e.g., no sensing) and partial sensing have been considered in LTE for sidelink transmission. With a random resource selection, a UE randomly selects a resource for sidelink transmission within the total available resources of a resource pool within a resource selection window without performing sensing. However, with random resource selection, there is no control on which resource is selected by a UE within the total available resources and this absence of control can lead to a higher resource collision rate and increased failures on the sidelink interface.

A resource is defined by a set of time resources, such as symbols of a slot or slots, and a set of frequency resources such as a number of RB s of sub-channels. A collision on a resource over the time-frequency domain occurs when two or more UEs transmit on the resource.

In one embodiment, a method is provided to alleviate collision by restricting the resources a user can select for transmission based on a characteristic such as a user identity, a user location or a data priority. Alternatively, partial sensing can reduce the computation complexity by reducing the number of sensed slots during a sensing window, however, there is a tradeoff between sensing accuracy and computation complexity. With more slots sensed during a sensing window, the sensing accuracy is improved, and hence less likelihood of collision on a selected single slot resource within a resource selection window, however, the computation complexity is higher and hence higher power consumption by the UE. On the other hand, with less slots sensed during a sensing window, the computation complexity is reduced, and hence less power consumption at the expense of a deterioration of the sensing accuracy and hence a greater likelihood of collision on a selected single slot resource within a resource selection window.

In NR release 17, a SL mode 2 TX resource pool can be (pre-)configured to enable full sensing only, partial sensing only, random selection only, or a combination of thereof. In this disclosure, enhancements for the SL UE is provided for determining the sensing mode to use in a TX resource pool. Wherein, sensing mode can refer to full sensing, partial sensing or no sensing (e.g., for random resource selection).

With a partial sensing, a UE can sense some sidelink slots. Partial sensing can be periodic based partial sensing (PBPS), wherein the sensed slots can occur at fixed periodic interval. Alternatively, partial sensing can be contiguous partial sensing (CPS), wherein slots are sensed within a short time window before resource selection/reselection or for an initial SL transmission or for a re-evaluation or a preemption check. In the present disclosure, a periodic based partial sensing (PBPS) is provided. In the present disclosure, the determination and configuration of parameters that control the operation of periodic based partial sensing (PBPS) is provided, for example, the determination of the candidate slots in the resource selection window, the determination of the partial sensing periodicity, and the determination of the partial sensing periodic sensing occasions for given periodicity.

3GPP Release 16 is the first NR release to include sidelink through work item "5G V2X with NR sidelink," the mechanisms introduced focused mainly on vehicle-to-everything (V2X), and can be used for public safety when the service requirement can be met. Release 17 extends sidelink support to more use cases through work item "NR sidelink enhancement." One of the motivations for the sidelink enhancement in Release 17 is power savings. One of the objectives of the Release 17 sidelink enhancement is to introduce the principle of Rel-14 LTE sidelink random resource selection.

Low power sensing can be based on partial sensing or no sensing (e.g., for random resource selection). It has been agreed that that a SL mode 2 TX resource pool can be (pre-)configured to enable full sensing only, partial sensing only, random resource selection (e.g., no sensing) only, or a combination of thereof. In this disclosure, enhancements for the SL UE is provided for determining the sensing mode to use in a TX resource pool. Wherein, sensing mode can refer to full sensing, partial sensing or no sensing (e.g., for random resource selection).

Partial sensing is one of the low power sensing schemes introduce in LTE and is being considered for NR. There two types of partial sensing, periodic based partial sensing (PBPS) and contiguous partial sensing (CPS). In this disclosure, a periodic based partial sensing (PBPS) is provided. There are several parameters that control the operation of periodic based partial sensing (PBPS) such as the candidate slots in the resource selection window, partial sensing periodicity and the partial sensing periodic sensing occasions for a given periodicity. The configurability and determination of these parameters can influence the performance of partial sensing and can vary depending on the supported scenario and traffic profile. In this discourse, the configuration and determination of periodic based partial sensing (PBPS) parameters for flexible SL operation is provided.

A UE can be configured with a TX resource pool, thereafter, referred to as a resource pool, that enables one or more of the following sensing modes: (1) full sensing mode: this refers to R16 sensing, wherein a UE can sense all slots within a sensing window; (2) partial (or reduced) sensing mode: the UE senses some slots, wherein; (i) the sensed slots are repeated periodically. Also known as periodic based partial sensing (PBPS); (ii) the sensed slots are aperiodic. One shot sensing. Also known as contiguous partial sensing (CPS); and (iii) a combination of aperiodic and periodic sensing; and (3) no sensing mode (also known as random resource selection). In one example, there is no sensing for the initial resource selection. But sensing can be performed for re-evaluation check and pre-emption check. In another example, there is no sensing for the initial resource selection. There is no sensing for re-evaluation check and pre-emption check.

In the present disclosure, the UE capable of sidelink transmission is triggered or becomes aware that it needs to transmit a packet on the sidelink or provides available candidate slots within a resource selection window in slot n.

The UE further determines the sensing mode based on one or more of the following examples.

In one example of a UE capability, the UE capability can allow: Full sensing only, partial sensing only, no sensing (e.g., random resource selection) only, full sensing and partial sensing, full sensing and no sensing (e.g., random resource selection), partial sensing and no sensing (e.g., random resource selection), and full sensing, partial sensing and no sensing (e.g., random resource selection).

In another example of a configuration by higher layers, the configuration or pre-configuration can configure one of the following: Full sensing only, partial sensing only, no sensing only (e.g., random resource selection), full sensing and partial sensing, full sensing and no sensing (e.g., random resource selection), partial sensing and no sensing (e.g., random resource selection), and full sensing, partial sensing and no sensing (e.g., random resource selection).

In such example: (1) higher layer configuration can be semi-static signaling, by RRC configuration or pre-configuration; (2) a dynamic message from the UE's higher layers or application layer to indicate the configured sensing modes in the physical layer. For example, this can depend on a certain condition, e.g., dependency on battery level and configured thresholds; and/or (3) dynamic message from the network, e.g., MAC CE signaling and/or L1 control singling to indicate the sensing modes.

In yet another example of priority of SL traffic (example A1.1), for each priority level, the allowed sensing modes can be configured. TABLE 1 illustrates an example, where for each priority level the allowed sensing modes are configured. In a variant of this example, only one sensing mode is configured for each priority level.

TABLE 1

| Priority Level | Allowed Sensing Modes |
|---|---|
| 0 | Full sensing |
| 1 | Full sensing, partial sensing |
| 2 | Partial sensing |
| 3 | . . . |
| . . . | |

In another example A1.2, sensing modes are arranged in order: full sensing followed by partial sensing followed by no sensing (e.g., random resource selection). The highest sensing mode for each priority level is configured. For example, if for priority level x, full sensing is configured, this would indicate that full sensing, partial sensing and no sensing are allowed for this priority level. As another example, if for priority level y, partial sensing is configured, this would indicate that both partial sensing and no sensing are allowed for this priority level. As another example, if for priority level z, no sensing (e.g., random resource selection) is configured, this would indicate that only no sensing (e.g., random resource selection) is allowed for this priority level.

In another example A1.3, sensing modes are arranged in order: full sensing followed by partial sensing followed by no sensing (e.g., random resource selection). The lowest sensing mode for each priority level is configured. For example, if for priority level x, full sensing is configured, this would indicate that only full sensing is allowed for this priority level. As another example, if for priority level y, partial sensing is configured, this would indicate that both full sensing and partial sensing are allowed for this priority level. As another example, if for priority level z, no sensing (e.g., random resource selection) is configured, this would indicate that full sensing, partial sensing and no sensing (e.g., random resource selection) are allowed for this priority level.

In another example A1.4, sensing modes are arranged in order: full sensing followed by partial sensing followed by no sensing (e.g., random resource selection). The lowest sensing mode and highest sensing modes for each priority level are configured. TABLE 2 shows an example of the allowed sensing for various configurations.

TABLE 2

| | | Highest Sensing Mode | | |
|---|---|---|---|---|
| | | Full sensing | Partial sensing | No sensing |
| Lowest sensing mode | Full sensing | Full sensing | N/A | N/A |
| | Partial sensing | Full sensing, Partial sensing | Partial sensing | N/A |
| | No sensing | Full sensing, Partial sensing, No sensing | Partial sensing, No sensing | No sensing |

Figure 6:
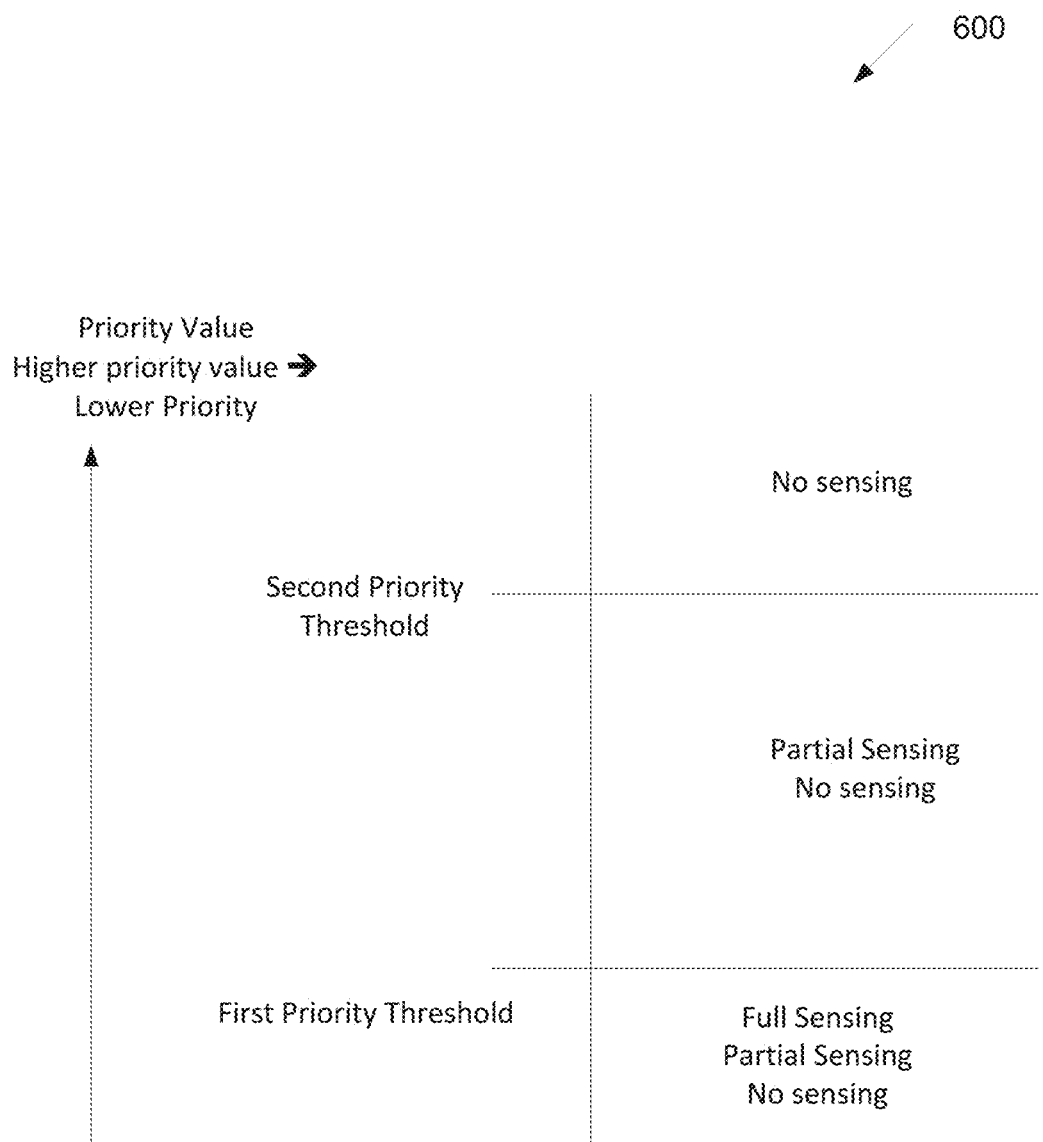
FIG. 6 illustrates an example of priority and the sensing operation according to embodiments of the present disclosure.

FIG. 6 illustrates an example of priority and the sensing operation 600 according to embodiments of the present disclosure. An embodiment of the priority and the sensing operation 600 shown in FIG. 6 is for illustration only.

In another example A1.5, illustrated in FIG. 6, a first priority threshold is provided, and a second priority threshold is provided. For priority values less than (or less than or equal to) the first priority threshold, full sensing, partial sensing and no sensing (e.g., random resource selection) are allowed. For priority values greater than or equal (or greater than) the first priority threshold and less than (or less than or equal to) the second priority threshold, partial sensing and no sensing (e.g., random resource selection) are allowed. For priority values greater than or equal (or greater than) the second priority threshold no sensing (e.g., random resource selection) is allowed. A lower priority value indicates a higher priority.

FIGS. 7A-7M illustrate additional examples of priority and sensing operations 700-712 according to embodiments of the present disclosure. An embodiment of the priority and the sensing operations 700-712 shown in FIGS. 7A-7M is for illustration only.

In one example, only one priority threshold is provided. This can be the first priority threshold or the second priority threshold as illustrated in the examples of FIG. 7B.

Figure 7A:
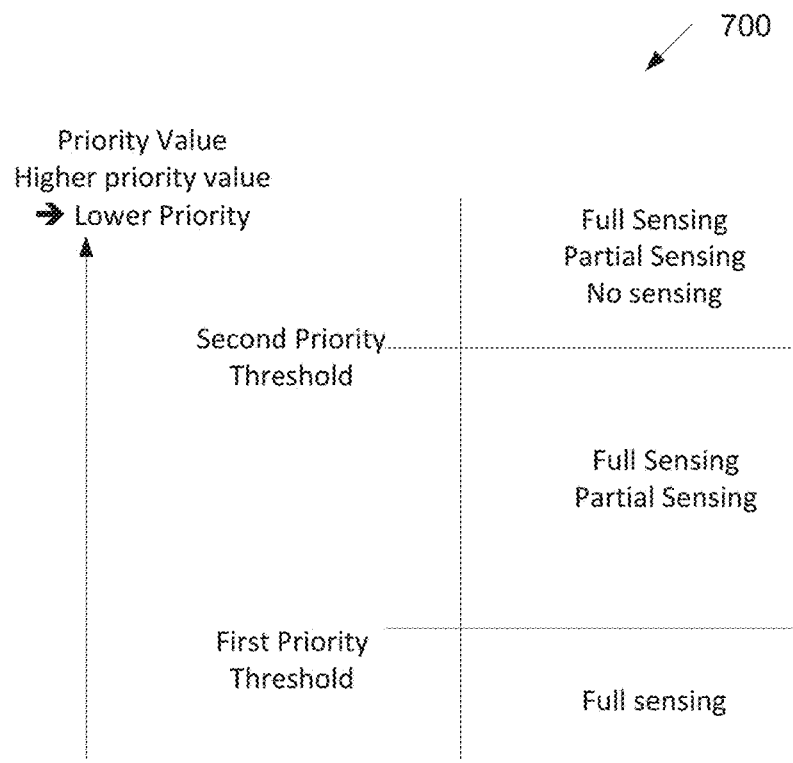
FIGS. 7A-7M illustrate other examples of priority and the sensing operation according to embodiments of the present disclosure.
Figure 7B:
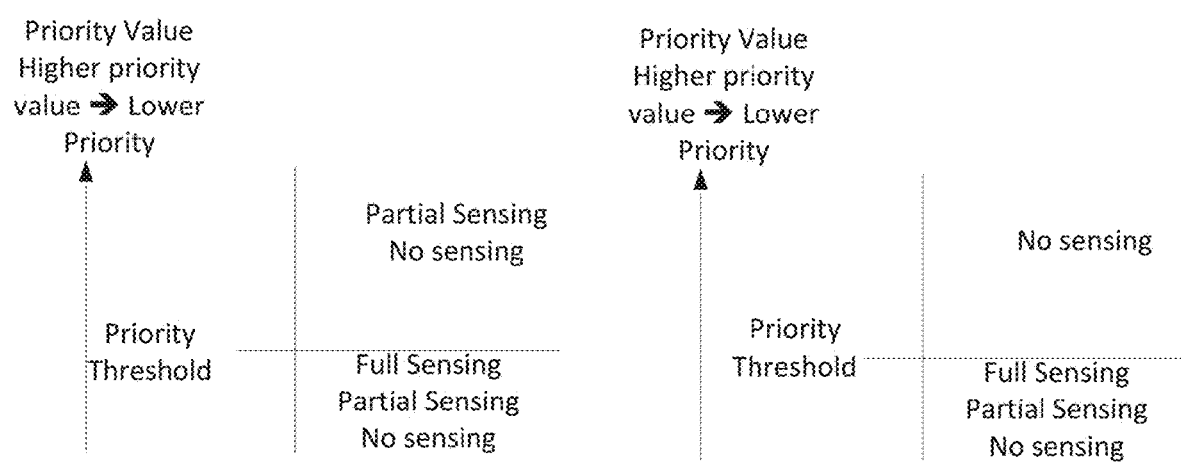
Figure 7C:
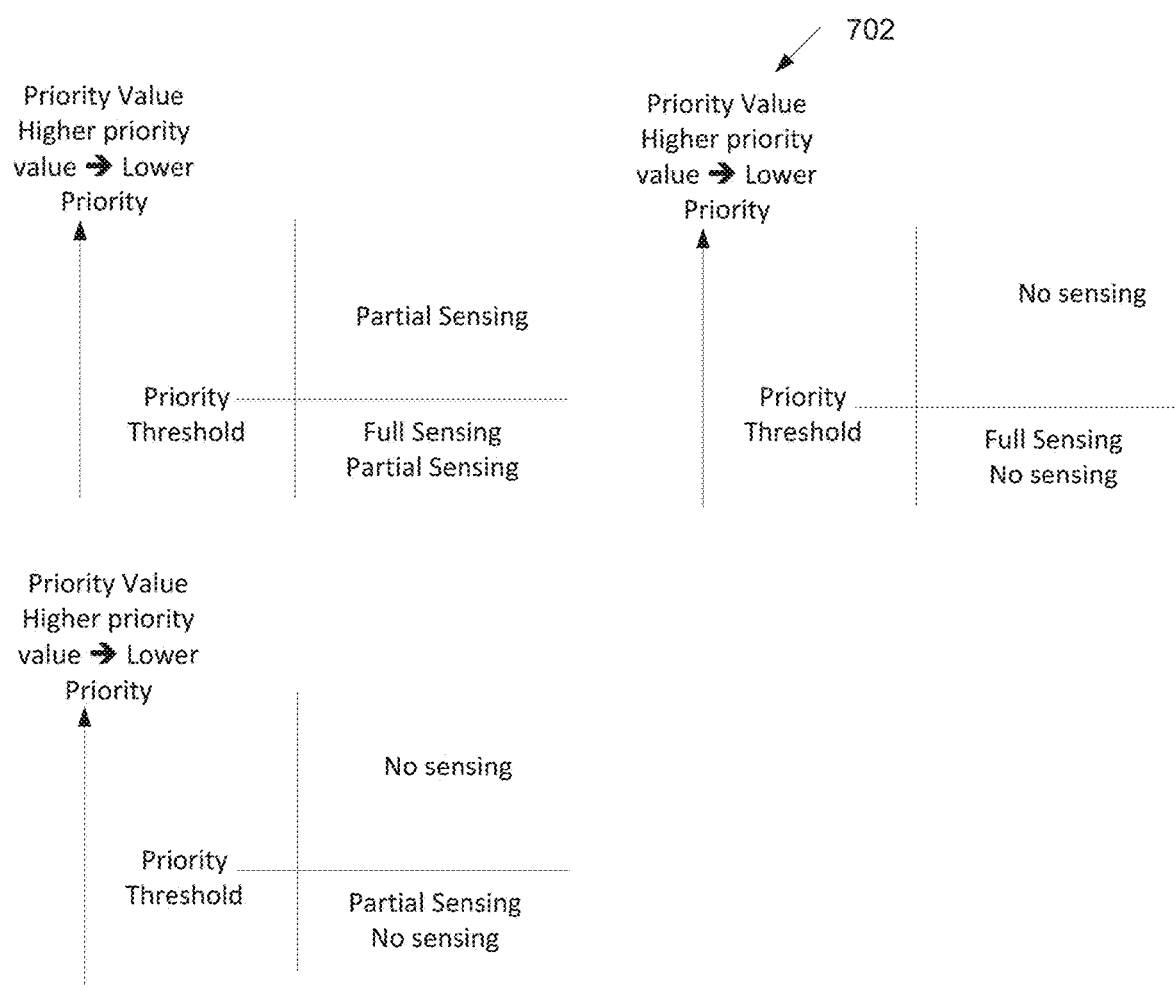

In one example, only two sensing modes are configured for a resource pool, and a single priority threshold is provided as illustrated in the examples of FIG. 7C.

Figure 7D:
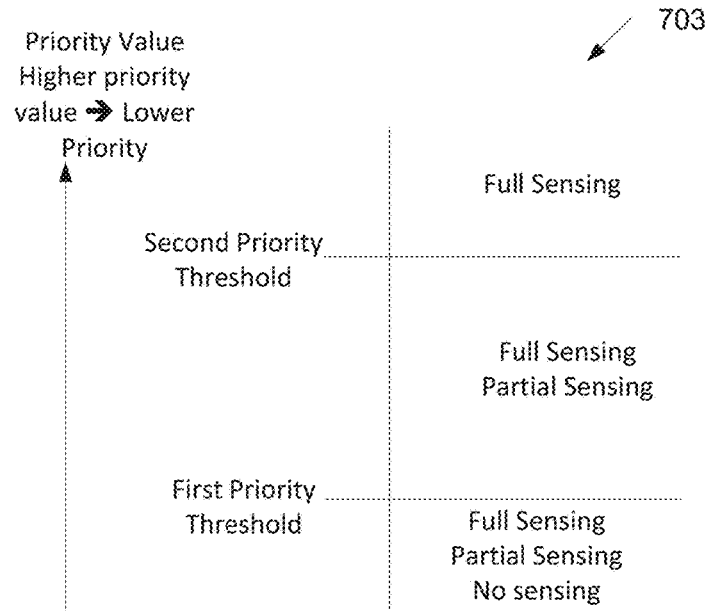
Figure 7E:
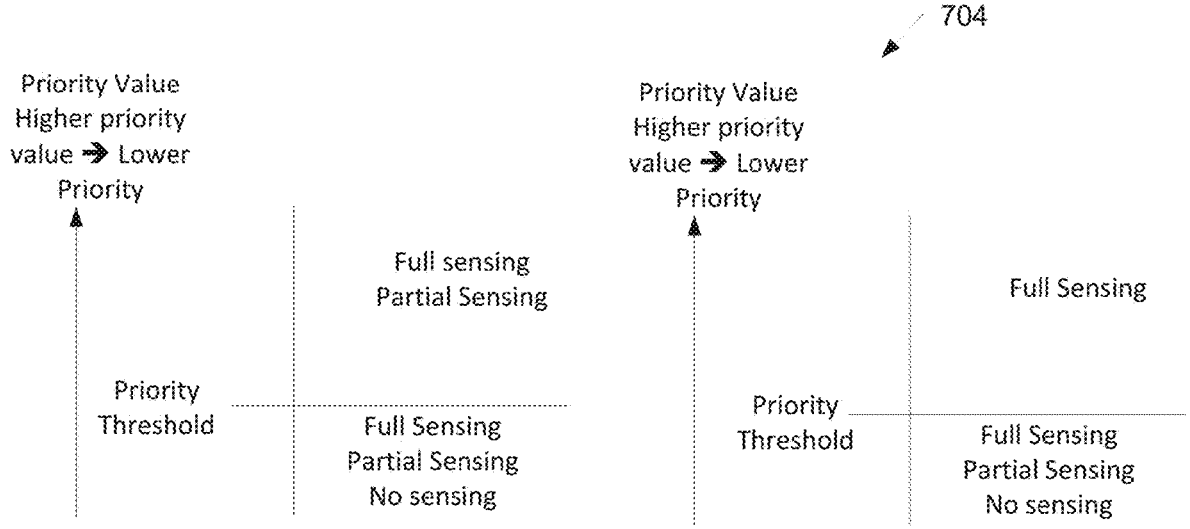
Figure 7F:
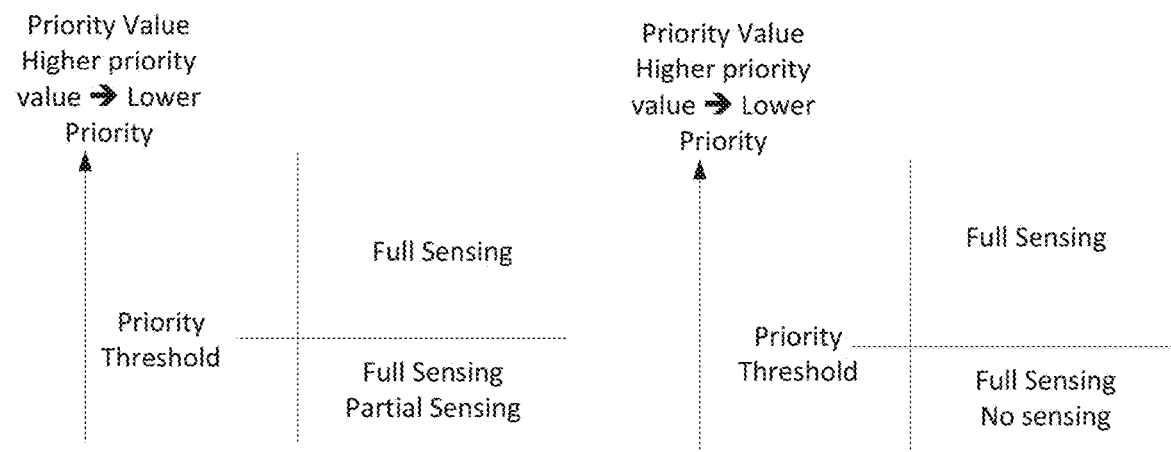

In one example, the order of full sensing, partial sensing and no sensing is reversed as illustrated in the examples of FIG. 7D, FIG. 7E and FIG. 7F.

In another example A1.6, illustrated in FIG. 7A, a first priority threshold is provided, and a second priority threshold is provided. For priority values less than (or less than or equal to) the first priority threshold, full sensing is allowed. For priority values greater than or equal (or greater than) the first priority threshold and less than (or less than or equal to) the second priority threshold, full sensing and partial sensing are allowed. For priority values greater than or equal (or greater than) the second priority threshold full sensing, partial sensing and no sensing (e.g., random resource selection) are allowed. A lower priority value indicates a higher priority.

Figure 7G:
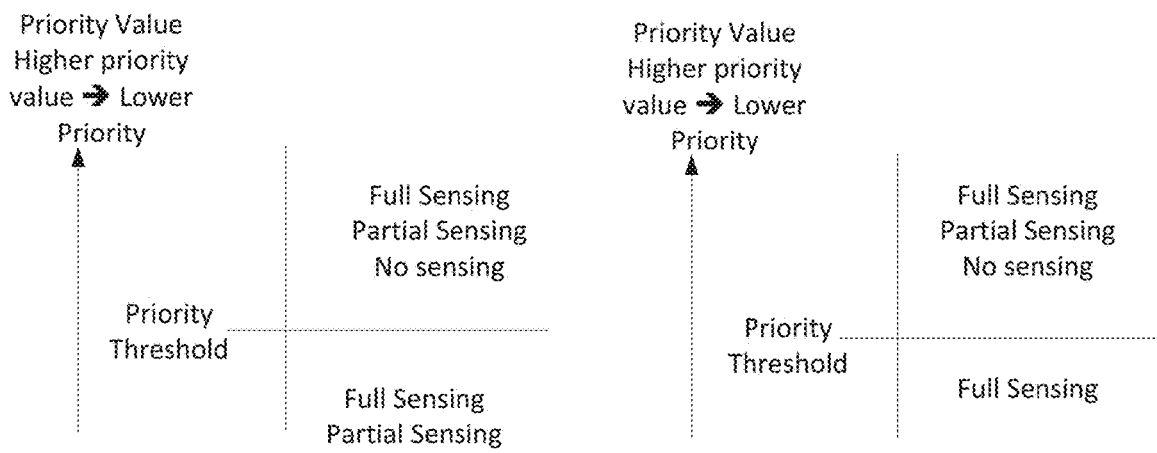

In one example, only one priority threshold is provided. This can be the first priority threshold or the second priority threshold as illustrated in the examples of FIG. 7G.

Figure 7H:
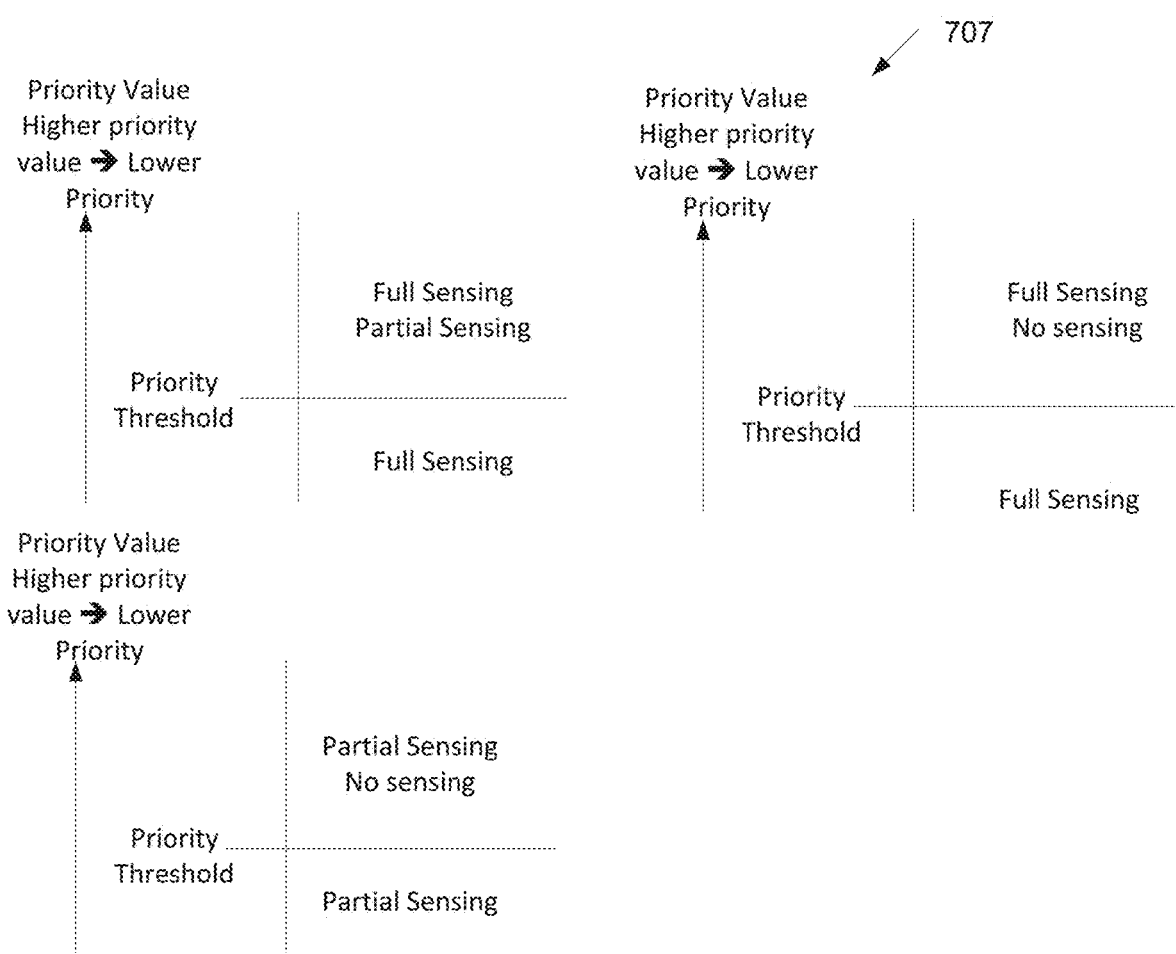

In another example, only two sensing modes are configured for a resource pool, and a single priority threshold is provided as illustrated in the examples of FIG. 7H.

Figure 7I:
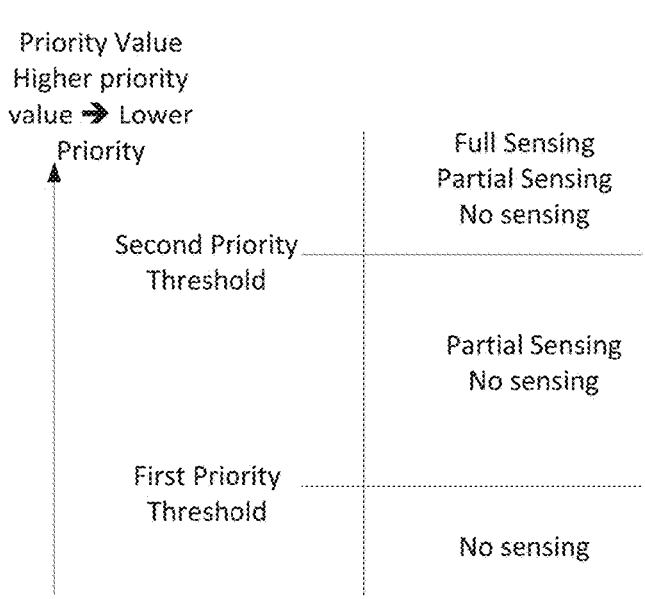
Figure 7J:
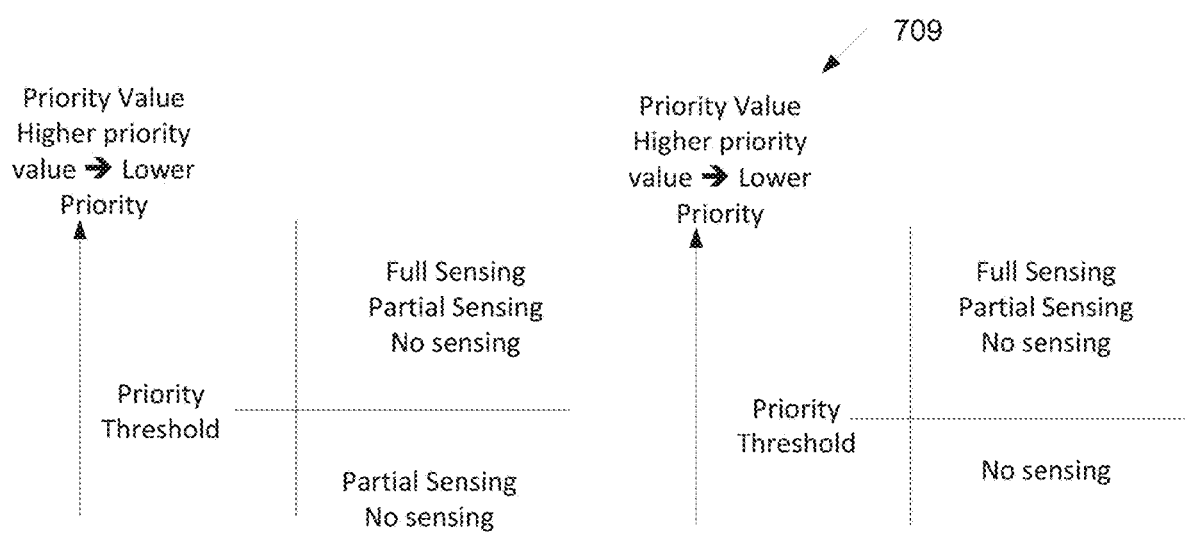
Figure 7K:
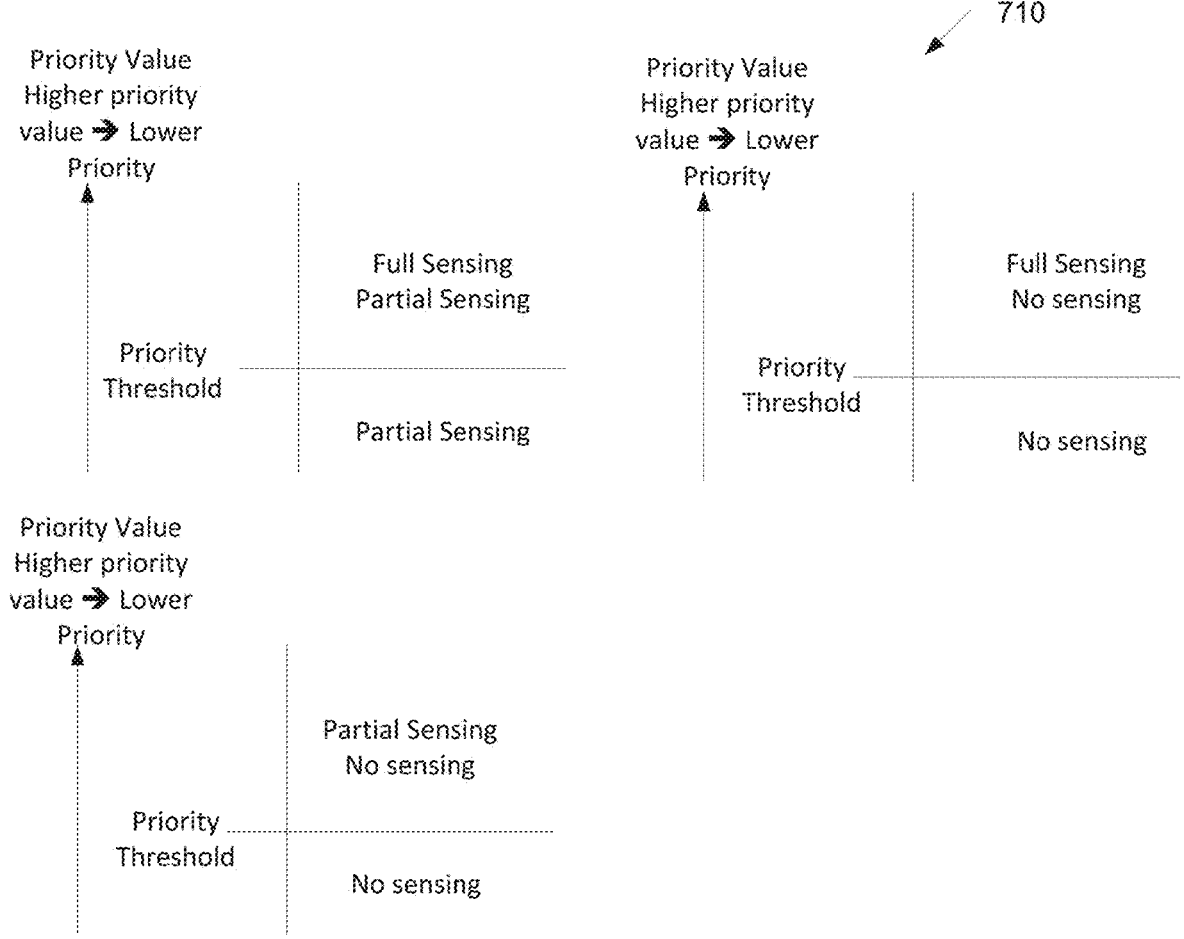

In yet another example, the order of full sensing, partial sensing and no sensing is reversed as illustrated in the examples of FIG. 7I, FIG. 7J and FIG. 7K.

Figure 8:
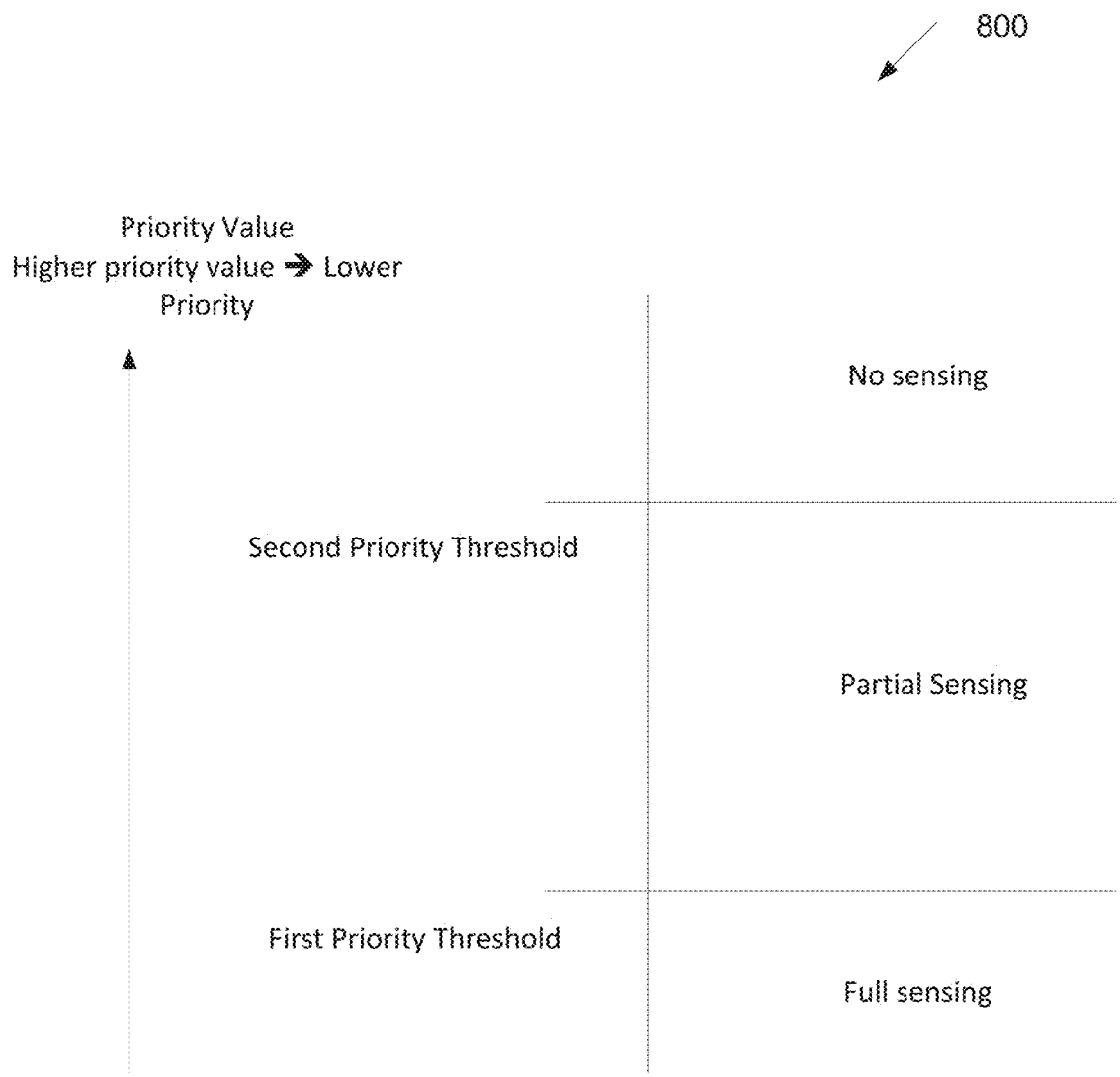
FIG. 8 illustrates yet another example of priority and the sensing operation according to embodiments of the present disclosure.

FIG. 8 illustrates yet another example of priority and the sensing operation 800 according to embodiments of the present disclosure. An embodiment of the priority and the sensing operation 800 shown in FIG. 8 is for illustration only.

In another example A1.7, illustrated in FIG. 8 a first priority threshold is provided, and a second priority threshold is provided. For priority values less than (or less than or equal to) the first priority threshold, full sensing is allowed. For priority values greater than or equal (or greater than) the first priority threshold and less than (or less than or equal to) the second priority threshold, partial sensing is allowed. For priority values greater than or equal (or greater than) the second priority threshold no sensing (e.g., random resource selection) is allowed. A lower priority value indicates a higher priority.

Figure 7L:
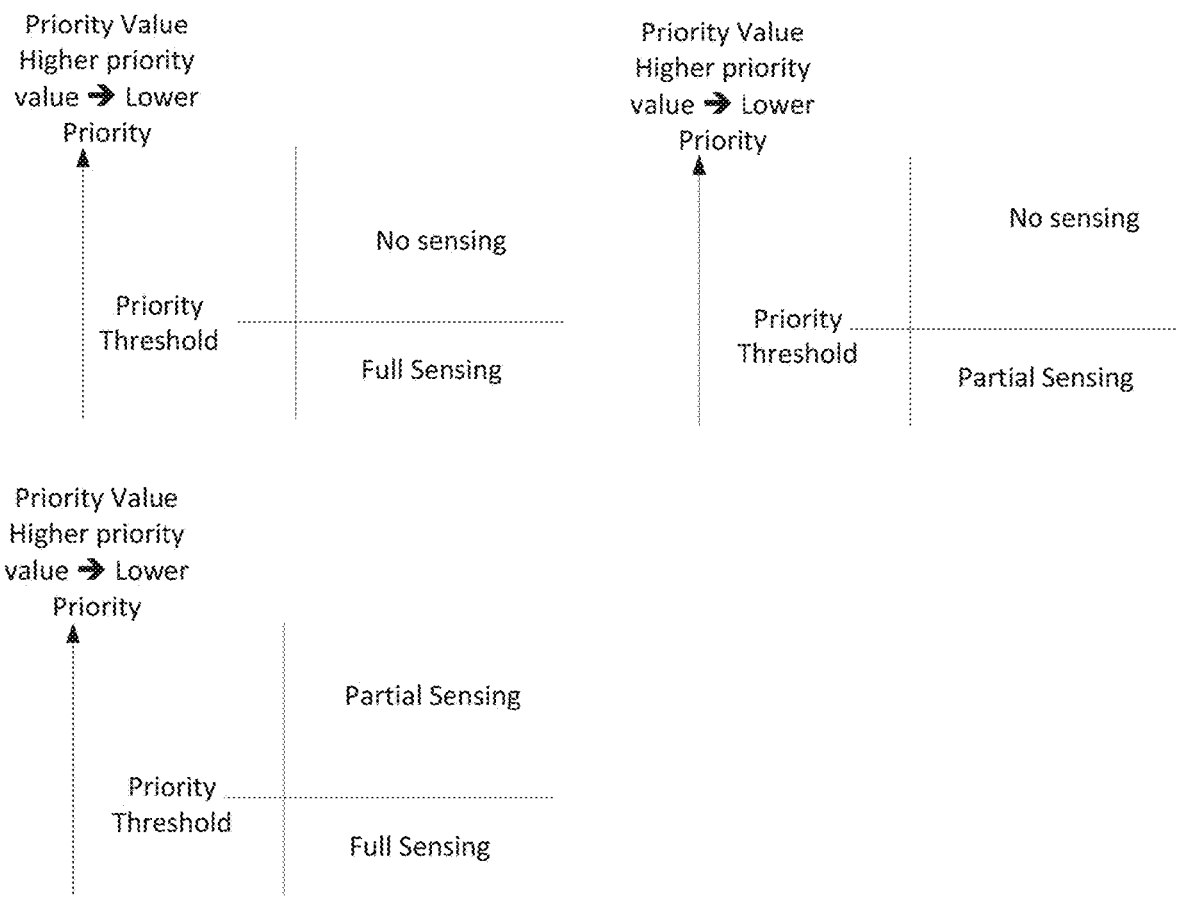

In one example, only two sensing modes are configured for a resource pool, and a single priority threshold is provided as illustrated in the examples of FIG. 7L.

Figure 7M:
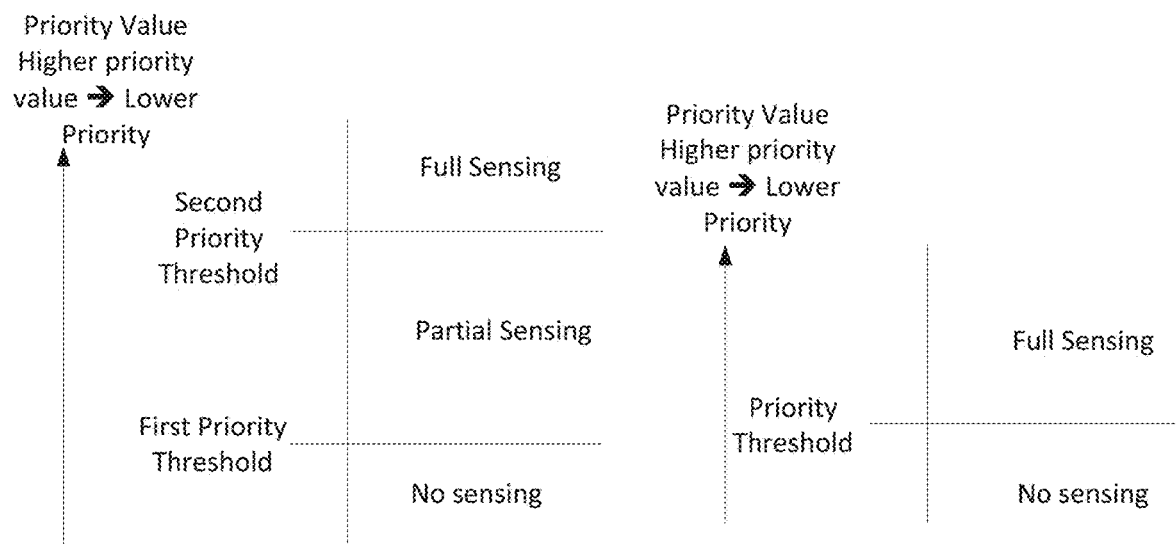
Figure 7M:
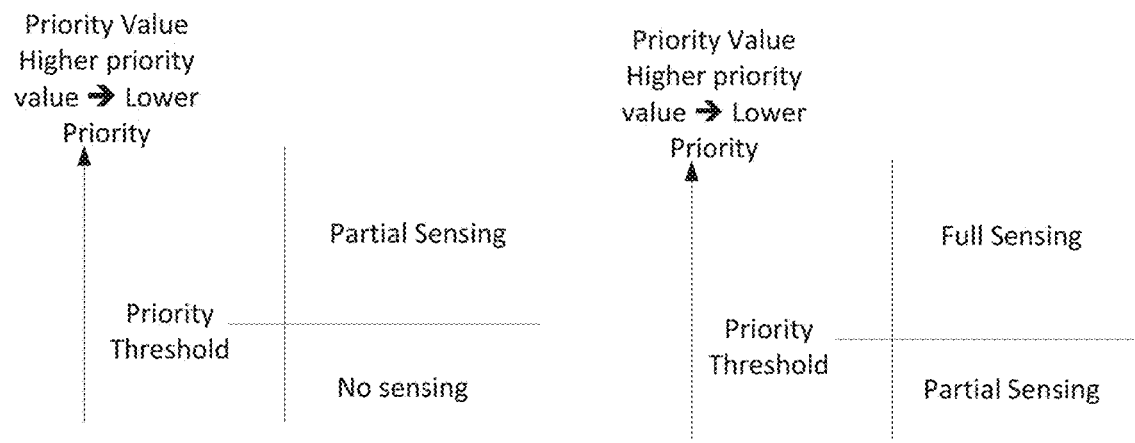

In another example, the order of full sensing, partial sensing and no sensing is reversed as illustrated in the examples of FIG. 7M.

In another example A1.8, one or more priority thresholds are provided, for each priority value range as determined by the priority thresholds, the allowed sensing modes in that priority value range are configured.

The HARQ error rate is calculated based on the PSFCH feedback.

In one example A2.1, the HARQ error rate is calculated based on the first HARQ transmission.

In another example A2.2, the HARQ error rate is calculated based on the last HARQ (re-)transmission of each packet.

In another example A2.3, the HARQ error rate is calculated based on each HARQ (re-)transmission.

In one example A2.4, the HARQ error rate is calculated based on an exponential average equation: average HARQ error rate at nth iteration=$(1-\alpha)\times$Average HARQ error rate at nth$-1$ iteration+$\alpha\times$HARQ status where, HARQ status is 1 in case of HARQ error (e.g., decoding failure) or 0 in case of no HARQ error (e.g., decoding success). $\alpha$ is the exponential averaging parameter. Wherein, $\alpha$ can be specified in the specifications and/or configured and/or updated by higher layer signaling.

In another example A2.5, the HARQ error rate is calculated based on a sliding window. The sliding window length can be one of: (1) in number of physical slots; (2) in number of logical slots that can belong to a resource pool; (3) in number of logical slots in a resource pool, or (4) in number of PSFCH reception occasions. Wherein, the sliding window can be specified in the specifications and/or configured and/or updated by higher layer signaling.

In one example A2.6, the HARQ error rate is calculated across all priority levels. In another example the HARQ error rate is calculated across each priority level. In another example, the priority levels are organized into groups of priority levels and the HARQ error rate is calculated across each group of priority levels.

In one example A2.7, one or more HARQ error rate thresholds are configured or provided. For each HARQ error rate range as determined by the HARQ error rate thresholds, the allowed sensing modes (e.g., full sensing and/or partial sensing and/or random resource selection (e.g., no sensing)) in that HARQ error rate range are configured or determined.

In another example A2.8, for transition between two consecutive ranges, e.g., range 1 and range 2, two thresholds are provided for hysteresis. For example, if the UE is in range 1, to transition to range 2, the HARQ error rate may be larger than a first threshold $T_{12}$. When the UE is in range 2, to transition to range 1, the HARQ error rate may be less than a second threshold $T_{21}$. Wherein, $T_{12} \geq T_{21}$.

In another example A2.9, one or more HARQ error rate thresholds are configured or provided, and the sensing modes are determined as described in example A1.5 (FIG. 6), example A1.6 (FIG. 7) or example A1.7 (FIG. 8) by replacing the priority value by the HARQ error rate and replacing the priority thresholds by the HARQ error rate thresholds.

The SL channel busy ratio (CBR) measured in a slot n is defined as the portion of sub-channels in a resource pool, measured over a CBR measurement window [n-a, n-1], whose SL RSSI exceeds a (pre-)configured threshold.

In one example A3.1, one or more CBR thresholds are configured or provided. For each CBR range as determined by the CBR thresholds, the allowed sensing modes (e.g., full sensing and/or partial sensing and/or random resource selection (e.g., no sensing) in that CBR range are configured or determined.

In another example A3.2, for transition between two consecutive ranges, e.g., range 1 and range 2, two thresholds are provided for hysteresis. For example, if the UE is in range 1, to transition to range 2, the CBR may be larger than a first threshold $T_{12}$. When the UE is in range 2, to transition to range 1, the CBR may be less than a second threshold $T_{21}$. Wherein, $T_{12} \geq T_{21}$.

In another example A3.3, one or more CBR thresholds are configured or provided, and the sensing modes are determined as described in example A1.5 (FIG. 6), example A1.6 (FIG. 7) or example A1.7 (FIG. 8) by replacing the priority value by the CBR and replacing the priority thresholds by the CBR thresholds.

The SL channel occupancy ratio (CR) in a slot n is defined as the ratio of the total number of sub-channels used for a UE's SL transmission in slots [n−a, n−1] and granted for a UE's SL transmission in slots [n, n+b] over the total number of sub-channels configured in a resource pool over [n, n+b].

In one example A4.1, one or more CR thresholds are configured or provided. For each CR range as determined by the CR thresholds, the allowed sensing modes (e.g., full sensing and/or partial sensing and/or random resource selection (e.g., no sensing) in that CR range are configured or determined.

In another example A4.2, one or more CR thresholds are configured or provided, and the sensing modes are determined as described in example A1.5 (FIG. 6), example A1.6 (FIG. 7) or example A1.7 (FIG. 8) by replacing the priority value by the CR and replacing the priority thresholds by the CR thresholds.

In another example A4.3, for transition between two consecutive ranges, e.g., range 1 and range 2, two thresholds are provided for hysteresis. For example, if the UE is in range 1, to transition to range 2, the CR may larger than a first threshold $T_{12}$. When the UE is in range 2, to transition to range 1, the CR may be less than a second threshold $T_{21}$. Wherein, $T_{12} \geq T_{21}$.

In one example A4.4, the SL CR is calculated based on the SL priority level, the CR thresholds are configured or provided for each priority level. For each priority level, and for each CR range as determined by the corresponding thresholds, the allowed sensing modes in that CR range, and for that priority level are configured or determined.

In another example A4.5, for transition between two consecutive ranges, e.g., range 1 and range 2, two thresholds are provided for hysteresis. For example, if the UE is in range 1, to transition to range 2, the CR of a priority level may be larger than a first threshold $T_{12}$. When the UE is in range 2, to transition to range 1, the CR of a priority level may be less than a second threshold $T_{21}$. Wherein, $T_{12} \geq T_{21}$.

In another example A4.6, one or more CR thresholds for a SL priority level are configured or provided, and the sensing modes are determined as described in example A1.5 (FIG. 6), example A1.6 (FIG. 7) or example A1.7 (FIG. 8) by replacing the priority value by the CR for a SL priority level and replacing the priority thresholds by the CR thresholds for a SL priority level.

Figure 9:
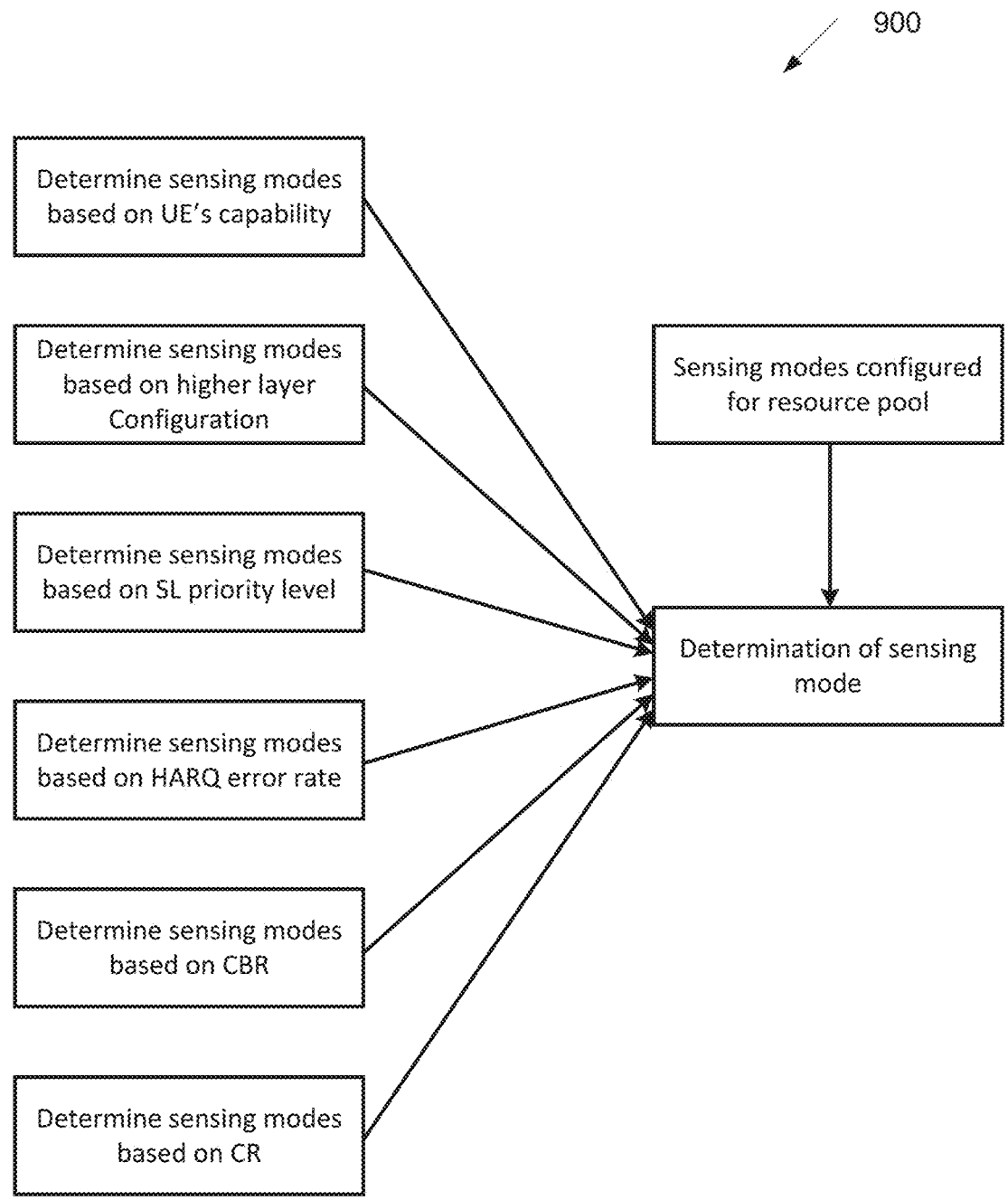
FIG. 9 illustrates an example of sensing mode determination according to embodiments of the present disclosure.

FIG. 9 illustrates an example of sensing mode determination 900 according to embodiments of the present disclosure. An embodiment of the sensing mode determination 900 shown in FIG. 9 is for illustration only.

A UE can determine the sensing mode (e.g., full sensing and/or partial sensing and/or random resource selection (e.g., no sensing)) based on a combination of one or more of the above mentioned criteria and the UE's own implementation as illustrated in FIG. 9.

In one example, the determination of the sensing mode can be performed in a single step considering the configured sensing modes for a resource pool.

In another example, the determining of the sensing mode can be a two-step procedure.

In one example, a first step can determine whether the UE performs full sensing (high-power sensing) or low power sensing, wherein low power sensing includes partial sensing and no sensing (e.g., random resource selection). If the UE determines that the UE is to perform low power sensing, a second step can determine if the UE performs partial sensing or no sensing (e.g., random resource selection).

In another example, a first step can determine whether the UE performs sensing (e.g., full sensing or partial sensing) or no sensing (e.g., random resource selection), wherein sensing includes full sensing and partial sensing. If the UE determines that the UE is to perform sensing, a second step can determine if the UE performs full sensing or partial sensing.

In one example A5.1, a UE can be configured with a TX resource pool, thereafter, referred to as a resource pool, that enables one or more of the following sensing mode combinations: (1) random resource selection (e.g., no sensing); (2) random resource selection (e.g., no sensing) and partial sensing; (3) random resource selection (e.g., no sensing) and full sensing; and (4) random resource selection (e.g., no sensing), partial sensing and full sensing.

The resources of the resource pool are partitioned into groups of resources. Users/traffic/data using random resource selection determine the group of resources to use based on the priority range of the data to be transmitted. For example, there can be N priority ranges for data, and N groups. The number of groups and priority ranges N can be specified in system specification, and/or pre-configured and/or configured/updated by RRC signaling and/or MAC CE signaling and/or L1 control signaling. The priorities within each priority range can be pre-configured and/or configured/updated by RRC signaling and/or MAC CE signaling and/or L1 control signaling.

Figure 10:
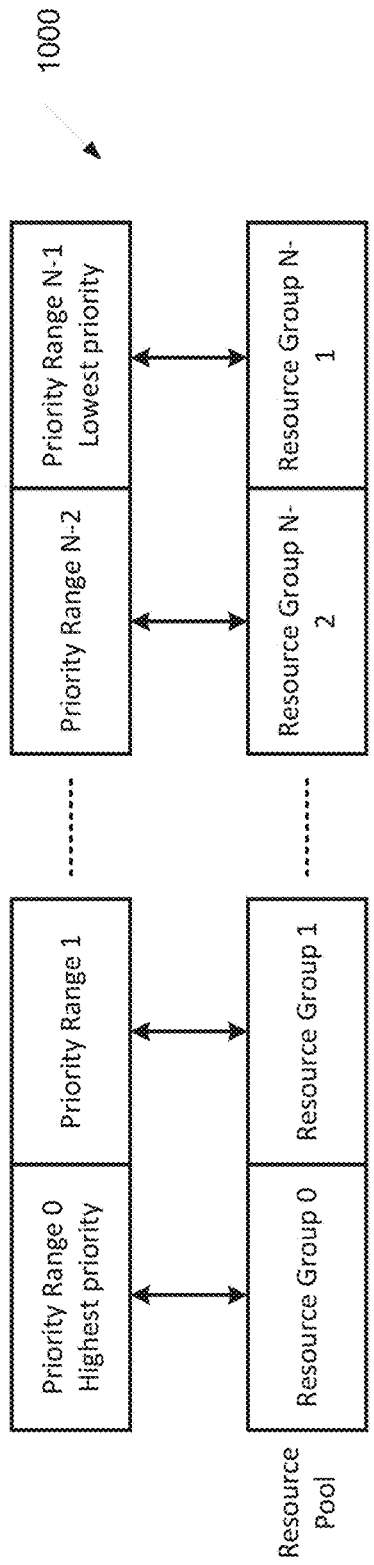
FIG. 10 illustrates an example of resource partitioning according to embodiments of the present disclosure.

FIG. 10 illustrates an example of resource partitioning 1000 according to embodiments of the present disclosure. An embodiment of the resource partitioning 1000 shown in FIG. 10 is for illustration only.

FIG. 10 is an example of mapping data within a priority range to a resource group for data using random resource selection (e.g., no sensing). For example, the allocation of data transmitted using random resource selection to a group based on the priority of the data can be according to: (1) group 0 is used for data transmitted with random resource selection and with the highest priority range; (2) group 1 is used for data transmitted with random resource selection and with the second highest priority range; ... (N−1) group N−2 is used for data transmitted with random resource selection and with the second lowest priority range; and (N) group N−1 is used for data transmitted with random resource selection and with the lowest priority range.

Typically, the system is designed such that data allocated to a group of resources with a higher priority range has a lower collision probability when transmitted than data allocated to a group of resources with a lower priority range.

Figure 11:
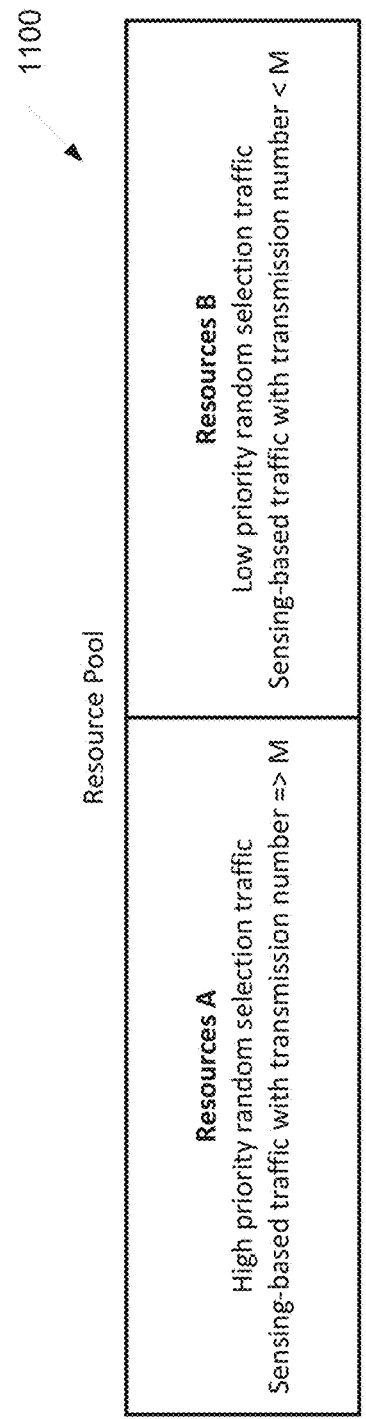
FIG. 11 illustrates an example of resource pool partitioning according to embodiments of the present disclosure.

FIG. 11 illustrates an example of resource pool partitioning 1100 according to embodiments of the present disclosure. An embodiment of the resource pool partitioning 1100 shown in FIG. 11 is for illustration only.

FIG. 11 is an example of resource partitioning within a resource pool into two groups of resources. For users using random resource selection (no sensing): (1) high priority users, e.g., users with priority value below a threshold use resources A. A lower priority value indicates a higher priority; and (2) low priority users, e.g., users with priority value equal to or larger than a threshold use resources B. A higher priority value indicates a lower priority.

Typically, the system is designed such that the probability of collision on resources A is less than the probability of collision on resources B.

For users/traffic/data that use partial sensing and full sensing (e.g., sensing-based traffic), these users can sense the resource of the resource pool before allocating a resource for the transmission of data. A rule can be established such based on the priority (priority value), p, of the data using partial sensing or full sensing and the transmission number, m, the UE can determine the group number to use, i.e.: Group Number=$f(p, m)$ where: (1) p is the priority (priority value) of the data to be transmitted using partial sensing or full sensing; (2) m is the transmission number. For example, m=0 for the initial transmission, m=1 for the first re-transmission, m=2 for the second retransmission; (3) $f$ is a function that determines the mapping between, m and p and the group number for the group of resources to which the data is allocated. In one example, $f$ can depend on whether partial sensing is used or full sensing is used, i.e., there is one function, $f_1$, for full sensing and second function $f_2$ for partial sensing. In another example, $f$ is independent of whether partial sensing or full sensing is used, i.e., the same function, $f$, is used for full sensing and partial sensing. In one example, the function, $f$, is configured as list or a look-up-table by RRC signaling.

In one example of function, $f$, the higher the priority, p, the lower or the same the group number, wherein a lower group number is associated with higher priority data using random resource selection.

In one example of function, $f$, the higher the transmission number, m, the lower or the same the group number, wherein a lower group number is associated with higher priority data using random resource selection.

As illustrated in FIG. 11, for users that use partial sensing and full sensing, these users can sense resources B and determine an available resource there to use. There is a still a possibility that the transmission from a user with partial sensing or full sensing collides with a transmission from a user with random resource selection. When a user with partial sensing or full sensing retransmits the data, the use can choose between resources A (with lower collision probability) or resources B (with higher collision probability) based on the transmission number m, wherein, m=0 for the initial transmission, m=1 for the first re-transmission, m=2 for the second retransmission.

When the transmission number is less than (or less than or equal to) M, sensing-based data uses resources B, when the transmission number is greater than or equal to (or greater than) M, sensing-based data uses resources A. The threshold M can depend on the priority of the data. M can be pre-configured and/or configured/updated by RRC signaling and/or MAC CE signaling and/or L1 control signaling. A single value of M can be configured for all priority levels (or priority ranges), or a priority-specific value of M (priority) can be configured for each priority level (priority range).

The decision to use A or B can be based on the priority of data and transmission number for example: (1) for high priority traffic (with full sensing or partial sensing), the initial transmission uses resources B, and starting from the first retransmission resources A are used (M=1); (2) for medium priority traffic (with full sensing or partial sensing), the initial transmission and first re-transmission use resources B and starting from the second retransmission resources A are used (M=2); and (3) for low priority traffic (with full sensing or partial sensing), the initial transmission, and first and second re-transmissions use resources B and starting from the third retransmission resources A are used (M=3).

In the present disclosure, a UE is (pre-)configured to operate in partial sensing mode. In one embodiment, a UE senses slots with a periodicity to determine the available candidate resources for SL resource selection (e.g., periodic based partial sensing (PBPS)).

Figure 12:
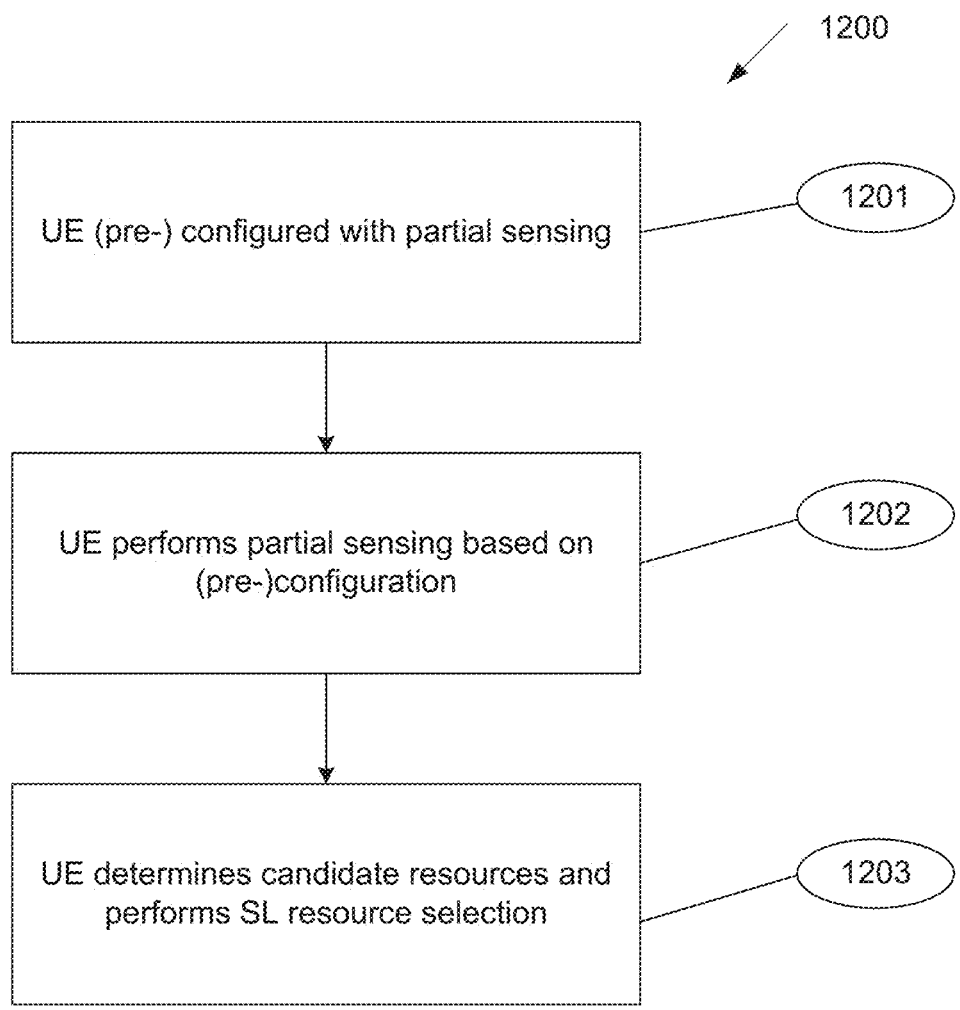
FIG. 12 illustrates a flowchart of a UE procedure for performing partial sensing according to embodiments of the present disclosure.

FIG. 12 illustrates a flowchart of a UE procedure 1200 for performing partial sensing according to embodiments of the present disclosure. The UE procedure 1200 as may be performed by a UE (e.g., 111-116 as illustrated in FIG. 1. An embodiment of the UE procedure 1200 shown in FIG. 12 is for illustration only. One or more of the components illustrated in FIG. 12 can be implemented in specialized circuitry configured to perform the noted functions or one or more of the components can be implemented by one or more processors executing instructions to perform the noted functions.

FIG. 12 illustrates an example of the procedure of a UE performing partial sensing.

As illustrated in step 1201, a UE is (pre-)configured with partial sensing. In this discourse further examples are provided for the parameters of partial sensing, such as the resource selection window, the candidate slots within the resource selection window, the sensing for the candidate resources within the resource selection window, including the sensing periodicities and which periods to sense (e.g., partial sensing periodic sensing occasions for a given periodicity). A UE can be further be configured to transmit periodic traffic.

In step 1202, a UE performs partial sensing following the partial sensing configuration of step 1201. e.g., PBPS. In step 1203, a UE determines the candidate resources as a result of partial sensing in step 1201, and performs SL resource selection within the candidate resources In the following examples time can be expressed in one of following as shown below.

In one example of logical slots within a resource pool: (1) a logical slot index for a slot within a resource pool is denoted as $T'^{SL}_i$; and (2) a time period expressed in logical slots within a resource pool is denoted as T'.

In another example of logical slots that can be in a resource pool, these are the SL slots before the application of the resource pool bitmap as described in 3GPP standard specification and earlier in this disclosure: (1) a logical slot index for a slot that can be in a resource pool is denoted as $t^{SL}_i$; (2) a time period expressed in logical slots that can be in a resource pool is denoted as T'. While this is the same notation as used for logical slots within a resource pool the value is different and it may be apparent from the context which value to use.

In yet another example of physical slots or physical time: (1) a Physical slot number (or index) is denoted as n or n'. n is the physical slot number of any physical slot, while n' is the physical slot number of a slot in the resource pool; and/or (2) a time period is expressed as physical time (e.g., in milliseconds (ms)) or in units of physical slots.

When used in the same equation, time units may be the same, i.e.: (1) if logical slots within a resource pool are used in an equation, inequality or expression, the time period in the same equation, inequality or expression may be expressed in units of logical slots within a resource pool; (2) if logical slots that can be in a resource pool are used in an equation, inequality or expression, the time period in the same equation, inequality or expression may be expressed in units of logical slots that can be in a resource pool; and (3) if physical slots are used in an equation, inequality or expression, the time period in the same equation, inequality or expression may be expressed in units of physical slots or physical time scaled by the slot duration.

Time units can be converted from one unit to another.

In one example, for each logical slot index for a slot within a resource pool there is a corresponding physical slot number. The converse is not true, i.e., not every physical slot corresponds to a logical slot within a resource pool. When converting from physical slot number to logical slot index: (1) if the physical slot is in the resource pool, the corresponding logical slot index within the resource pool is determined; and (2) if the physical slot is not in the resource pool, the index of an adjacent logical slot within the resource pool is determined, wherein one of: (i) the adjacent logical slot is the next logical slot after the physical slot; or (ii) the adjacent logical slot is the pervious logical slot before the physical slot.

In another example, to convert from physical time (in ms) to time in units of logical slots within a resource pool, the following equation can be used, wherein T is in units of ms and T' is in units of logical slots within a resource pool:

$$T' = \left\lceil \frac{T'_{max}}{10240 \text{ ms}} \times T \right\rceil$$

where, $T'_{max}$ is the number of logical slots within the resource pool in 1024 frames or 10240 ms.

The slot index or the time period provided by higher layers or specified in the specifications can be given in one unit, e.g., in physical slots or in ms, and is converted to a logical slot index or units of logical slots within a resource pool before being used in the corresponding equations, or vice versa.

In one example 1.1, a UE is configured with a resource pool with periodic reservations. In this disclosure, a resource pool with periodic reservations is a resource pool for which an initial transmission of a transport block can be reserved by an SCI associated with a different transport block, for example a resource pool with periodic reservations can have higher layer parameter sl-MultiReserveResource enabled. The UE is further configured to transmit periodic traffic. The periodicity of the periodic traffic is $T_{per}$ slots.

In one example, $T_{per}$ slots is given in number of physical slots.

In another example, $T_{per}$ slots is given as the corresponding physical time duration e.g., in units of ms.

In another example, $T_{per}$ slots is given in number of logical slots that can be in a resource pool.

In another example, $T_{per}$ slots is given in number of logical slots that are in a resource pool.

Resource selection/reselection for a periodic traffic is triggered in a slot n. In one example, slot n can be the slot in which candidate resources within a resource selection window are determined or identified e.g., based on sensing results and resource exclusion of reserved resources from resource selection window. These resources are provided to higher layers.

In one example, slot n is given as a physical slot number.

In another example, slot n is given as a logical slot index of a slot that can be in the resource pool.

In another example, slot n is given as a logical slot index of a slot that is in the resource pool.

For the next periodic instance of the periodic traffic, resource selection/reselection is triggered in slot $n+T_{per}$. When added together, n and $T_{per}$ are in the same unit. The following periodic instance of the periodic traffic is triggered in slot $n+2T_{per}$, and so on. A UE configured with a periodicity $T_{per}$ of the periodic traffic and triggered for resource selection/reselection in slot n, can determine the next slots of resource selection/reselection as $n+T_{per}$, $n+2\ T_{per}$, ... as illustrated in FIG. 13.

Figure 13:
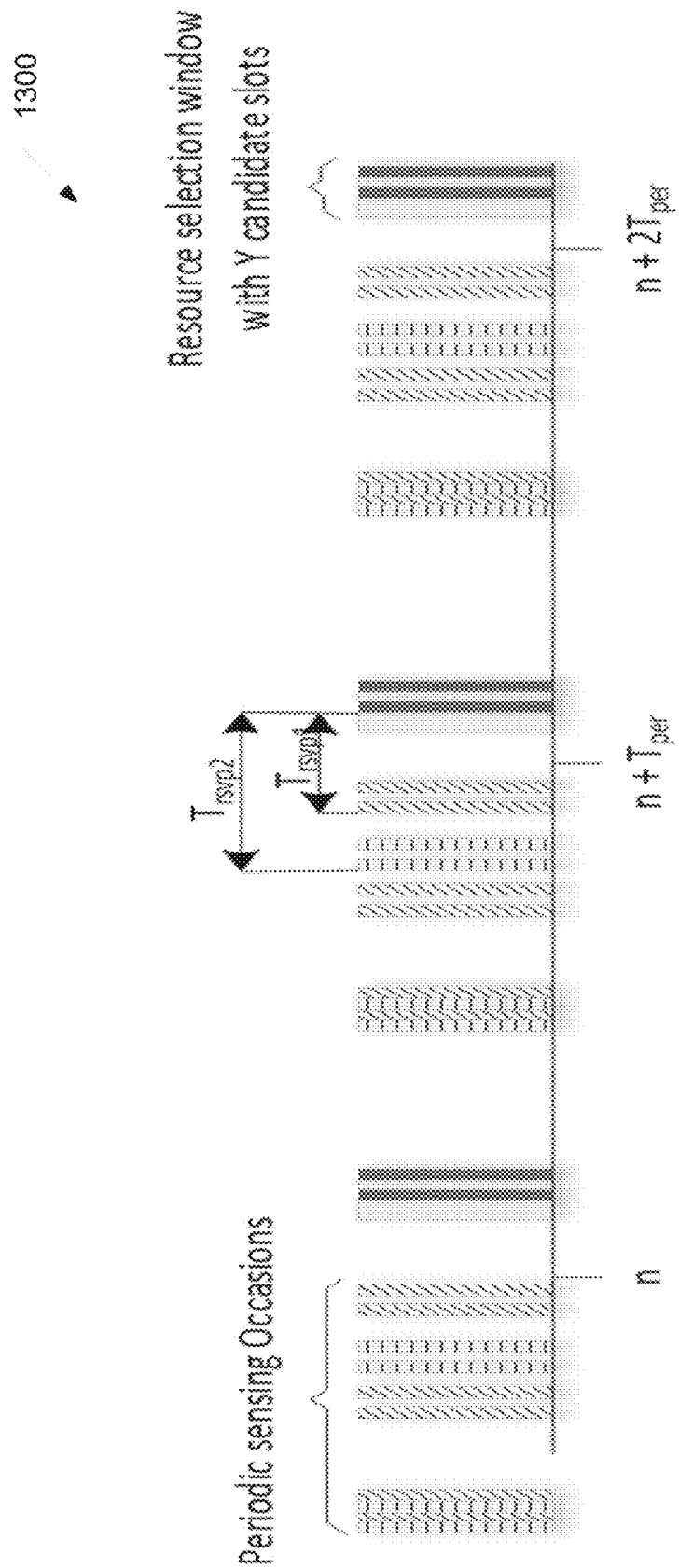
FIG. 13 illustrates an example of periodic sensing occasions and resource selection window according to embodiments of the present disclosure.

FIG. 13 illustrates an example of periodic sensing occasions and resource selection window 1300 according to embodiments of the present disclosure. An embodiment of the periodic sensing occasions and resource selection window 1300 shown in FIG. 13 is for illustration only.

For resource selection/reselection triggered in slot n. The resource selection/reselection window starts in slot $n+T_1$, and ends in slot $n+T_2$, i.e., the resource section window is $[n+T_1, n+T_2]$. Wherein, $T_1$ is up to UE implementation within range: $0 < T_1 \leq T_{proc,1}^{SL}$, and $T_2$ is less than or equal the packet delay budget (PDB), subject to minimum constraint $T_{2min}$, i.e., if $T_{2min}$<Packet Delay Budget, $T_{2min} \leq T_2 \leq$Packet delay budget, else $T_2$=packet delay budget. In one example, $T_{proc,1}^{SL}$ is as described in Table 8.1.4-2 of TS 38.214. For example, $T_{proc,1}^{SL}$ is the resource selection processing time.

In one example 2.1, $T_{2min}$ for partial sensing is the same as $T_{2min}$ for full sensing as defined in release 16.

In another example 2.2, a separate value for $T_{2min}$ is configured for partial sensing that is separate from the $T_{2min}$ configured for full sensing. In one example 2.2.1, $T_{2min}$ for partial sensing is configured for each priority level. In another example 2.2.2, $T_{2min}$ for partial sensing is configured as a single value for all priority levels.

In another example 2.3, a separate value for $T_{2min}$ can be configured for partial sensing that is separate from the $T_{2min}$ configured for full sensing. If a separate value of $T_{2min}$ is configured for partial sensing, that value is used for partial sensing, otherwise, if a separate value of $T_{2min}$ is not configured for partial sensing, the $T_{2min}$ configured for full sensing is used for partial sensing.

In one example 2.3.1, $T_{2min}$ for partial sensing is configured for each priority level.

In another example 2.3.2, $T_{2min}$ for partial sensing is configured as a single value for all priority levels.

In another example 2.4, a maximum value of $T_2$ is configured, $T_{2max}$. $T_2$ is up to UE implementation within the range: $\min(T_{2min}$, packet delay budget$) \leq T_2 \leq \min(T_{2max}$, packet delay budget) i.e.: if $T_{2max}$<Packet Delay Budget, $T_{2min} \leq T_2 \leq T_{2max}$, else if $T_{2min}$<Packet Delay Budget and $T_{2max} \geq$Packet Delay Budget, $T_{2min} \leq T_2 \leq$packet delay budget, else $T_2$=Packet delay budget.

In one example 2.4.1, $T_{2max}$ for partial sensing is configured for each priority level.

In another example 2.4.2, $T_{2max}$ for partial sensing is configured as a single value for all priority levels.

In another example 2.4.3, if $T_{2max}$ for partial sensing is not configured, $T_{2max}$ is set equal to the packet delay budget.

In the above, $T_1$, $T_2$, $T_{proc,1}^{SL}$, $T_{2min}$ and $T_{2max}$ can be specified or configured in the same or in different time units, wherein a time unit can be in physical slots, in physical time, in units of logical slots that can be in a resource pool or in units of logical slots that are in resource pool. Before adding or comparing to another time or to slot n, all slots and time units are converted to the same unit.

Figure 14:
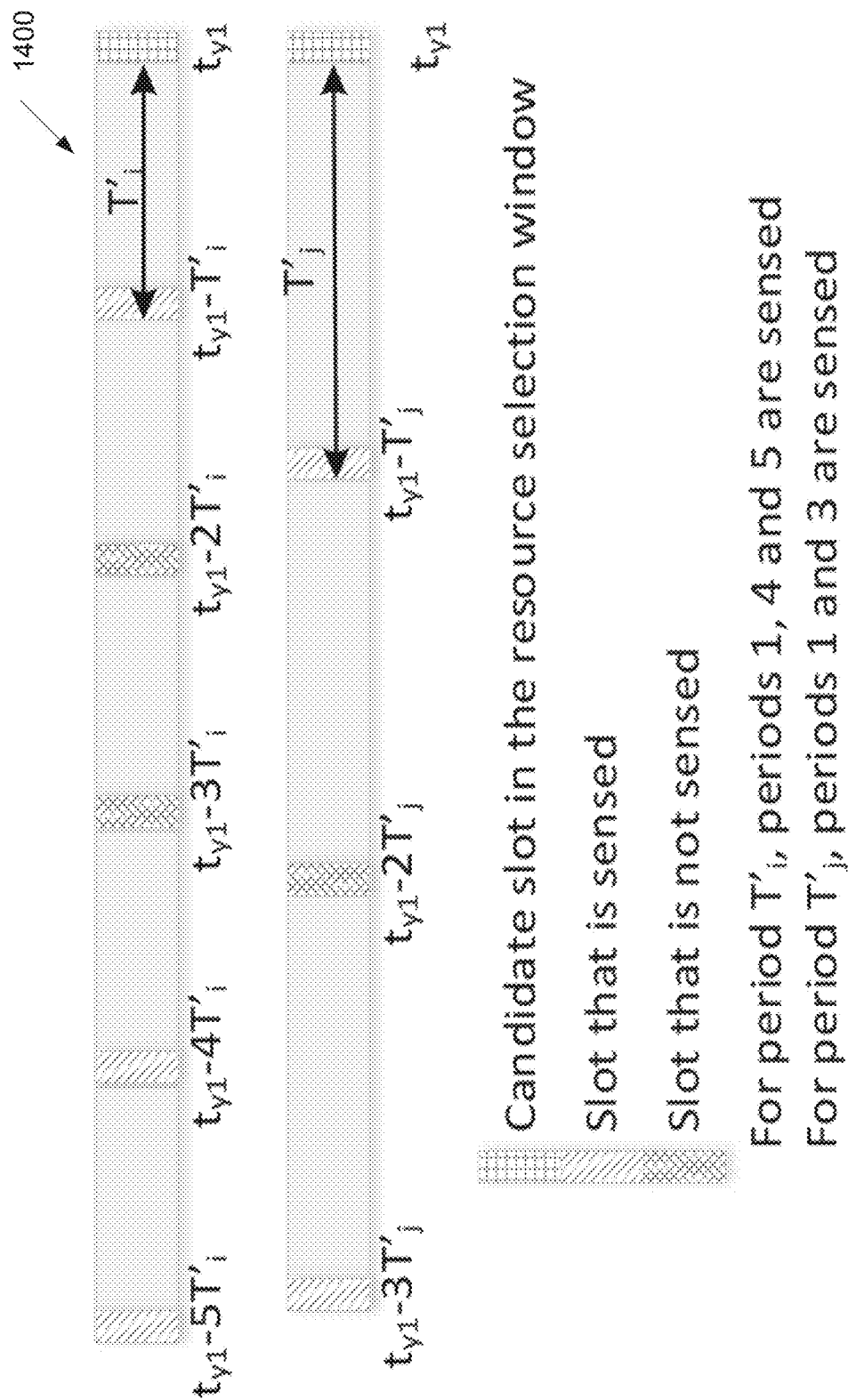
FIG. 14 illustrates an example of candidate slot determination according to embodiments of the present disclosure.

FIG. 14 illustrates an example of sensing slot determination 1400 for a candidate slot within the resource selection window according to embodiments of the present disclosure. An embodiment of the candidate slot determination 1400 shown in FIG. 14 is for illustration only.

Within the resource selection/reselection window, the UE determines Y candidate slots and sensing slots are determined based on each of the Y candidate slots as illustrated in FIG. 14. The determination of the Y candidate slots is up to the UE's implementation subject to a minimum value $Y_{min}$, $Y \geq Y_{min}$.

In one example 3.1, $Y_{min}$ depends on a maximum number of HARQ re-transmissions.

In another example 3.2, $Y_{min}$ depends on a packet delay budget.

In another example 3.3, $Y_{min}$ depends on a length of the resource selection/reselection window, i.e., $T_2-T_1$.

In another example 3.4, $Y_{min}$ depends on a periodicity of the SL traffic.

In another example 3.5, $Y_{min}$ depends on a priority level of SL traffic.

In another example 3.6, $Y_{min}$ depends on a CBR.

In another example 3.7, $Y_{min}$ depends on a HARQ error rate.

$Y_{min}$ can depend on one or more of the maximum number of HARQ re-transmissions, the packet delay budget, the length of the resource selection/reselection window, the periodicity of the SL traffic, the priority level of SL traffic and/or the CBR and/or HARQ error rate. The dependence of $Y_{min}$ on the one or more parameters can be specified in the system specifications and/or (pre-)configured and/or updated by higher layers for example by configuring a $Y_{min}$ for each parameter range as illustrated in TABLE 3.

TABLE 3

Example of configuration of $Y_{min}$ for each parameter range

| Parameter (P) (e.g., Number of HARQ retransmissions, packet delay budget, etc.) Range | $Y_{min}$ Value |
|---|---|
| P < R1 | $Y_{min0}$ |
| R1 ≤ P < R2 | $Y_{min1}$ |
| ... | ... |
| R_N ≤ P | $Y_{minN}$ |

Furthermore, or alternatively, $Y_{min}$ or a range of $Y_{min}$ can be configured by higher layers.

A resource pool with periodic reservations, and for which Y candidate slots are determined in the resource selection/reselection window, wherein, the Y determined candidate slots can be expressed as: $\{t'^{SL}_y\}$, wherein y=0 ... Y−1, wherein $Y \geq Y_{min}$. For each candidate slot $t'^{SL}_y$, one or more previous slots are sensed based on one or more periodicities as illustrated in FIG. 14. In one example, $t'^{SL}_y$ are in logical slots within the resource pool. In another example, $t'^{SL}_y$ corresponds to slots within a resource pool but are expressed as logical slots that can be in a resource pool. In another example, $t'^{SL}_y$ corresponds to slots within a resource pool but are expressed as physical slots.

For each candidate slot $t'^{SL}_{y1}$, a set of slots: $\{t'^{SL}_{y1-k_i \times T'_i}\}$ are sensed, wherein; $T'_i$ is the periodicity of sensing, there can be one or more sensing periodicities $\{T'_1, T'_2, \ldots, T'_I\}$, wherein I≥1.

In one example 3.7.1, $t'^{SL}_{y1-k_1 \times T'_i}$ are in logical slots within the resource pool and $T'_i$ is in units of logical slots within the resource pool, if $T'_i$ is configured in units of physical time, e.g., in millisecond or in physical slots, it is converted into logical slots within the resource pool.

In another example 3.7.2, $t'^{SL}_y$ corresponds to slots within a resource pool but are m, expressed as logical slots that can be in a resource pool, if $t'^{SL}_{y1-k_1 \times T'_i}$ is not inside the resource pool an adjacent slot inside the resource pool is selected instead, the adjacent slot can be the preceding slot in the resource pool or the succeeding slot in the resource pool, and $T'_i$ is in units of logical slots that can be in the resource pool, if $T'_i$ is configured in units of physical time, e.g., in millisecond or in physical slots, it is converted into logical slots that can be in a resource pool.

In another example 3.7.3, $t'^{SL}_y$ correspond to a slot within a resource pool but expressed as physical slot number n, $T_i$ is the periodicity corresponding to $T'_i$ in physical slots or in physical time scaled by the slot duration. If $T'_i$ is configured in logical slots that are within the resource pool, or $T'_i$ is configured in logical slots that can be in the resource pool, $T'_i$ is converted to physical slots $T_i$. If $n+T_i$ is not inside the resource pool an adjacent slot in the resource pool is selected instead, the adjacent slot can be the preceding slot in the resource pool or the succeeding slot in the resource pool.

$K_i$ indicates the periods (or periodic sensing occasions) to sense for periodicity $T_i$, i.e., the periodic sensed occasions for periodicity $T_i$. $K_i = \{k_{i0}, k_{i1}, \ldots\}$, wherein $k_{i0}, k_{i1}, \ldots$ are the sensed periods (or periodic sensing occasions) for sensing periodicity $T_i$.

FIG. 14 illustrates an example with two sensing periodicities, $T'_i$ and $T'_j$. For periodicity $T'_i$, periods (i.e., periodic sensing occasions) 1, 4 and 5 contain slots that are sensed. For periodicity $T'_j$, periods (i.e., periodic sensing occasions) 1 and 3 contain slots that are sensed.

In one example 4.1, the periods that are sensed (the periodic sensed occasions) are the same across all periodicities, i.e., $K_1 = K_2 = \ldots = K_I = K$. $K = \{k_0, k_1, \ldots\}$, wherein $k_0, k_1, \ldots$ are the sensed periods (or periodic sensing occasions) for any sensing periodicity.

In another example 4.2, the periods that are sensed (the periodic sensed occasions) depend on the periodicity.

In one example 4.3, the number of periods that are sensed (number of periodic sensed occasions) are the same across all periodicities, i.e., $|K_1|=|K_2|= \ldots =|K_I|=|K|$. Wherein, $|K_i|$ denotes the number of periods that are sensed in $K_i$.

In another example 4.4, the number of periods that are sensed (number of periodic sensed occasions) depends on the periodicity.

In one example 4.5, the earliest period that is sensed (earliest periodic sensed occasion) is the same across all periodicities, i.e., $\max(K_1)=\max(K_2)= \ldots =\max(K_I)=\max(K)$. Wherein, $\max(K_1)$ denotes the largest (or earliest) period (or periodic sensing occasion) that is sensed in $K_1$.

In another example 4.6, the earliest period that is sensed (earliest periodic sensed occasion) depends on the periodicity.

In one example 4.7, $K_i$ or K is specified in the system specifications and/or (pre-) configured and/or updated by RRC signaling and/or MAC CE signaling and/or L1 control signaling. For example, a system specified value of $K_i$ or K is used unless that value is updated by (pre-)configuration.

In one example 4.8, $|K_i|$ or $|K|$ is specified in the system specifications and/or (pre-) configured and/or updated by RRC signaling and/or MAC CE signaling and/or L1 control signaling. For example, a system specified value of $|K_i|$ or $|K|$ is used unless that value is updated by (pre-)configuration. In a further example, $|K_i|$ or $|K|$ can depend on one or more parameters as described below.

In one example 4.8.1, $|K_i|$ or $|K|$ depends on a a maximum number of HARQ re-transmissions.

In another example 4.8.2, $|K_i|$ or $|K|$ depends on a packet delay budget.

In another example 4.8.3, $|K_i|$ or $|K|$ depends on a length of the resource selection/reselection window, i.e., $T_2-T_1$.

In another example 4.8.4, $|K_i|$ or $|K|$ depends on a periodicity of the SL traffic.

In another example 4.8.5, $|K_i|$ or $|K|$ depends on a priority level of SL traffic.

In another example 4.8.6, $|K_i|$ or $|K|$ depends on a CBR.

In another example 4.8.7, $|K_i|$ or $|K|$ depends on a HARQ error rate.

The dependence of $|K_i|$ or $|K|$ on the one or more parameters can be specified in the system specifications and/or (pre-)configured and/or updated by higher layers for example by configuring a $|K_i|$ or $|K|$ for each parameter range as illustrated in TABLE 4. For example, values for the ranges in TABLE 4 can be specified in the system specification and used, unless these values are updated by (pre-)configuration signaling.

TABLE 4

Example of configuration of $|K_i|$ or $|K|$ for each parameter range

| Parameter (P) (e.g., Number of HARQ retransmissions, packet delay budget, etc.) Range | $|K_i|$ or $|K|$ Value |
|---|---|
| P < R1 | $K_0$ |
| R1 ≤ P < R2 | $K_1$ |
| ... | ... |
| R_N ≤ P | $K_N$ |

In one example 4.9, $\max(K_i)$ or $\max(K)$ is specified in the system specifications and/or (pre-)configured and/or updated by RRC signaling and/or MAC CE signaling and/or L1 control signaling. For example, a system specified value of $\max(K_i)$ or $\max(K)$ is used unless that value is updated by (pre-)configuration.

In one example 4.10, $K_i$ is a bitmap, wherein each bit corresponds to a period, a bit is set to logical "1" if the slot within the corresponding period is sensed, otherwise the bit is set to logical "0". $|K_i|$ or $|K|$ corresponds to the number of ones in the bitmap, i.e., the number of sensed slots. In FIG. 14, $|K_i|$=3 and $|K_j|$=2. $\max(K_i)$ or $\max(K)$ corresponds to one of; (1) the length of the bitmap, or (2) last (earliest) period with a bit set to 1 in the bitmap. In FIG. 14, $\max(K_i)$=5 and $\max(K_j)$=3.

In one example 4.10.1, the first (latest) period corresponds to the least significant bit in the bitmap. The last (earliest) period corresponds to the most significant bit in the bitmap. In FIG. 14, $K_i$=11001 and $K_j$=101.

In another example 4.10.2, the first (latest) period corresponds to the most significant bit in the bitmap. The last (earliest) period corresponds to the least significant bit in the bitmap. In FIG. 14, $K_i$=10011 and $K_j$=101.

Wherein, bitmap $K_i$ or $K$ can be specified in the system specifications and/or (pre-) configured and/or updated by RRC signaling and/or MAC CE signaling and/or L1 control signaling. For example, a system specified bitmap is used unless that bitmap is updated by (pre-) configuration.

In one example 4.11, $K_i$ or $K$ is a set of periods that are sensed, wherein the period is represented by the period number before slot $t'_{y1}{}^{SL}$. In the example of FIG. 14, $K_i$={1, 4, 5} and $K_j$={1, 3}. $|K_i|$ or $|K|$ corresponds to the cardinality of set $K_i$, or $K$. In the example of FIG. 14, $|K_i|$=3 and $|K_j|$=2. $\max(K_i)$ or $\max(K)$ corresponds to the maximum value in set $K_i$, or $K$. In the example of FIG. 14, $\max(K_i)$=5 and $\max(K_j)$=3. Where, set $K_i$ or $K$ can be specified in the system specifications and/or (pre-)configured and/or updated by RRC signaling and/or MAC CE signaling and/or L1 control signaling. For example, a system specified set of periodic sensing occasions is used unless that set of periodic sensing occasions is updated by (pre-)configuration.

In one example 4.12.1, $K_i$ or $K$ can depend on slot $t'_{y1}{}^{SL}$ within the resource selection/reselection window, wherein the dependence can be by (pre-)configuration and/or by system specification (e.g., based on a rule).

In another example 4.12.2, $K_i$ or $K$ doesn't depend on slot $t'_{y1}{}^{SL}$ within the resource selection/reselection window.

In one example 4.13.1, $|K_i|$ or $|K|$ can depend on slot $t'_{y1}{}^{SL}$ within the resource selection/reselection window, wherein the dependence can be by (pre-)configuration and/or by system specification (e.g., based on a rule).

In another example 4.13.2, $|K_i|$ or $|K|$ doesn't depend on slot $t'_{y1}{}^{SL}$ within the resource selection/reselection window.

In one example 4.14.1, $\max(K_i)$ or $\max(K)$ can depend on slot $t'_{y1}{}^{SL}$ within the resource selection/reselection window, wherein the dependence can be by (pre-)configuration and/or or by system specification (e.g., based on a rule).

In another example 4.14.2, $\max(K_i)$ or $\max(K)$ doesn't depend on slot $t'_{y1}{}^{SL}$ within the resource selection/reselection window.

In one example 4.15, slot $t'_{y1}{}^{SL}$ is within a resource selection/reselection window triggered in a slot n. The number of periods (e.g., periodic sensing occasions) that are sensed for periodicity $T'_i$ is $|K_i|$. The periods sensed are one of; (1) the latest $|K_i|$ or $|K|$ periods (e.g., periodic sensing occasions) with a sensed slot corresponding to slot $t'_{y1}{}^{SL}$, occurring before slot n or before slot n'. (2) the $K_i$ or $K$ periods (e.g., periodic sensing occasions) with a sensed slot corresponding to slot $t'_{y1}{}^{SL}$, occurring before slot n or before slot n'.

Figure 15:
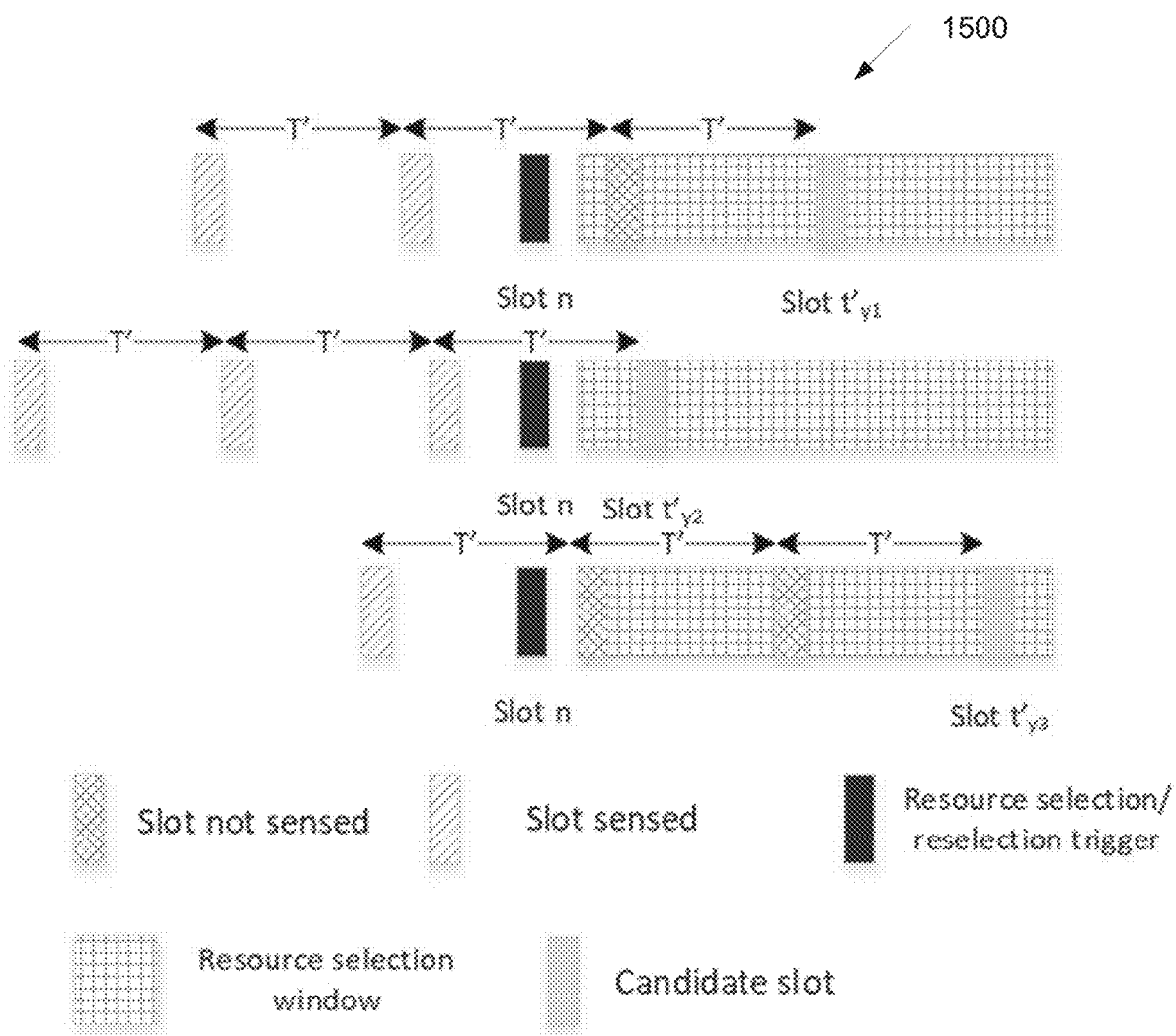
FIG. 15 illustrates an example of sensing slots according to embodiments of the present disclosure.

FIG. 15 illustrates an example of sensing slots according 1500 to embodiments of the present disclosure. An embodiment of the sensing slots according 1500 shown in FIG. 15 is for illustration only.

FIG. 15 illustrates an example of sensing slots for different candidate slots.

As illustrated in FIG. 15, in the first row, the first would be sensing slot before candidate slot $t'_{y1}{}^{SL}$, is after slot n and is not sensed. The next two would be sensing slots are before slot n and are sensed. Would be sensing slots occur at period T' before candidate slot $t'_{y1}{}^{SL}$. In the second row, all three would be sensing slots before candidate slot $t'_{y2}{}^{SL}$, are before slot n and are sensed. Would be sensing slots occur at period T' before candidate slot $t'_{y2}{}^{SL}$. In the third row, the first two would be sensing slots before candidate slot $t'_{y3}{}^{SL}$, are after slot n and are not sensed. The next would be sensing slots is before slot n and is sensed. Would be sensing slots occur at period T' before candidate slot $t'_{y3}{}^{SL}$.

In one example 4.15.1, slot n is a logical slot within the resource pool. slot n' is the same as slot n.

In another example 4.15.2, slot n is a logical slot that can be in the resource pool. If slot n is in the resource pool, slot n' is the same as slot n, otherwise, slot n' is the next (or previous) slot after (or before) slot n that is in the resource pool.

In another example 4.15.3, slot n is a physical slot. If slot n is in the resource pool, slot n' is the same as slot n, otherwise, slot n' is the next (or pervious) slot after (or before) slot n that is in the resource pool.

In one example 4.16, slot $t'_{y1}{}^{SL}$ is within a resource selection/reselection window triggered in slot n. The number of periods that are sensed for periodicity $T'_i$ is $|K_i|$. The periods sensed are one of: (1) the latest $|K|$ or $|K|$ periods with a sensed slot corresponding to slot $t'_{y1}{}^{SL}$, occurring before $T_0$ (or $T_{proc,0}{}^{SL}$, wherein $T_{proc,0}{}^{SL}$ is as define in Table 8.1.4-1 of TS 38.214) before slot n or before $T_0$ (or $T_{proc,0}{}^{SL}$) before slot n'. For example, $T_{proc,0}$ is the sensing processing latency time. (2) the $K_i$ or $K$ periods with a sensed slot corresponding to slot $t'_{y1}{}^{SL}$, occurring before $T_0$ (or $T_{proc,0}{}^{SL}$) before slot n or before $T_0$ (or $T_{proc,0}{}^{SL}$) before slot n'. For example, if K={1,2}, the most recent and the second recent most periodic sensing occasions occurring before (or earlier than) $T_0$ (or $T_{proc,0}{}^{SL}$) before slot n for each sensing periodicity T and corresponding to each selected slot $t'_y{}^{SL}$ are sensed. Wherein, $T_0$, in physical slots or physical time, or $T'_0$, in logical slots, is the processing latency for sensing, e.g. $T_{proc,0}{}^{SL}$ is as define in Table 8.1.4-1 of TS 38.214. $T_0$ or $T'_0$ can be specified in the system specifications and/or (pre-)configured and/or updated by RRC signaling and/or MAC CE signaling and/or L1 control signaling. $T_0$ or $T'_0$ (or $T_{proc,0}{}^{SL}$) can depend on the sub-carrier spacing of the SL bandwidth part (e.g., of the SL channels). For example, $T_{proc,0}{}^{SL}$ is the sensing processing latency time.

Figure 16:
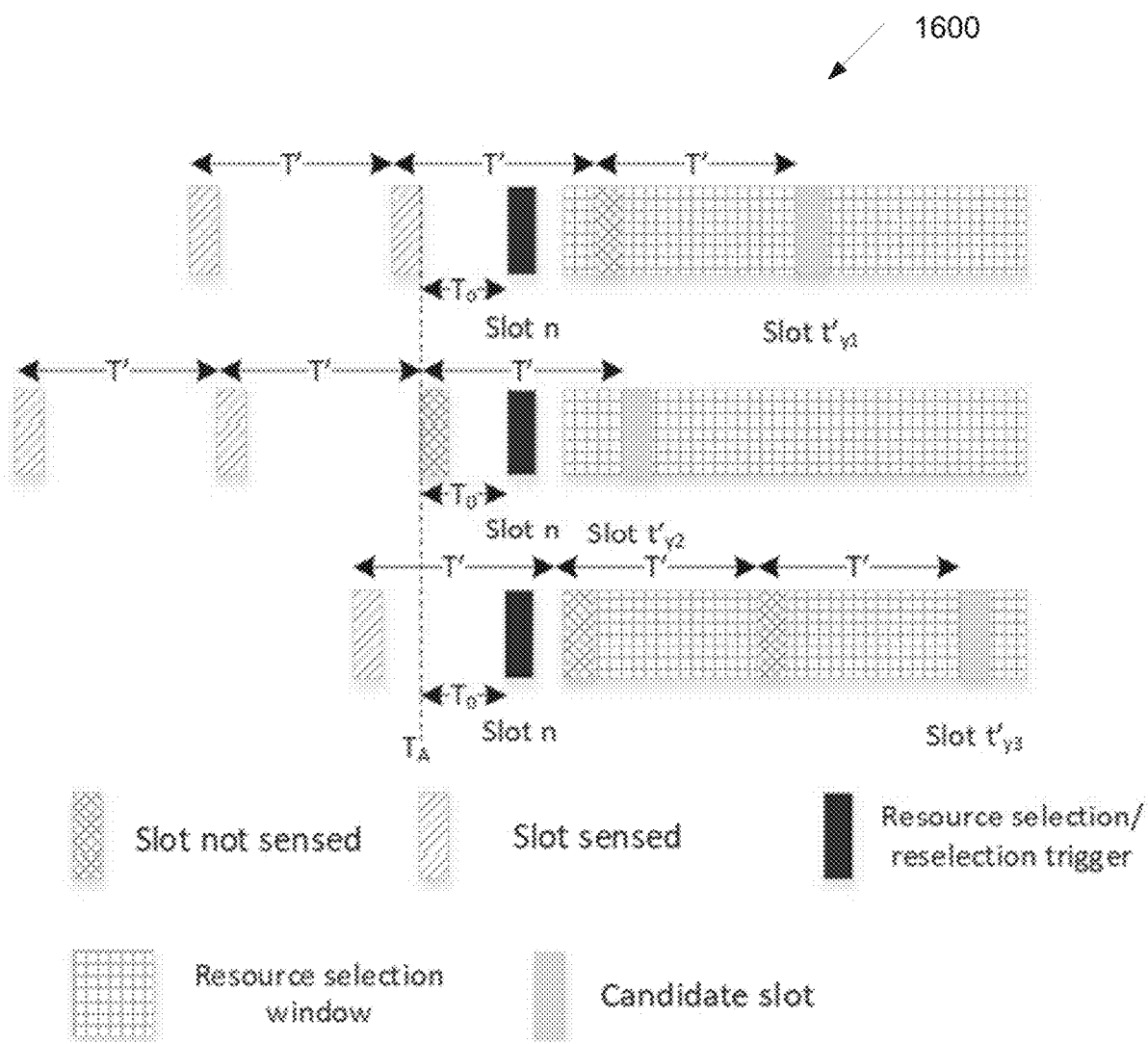
FIG. 16 illustrates another example of sensing slots according to embodiments of the present disclosure.

FIG. 16 illustrates another example of sensing slots 1600 according to embodiments of the present disclosure. An embodiment of the sensing slots 1600 shown in FIG. 16 is for illustration only.

FIG. 16 illustrates an example of sensing slots for different candidate slots. $T_A$ is $T_0$ (or $T_{proc,0}{}^{SL}$) before slot n.

As illustrated in FIG. 16, in the first row, the first would be sensing slot before candidate slot $t'_{y1}{}^{SL}$, is after $T_A$, and is not sensed. The next two would be sensing slots are before $T_A$ and are sensed. Would be sensing slots occur at period T' before candidate slot $t'_{y1}{}^{SL}$. In the second row, the first would be sensing slot before candidate slot $t'_{y2}{}^{SL}$, is after $T_A$, and is not sensed, even though the first is before slot n. The next two would be sensing slots are before $T_A$ and are sensed. Would be sensing slots occur at period T' before candidate slot $t'_{y2}{}^{SL}$. In the third row, the first two would be sensing slots before candidate slot $t'_{y3}{}^{SL}$, are after $T_A$ and are not sensed. The next would be sensing slots is before $T_A$ and is sensed. Would be sensing slots occur at period T' before candidate slot $t'_{y3}{}^{SL}$.

In one example 4.16.1, slot n is a logical slot within the resource pool. slot n' is the same as slot n.

In another example 4.16.2, slot n is a logical slot that can be in the resource pool. If slot n is in the resource pool, slot n' is the same as slot n, otherwise, slot n' is the next (or previous) slot after (or before) slot n that is in the resource pool.

In another example 4.16.3, slot n is a physical slot. If slot n is in the resource pool, slot n' is the same as slot n, otherwise, slot n' is the next (or pervious) slot after (or before) slot n that is in the resource pool.

In one example, if slot $t'_{y0}{}^{SL}$ is the first (or earliest) of the Y selected candidate slots, identification of the of candidate slots for resource selection based on resource exclusion from partial sensing (e.g., periodic based partial sensing) is in a slot n, wherein slot n occurs no later than slot $t'_{y0}{}^{SL}-T_{proc,1}{}^{SL}$, wherein $T_{proc,1}{}^{SL}$ is as defined in Table 8.1.4-2 of TS 38.214. Slot n might or might not be a slot in the resource pool. For example, $T_{proc,1}{}^{SL}$ is the resource selection processing time.

In one example, if slot $t'_{y1}{}^{SL}$ is the first (or earliest) of the Y selected candidate slots, identification of the of candidate slots for resource selection based on resource exclusion from partial sensing (e.g., periodic based partial sensing) is in a slot n, wherein slot n is slot $t'_{y0}{}^{SL}-T_{proc,1}{}^{SL}$, wherein $T_{proc,1}{}^{SL}$ is as defined in Table 8.1.4-2 of TS 38.214. Slot n might or might not be a slot in the resource pool. For example, $T_{proc,1}{}^{SL}$ is the resource selection processing time.

In one example 4.16.4, $T_0$ is in units of logical slots within the resource pool.

In another example 4.16.5, $T_0$ is in units of logical slots that can be in the resource pool.

In another example 4.16.6, $T_0$ (or $T_{proc,0}{}^{SL}$ as described in Table 8.1.4-1 of TS 38.214) is in units of physical slots or physical time. For example, $T_{proc,0}{}^{SL}$ is the sensing processing latency time.

In one example 4.17, slot $t'_{y1}{}^{SL}$ is within a resource selection/reselection window triggered in slot n. Sensing can start no earlier than $T_{sense}$ or $T'_{sense}$ before slot n or slot n'. In one example, $T_{sense}$ is $T_0$ of Rel-16 full sensing as described in para 0092.

In one example 4.17.0.1, slot n is a logical slot within the resource pool. slot n' is the same as slot n.

In another example 4.17.0.2, slot n is a logical slot that can be in the resource pool. If slot n is within the resource pool, slot n' is the same as slot n, otherwise, slot n' is the next (or pervious) slot after (or before) slot n that is within the resource pool.

In another example 4.17.0.3, slot n is a physical slot. If slot n is within the resource pool, slot n' is the same as slot n, otherwise, slot n' is the next (or pervious) slot after (or before) slot n that is within the resource pool.

In one example 4.17.0.4, $T'_{sense}$ is in units of logical slots within a resource pool.

In another example 4.17.0.5, $T'_{sense}$ is in units of logical slots that can be in a resource pool.

In another example 4.17.0.6, $T_{sense}$ is in units of physical time (e.g., milliseconds) or physical slots.

In the following examples, $T'_{sense}$, $T'_i$, $t'_{y1}{}^{SL}$, n and n' are all converted to a same unit which is one of: logical slots within a resource pool, or logical slots that can be in a resource pool or physical slots. For convenience, the notation of logical slots within a resource pool is used. However, the same applies to other time units.

In one example 4.17.1, the earliest sensing period (e.g., periodic sensing occasion) $\max(K_i)$ is given by:

$$\max(K_i) = \left\lfloor \frac{T'_{sense}}{T'_i} \right\rfloor.$$

In another example 4.17.2, the earliest sensing period (e.g., periodic sensing occasion) $\max(K_i)$ can't be less than one, and is given by:

$$\max(K_i) = \max\left(\left\lfloor \frac{T'_{sense}}{T'_i} \right\rfloor, 1\right).$$

In a variant, the earliest sensing period (e.g., periodic sensing occasion) $\max(K_i)$ can't be less than X, and is given by:

$$\max(K_i) = \max\left(\left\lfloor \frac{T'_{sense}}{T'_i} \right\rfloor, X\right).$$

Wherein, X can be specified in the system specifications and/or (pre-)configured and/or updated by RRC signaling, MAC CE signaling and/or L1 control signaling.

In another example 4.17.3, the earliest sensing period (e.g., periodic sensing occasion) max($K_i$) is given by:

$$\max(K_i) = \left\lceil \frac{T'_{sense}}{T'_i} \right\rceil.$$

In a variant, the earliest sensing period (e.g., periodic sensing occasion) max($K_i$) can't be less than X, and is given by:

$$\max(K_i) = \max\left(\left\lceil \frac{T'_{sense}}{T'_i} \right\rceil, X\right).$$

Wherein, X can be specified in the system specifications and/or (pre-)configured and/or updated by RRC signaling, MAC CE signaling and/or L1 control signaling.

In another example 4.17.4, the earliest sensing period (e.g., periodic sensing occasion) max(K) across all periodicities is given by:

$$\max(K_i) = \left\lfloor \frac{T'_{sense}}{\max(\{T'_i\})} \right\rfloor.$$

In another example 4.17.5, the earliest sensing period (e.g., periodic sensing occasion) max(K) across all periodicities can't be less than one, and is given y:

$$\max(K_i) = \max\left(\left\lfloor \frac{T'_{sense}}{\max(\{T'_i\})} \right\rfloor, 1\right).$$

In a variant, the earliest sensing period (e.g., periodic sensing occasion) max(K) across all periodicities can't be less than X, and is given by:

$$\max(K_i) = \max\left(\left\lfloor \frac{T'_{sense}}{\max(\{T'_i\})} \right\rfloor, X\right).$$

Wherein, X can be specified in the system specifications and/or (pre-)configured and/or updated by RRC signaling, MAC CE signaling and/or L1 control signaling.

In another example 4.17.6, the earliest sensing period (e.g., periodic sensing occasion) max(K) across all periodicities is given by:

$$\max(K_i) = \left\lceil \frac{T'_{sense}}{\max(\{T'_i\})} \right\rceil.$$

In a variant, the earliest sensing period (e.g., periodic sensing occasion) max(K) across all periodicities can't be less than X, and is given by:

$$\max(K_i) = \max\left(\left\lceil \frac{T'_{sense}}{\max(\{T'_i\})} \right\rceil, X\right).$$

Wherein, X can be specified in the system specifications and/or (pre-)configured and/or updated by RRC signaling, MAC CE signaling and/or L1 control signaling.

In another example 4.17.7, the earliest sensing period (e.g., periodic sensing occasion) max($K_i$) is given by:

$$\max(K_i) = \left\lfloor \frac{T'_{sense} + (t'^{SL}_{y1} - t'^{SL}_{n'})}{T'_i} \right\rfloor.$$

Wherein, $t'^{SL}_{n'}$ is the logical slot index corresponding to physical slot n or n'.

In another example 4.17.8, the earliest sensing period (e.g., periodic sensing occasion) max($K_i$) can't be less than one, and is given by:

$$\max(K_i) = \max\left(\left\lfloor \frac{T'_{sense} + (t'^{SL}_{y1} - t'^{SL}_{n'})}{T'_i} \right\rfloor, 1\right).$$

Wherein, $t'^{SL}_{n'}$ is the logical slot index corresponding to physical slot n or n'.

In a variant, the earliest sensing period (e.g., periodic sensing occasion) max($K_i$) can't be less than X, and is given by:

$$\max(K_i) = \max\left(\left\lfloor \frac{T'_{sense} + (t'^{SL}_{y1} - t'^{SL}_{n'})}{T'_i} \right\rfloor, X\right).$$

Wherein, $t'^{SL}_{n'}$ is the logical slot index corresponding to physical slot n or n'.

Wherein, X can be specified in the system specifications and/or (pre-)configured and/or updated by RRC signaling, MAC CE signaling and/or L1 control signaling.

In another example 4.17.9, the earliest sensing period (e.g., periodic sensing occasion) max($K_i$) is given by:

$$\max(K_i) = \left\lceil \frac{T'_{sense} + (t'^{SL}_{y1} - t'^{SL}_{n'})}{T'_i} \right\rceil,$$

Wherein, $t'^{SL}_{n'}$ is the logical slot index corresponding to physical slot n or n'.

In a variant, the earliest sensing period (e.g., periodic sensing occasion) max($K_i$) can't be less than X, and is given by:

$$\max(K_i) = \max\left(\left\lceil \frac{T'_{sense} + (t'^{SL}_{y1} - t'^{SL}_{n'})}{T'_i} \right\rceil, X\right).$$

Wherein, $t'^{SL}_{n'}$ is the logical slot index corresponding to physical slot n or n'.

Wherein, X can be specified in the system specifications and/or (pre-)configured and/or updated by RRC signaling, MAC CE signaling and/or L1 control signaling.

In another example 4.17.10, the earliest sensing period (e.g., periodic sensing occasion) max($K_i$) is given by:

$$\max(K_i) = \left\lfloor \frac{T'_{sense} + (t'^{SL}_{y1} - (t'^{SL}_{n'} - T'_0))}{T'_i} \right\rfloor.$$

Wherein, $t'^{SL}_n$ is the logical slot index corresponding to physical slot n or n'. Wherein, $T_0$, in physical slots or physical time, or $T'_0$, in logical slots, is the processing latency for sensing. $T_0$ or $T'_0$ can be specified in the system specifications and/or configured and/or updated by RRC signaling and/or MAC CE signaling and/or L1 control signaling. $T_0$ or $T'_0$ can depend on the sub-carrier spacing of the SL bandwidth part (e.g., of the SL channels). In one example, $T_0$ is $T_{proc,0}^{SL}$ as described in Table 8.1.4-1 of TS 38.214. For example, $T_{proc,0}^{SL}$ is the sensing processing latency time.

In another example 4.17.11, the earliest sensing period (e.g., periodic sensing occasion) max($K_i$) can't be less than one, and is given by:

$$\max(K_i) = \max\left(\left\lceil \frac{T'_{sense} + (t^{SL}_{y1} - (t'^{SL}_{n'} - T'_0))}{T'_i} \right\rceil, 1\right).$$

Wherein, $t'^{SL}_n$ is the logical slot index corresponding to physical slot n or n'. Wherein, $T_0$, in physical slots or physical time, or $T'_0$, in logical slots, is the processing latency for sensing. $T_0$ or $T'_0$ can be specified in the system specifications and/or configured and/or updated by RRC signaling and/or MAC CE signaling and/or L1 control signaling. $T_0$ or $T'_0$ can depend on the sub-carrier spacing of the SL bandwidth part (e.g., of the SL channels). In one example, $T_0$ is $T_{proc,0}^{SL}$ as described in Table 8.1.4-1 of TS 38.214. For example, $T_{proc,0}^{SL}$ is the sensing processing latency time.

In a variant, the earliest sensing period (e.g., periodic sensing occasion) max($K_i$) can't be less than X, and is given by:

$$\max(K_i) = \max\left(\left\lceil \frac{T'_{sense} + (t^{SL}_{y1} - (t'^{SL}_{n'} - T'_0))}{T'_i} \right\rceil, X\right).$$

Wherein, $t'^{SL}_n$ is the logical slot index corresponding to physical slot n or n'. Wherein, $T_0$, in physical slots or physical time, or $T'_0$, in logical slots, is the processing latency for sensing. $T_0$ or $T'_0$ can be specified in the system specifications and/or configured and/or updated by RRC signaling and/or MAC CE signaling and/or L1 control signaling. $T_0$ or $T'_0$ can depend on the sub-carrier spacing of the SL bandwidth part (e.g., of the SL channels). In one example, $T_0$ is $T_{proc,0}^{SL}$ as described in Table 8.1.4-1 of TS 38.214. For example, $T_{proc,0}^{SL}$ is the sensing processing latency time.

Wherein, X can be specified in the system specifications and/or (pre-)configured and/or updated by RRC signaling, MAC CE signaling and/or L1 control signaling.

In another example 4.17.12, the earliest sensing period (e.g., periodic sensing occasion) max($K_i$) is given by:

$$\max(K_i) = \left\lceil \frac{T'_{sense} + (t^{SL}_{y1} - (t'^{SL}_{n'} - T'_0))}{T'_i} \right\rceil.$$

Wherein, $t'^{SL}_n$ is the logical slot index corresponding to physical slot n or n'. Wherein, $T_0$, in physical slots or physical time, or $T'_0$, in logical slots, is the processing latency for sensing. $T_0$ or $T'_0$ can be specified in the system specifications and/or configured and/or updated by RRC signaling and/or MAC CE signaling and/or L1 control signaling. $T_0$ or $T'_0$ can depend on the sub-carrier spacing of the SL bandwidth part (e.g., of the SL channels). In one example, $T_0$ is $T_{proc,0}^{SL}$ as described in Table 8.1.4-1 of TS 38.214. For example, $T_{proc,0}^{SL}$ is the sensing processing latency time.

In a variant, the earliest sensing period (e.g., periodic sensing occasion) max($K_i$) can't be less than X, and is given by:

$$\max(K_i) = \max\left(\left\lceil \frac{T'_{sense} + (t^{SL}_{y1} - (t'^{SL}_{n'} - T'_0))}{T'_i} \right\rceil, X\right).$$

Wherein, $t'^{SL}_n$ is the logical slot index corresponding to physical slot n or n'. Wherein, $T_0$, in physical slots or physical time, or $T'_0$, in logical slots, is the processing latency for sensing. $T_0$ or $T'_0$ can be specified in the system specifications and/or configured and/or updated by RRC signaling and/or MAC CE signaling and/or L1 control signaling. $T_0$ or $T'_0$ can depend on the sub-carrier spacing of the SL bandwidth part (e.g., of the SL channels). In one example, $T_0$ is $T_{proc,0}^{SL}$ as described in Table 8.1.4-1 of TS 38.214. For example, $T_{proc,0}^{SL}$ is the sensing processing latency time.

Wherein, X can be specified in the system specifications and/or (pre-)configured and/or updated by RRC signaling, MAC CE signaling and/or L1 control signaling.

In another example 4.17.13, the earliest sensing period (e.g., periodic sensing occasion) max(K) across all periodicities is given by:

$$\max(K_i) = \left\lfloor \frac{T'_{sense} + (t^{SL}_{y1} - t'^{SL}_{n'})}{\max(\{T'_i\})} \right\rfloor.$$

Wherein, $t'^{SL}_n$ is the logical slot index corresponding to physical slot n or n'.

In another example 4.17.14, the earliest sensing period (e.g., periodic sensing occasion) max(K) across all periodicities can't be less than one, and is given by:

$$\max(K_i) = \max\left(\left\lceil \frac{T'_{sense} + (t^{SL}_{y1} - t'^{SL}_{n'})}{\max(\{T'_i\})} \right\rceil, 1\right).$$

Wherein, $t'^{SL}_n$ is the logical slot index corresponding to physical slot n or n'.

In a variant, the earliest sensing period (e.g., periodic sensing occasion) max(K) across all periodicities can't be less than X, and is given by:

$$\max(K_i) = \max\left(\left\lceil \frac{T'_{sense} + (t^{SL}_{y1} - t'^{SL}_{n'})}{\max(\{T'_i\})} \right\rceil, X\right).$$

Wherein, $t'^{SL}_n$ is the logical slot index corresponding to physical slot n or n'.

Wherein, X can be specified in the system specifications and/or (pre-)configured and/or updated by RRC signaling, MAC CE signaling and/or L1 control signaling.

In another example 4.17.15, the earliest sensing period (e.g., periodic sensing occasion) max(K) across all periodicities is given by:

$$\max(K_i) = \left\lceil \frac{T'_{sense} + (t_{y1}^{SL} - t'^{SL}_{n'})}{\max(\{T'_i\})} \right\rceil.$$

Wherein, $t'^{SL}_n$ is the logical slot index corresponding to physical slot n or n'.

In a variant, the earliest sensing period (e.g., periodic sensing occasion) max(K) across all periodicities can't be less than X, and is given by:

$$\max(K_i) = \max\left(\left\lceil \frac{T'_{sense} + (t_{y1}^{SL} - t'^{SL}_{n'})}{\max(\{T'_i\})} \right\rceil, X\right).$$

Wherein, $t'^{SL}_n$ is the logical slot index corresponding to physical slot n or n'.

Wherein, X can be specified in the system specifications and/or (pre-)configured and/or updated by RRC signaling, MAC CE signaling and/or L1 control signaling.

In another example 4.17.16, the earliest sensing period (e.g., periodic sensing occasion) max(K) across all periodicities is given by:

$$\max(K_i) = \left\lceil \frac{T'_{sense} + (t_{y1}^{SL} - (t'^{SL}_{n'} - T'_0))}{\max(\{T'_i\})} \right\rceil.$$

Wherein, $t'^{SL}_n$ is the logical slot index corresponding to physical slot n or n'. Wherein, $T_0$, in physical slots or physical time, or $T'_0$, in logical slots, is the processing latency for sensing. $T_0$ or $T'_0$ can be specified in the system specifications and/or configured and/or updated by RRC signaling and/or MAC CE signaling and/or L1 control signaling. $T_0$ or $T'_0$ can depend on the sub-carrier spacing of the SL bandwidth part (e.g., of the SL channels). In one example, $T_0$ is $T_{proc,0}^{SL}$ as described in Table 8.1.4-1 of TS 38.214. For example, $T_{proc,0}^{SL}$ is the sensing processing latency time.

In another example 4.17.17, the earliest sensing period (e.g., periodic sensing occasion) max(K) across all periodicities can't be less than one, and is given by:

$$\max(K_i) = \max\left(\left\lceil \frac{T'_{sense} + (t_{y1}^{SL} - (t'^{SL}_{n'} - T'_0))}{\max(\{T'_i\})} \right\rceil, 1\right).$$

Wherein, $t'^{SL}_n$ is the logical slot index corresponding to physical slot n or n'. Wherein, $T_0$, in physical slots or physical time, or $T'_0$, in logical slots, is the processing latency for sensing. $T_0$ or $T'_0$ can be specified in the system specifications and/or configured and/or updated by RRC signaling and/or MAC CE signaling and/or L1 control signaling. $T_0$ or $T'_0$ can depend on the sub-carrier spacing of the SL bandwidth part (e.g., of the SL channels). In one example, $T_0$ is $T_{proc,0}^{SL}$ as described in Table 8.1.4-1 of TS 38.214. For example, $T_{proc,0}^{SL}$ is the sensing processing latency time.

In a variant, the earliest sensing period (e.g., periodic sensing occasion) max(K) across all periodicities can't be less than X, and is given by:

$$\max(K_i) = \max\left(\left\lceil \frac{T'_{sense} + (t_{y1}^{SL} - (t'^{SL}_{n'} - T'_0))}{\max(\{T'_i\})} \right\rceil, X\right).$$

Wherein, $t'^{SL}_n$ is the logical slot index corresponding to physical slot n or n'. Wherein, $T_0$, in physical slots or physical time, or $T'_0$, in logical slots, is the processing latency for sensing. $T_0$ or $T'_0$ can be specified in the system specifications and/or configured and/or updated by RRC signaling and/or MAC CE signaling and/or L1 control signaling. $T_0$ or $T'_0$ can depend on the sub-carrier spacing of the SL bandwidth part (e.g., of the SL channels). In one example, $T_0$ is $T_{proc,0}^{SL}$ as described in Table 8.1.4-1 of TS 38.214. For example, $T_{proc,0}^{SL}$ is the sensing processing latency time.

Wherein, X can be specified in the system specifications and/or (pre-)configured and/or updated by RRC signaling, MAC CE signaling and/or L1 control signaling.

In another example 4.17.18, the earliest sensing period (e.g., periodic sensing occasion) max(K) across all periodicities is given by:

$$\max(K_i) = \left\lceil \frac{T'_{sense} + (t_{y1}^{SL} - (t'^{SL}_{n'} - T'_0))}{\max(\{T'_i\})} \right\rceil.$$

Wherein, $t'^{SL}_n$ is the logical slot index corresponding to physical slot n or n'. Wherein, $T_0$, in physical slots or physical time, or $T'_0$, in logical slots, is the processing latency for sensing. $T_0$ or $T'_0$ can be specified in the system specifications and/or configured and/or updated by RRC signaling and/or MAC CE signaling and/or L1 control signaling. $T_0$ or $T'_0$ can depend on the sub-carrier spacing of the SL bandwidth part (e.g., of the SL channels). In one example, $T_0$ is $T_{proc,0}^{SL}$ as described in Table 8.1.4-1 of TS 38.214. For example, $T_{proc,0}^{SL}$ is the sensing processing latency time.

In a variant, the earliest sensing period (e.g., periodic sensing occasion) max(K) across all periodicities can't be less than X, and is given by:

$$\max(K_i) = \max\left(\left\lceil \frac{T'_{sense} + (t_{y1}^{SL} - (t'^{SL}_{n'} - T'_0))}{\max(\{T'_i\})} \right\rceil, X\right).$$

Wherein, $t'^{SL}_n$ is the logical slot index corresponding to physical slot n or n'. Wherein, $T_0$, in physical slots or physical time, or $T'_0$, in logical slots, is the processing latency for sensing. $T_0$ or $T'_0$ can be specified in the system specifications and/or configured and/or updated by RRC signaling and/or MAC CE signaling and/or L1 control signaling. $T_0$ or $T'_0$ can depend on the sub-carrier spacing of the SL bandwidth part (e.g., of the SL channels). In one example, $T_0$ is $T_{proc,0}^{SL}$ as described in Table 8.1.4-1 of TS 38.214. For example, $T_{proc,0}^{SL}$ is the sensing processing latency time.

Wherein, X can be specified in the system specifications and/or (pre-)configured and/or updated by RRC signaling, MAC CE signaling and/or L1 control signaling.

In one example 4.18, slot $t'^{SL}_{y1}$ is within a resource selection/reselection window triggered in slot n. Sensing can end $T_0$ or $T'_0$ before slot n or slot n'. Wherein, $T_0$, in physical slots or physical time, or $T'_0$, in logical slots, is the processing latency for sensing. $T_0$ or $T'_0$ can be specified in the system specifications and/or configured and/or updated by RRC signaling and/or MAC CE signaling and/or L1 control signaling. $T_0$ or $T'_0$ can depend on the sub-carrier spacing of the SL bandwidth part (e.g., of the SL channels). In one special case, $T_0$ or $T'_0$ is equal to zero, i.e., sensing can end at slot n or slot n'.

In one example 4.18.0.1, slot n is a logical slot within the resource pool. slot n' is the same as slot n.

In another example 4.18.0.2, slot n is a logical slot that can be in the resource pool. If slot n is within the resource pool, slot n' is the same as slot n, otherwise, slot n' is the next (or pervious) slot after (or before) slot n that is within the resource pool.

In another example 4.18.0.3, slot n is a physical slot. If slot n is within the resource pool, slot n' is the same as slot n, otherwise, slot n' is the next (or pervious) slot after (or before) slot n that is within the resource pool.

In one example 4.18.0.4, $T'_0$ is in units of logical slots within a resource pool.

In another example 4.18.0.5, $T'_0$ is in units of logical slots that can be in a resource pool.

In another example 4.18.0.6, $T_0$ is in units of physical time (e.g., milliseconds) or physical slots. In one example, $T_0$ is $T_{proc,0}^{SL}$ as described in Table 8.1.4-1 of TS 38.214. For example, $T_{proc,0}^{SL}$ is the sensing processing latency time.

In the following examples, $T'_0$, $T'_i$, $t'^{SL}_{y1}$, n and n' are all converted to a same unit which is one of: logical slots within a resource pool, or logical slots that can be in a resource pool or physical slots. For convenience, the notation of logical slots within a resource pool is used. However, the same applies to other time units.

In one example 4.18.1, the latest sensing period (e.g., periodic sensing occasion) min($K_i$) is given by:

$$\min(K_i) = \left\lfloor \frac{T'_0}{T'_i} \right\rfloor.$$

In another example 4.18.2, the latest sensing period (e.g., periodic sensing occasion) min($K_i$) can't be less than one, and is given by:

$$\min(K_i) = \max\left(\left\lfloor \frac{T'_0}{T'_i} \right\rfloor, 1\right).$$

In a variant, the latest sensing period min($K_i$) can't be less than X, and is given by:

$$\min(K_i) = \max\left(\left\lfloor \frac{T'_0}{T'_i} \right\rfloor, X\right).$$

Wherein, X can be specified in the system specifications and/or (pre-)configured and/or updated by RRC signaling, MAC CE signaling and/or L1 control signaling.

In another example 4.18.3, the latest sensing period (e.g., periodic sensing occasion) min($K_i$) is given by:

$$\min(K_i) = \left\lceil \frac{T'_0}{T'_i} \right\rceil.$$

In a variant, the latest sensing period (e.g., periodic sensing occasion) min($K_i$) can't be less than X, and is given by:

$$\min(K_i) = \max\left(\left\lceil \frac{T'_0}{T'_i} \right\rceil, X\right).$$

Wherein, X can be specified in the system specifications and/or (pre-)configured and/or updated by RRC signaling, MAC CE signaling and/or L1 control signaling.

In another example 4.18.4, the latest sensing period (e.g., periodic sensing occasion) min(K) across all periodicities is given by:

$$\min(K_i) = \left\lfloor \frac{T'_0}{\max(\{T'_i\})} \right\rfloor.$$

In another example 4.18.5, the latest sensing period (e.g., periodic sensing occasion) min(K) across all periodicities can't be less than one, and is given by:

$$\min(K_i) = \max\left(\left\lfloor \frac{T'_0}{\max(\{T'_i\})} \right\rfloor, 1\right).$$

In a variant, the latest sensing period (e.g., periodic sensing occasion) min(K) across all periodicities can't be less than X, and is given by:

$$\min(K_i) = \max\left(\left\lfloor \frac{T'_0}{\max(\{T'_i\})} \right\rfloor, X\right).$$

Wherein, X can be specified in the system specifications and/or (pre-)configured and/or updated by RRC signaling, MAC CE signaling and/or L1 control signaling.

In another example 4.18.6, the latest sensing period (e.g., periodic sensing occasion) min(K) across all periodicities is given by:

$$\min(K_i) = \left\lceil \frac{T'_0}{\max(\{T'_i\})} \right\rceil.$$

In a variant, the earliest sensing period (e.g., periodic sensing occasion) min(K) across all periodicities can't be less than X, and is given by:

$$\min(K_i) = \max\left(\left\lceil \frac{T'_0}{\max(\{T'_i\})} \right\rceil, X\right).$$

Wherein, X can be specified in the system specifications and/or (pre-)configured and/or updated by RRC signaling, MAC CE signaling and/or L1 control signaling.

In another example 4.18.7, the latest sensing period (e.g., periodic sensing occasion) min($K_i$) is given by:

$$\min(K_i) = \left\lfloor \frac{T'_0 + (t'^{SL}_{y1} - t'^{SL}_{n'})}{T'_i} \right\rfloor.$$

Wherein, $t'^{SL}_n$ is the logical slot index corresponding to physical slot n or n'.

In another example 4.18.8, the latest sensing period (e.g., periodic sensing occasion) min($K_i$) can't be less than one, and is given by:

$$\min(K_i) = \max\left(\left\lceil\frac{T'_0 + (t^{SL}_{y1} - t'^{SL}_{n'})}{T'_i}\right\rceil, 1\right).$$

Wherein, $t'^{SL}_{n'}$ is the logical slot index corresponding to physical slot n or n'.

In a variant, the latest sensing period (e.g., periodic sensing occasion) $\min(K_i)$ can't be less than X, and is given by:

$$\min(K_i) = \max\left(\left\lceil\frac{T'_0 + (t^{SL}_{y1} - t'^{SL}_{n'})}{T'_i}\right\rceil, X\right).$$

Wherein, $t'^{SL}_{n'}$ is the logical slot index corresponding to physical slot n or n'.

Wherein, X can be specified in the system specifications and/or (pre-)configured and/or updated by RRC signaling, MAC CE signaling and/or L1 control signaling.

In another example 4.18.9, the latest sensing period (e.g., periodic sensing occasion) $\min(K_i)$ is given by:

$$\min(K_i) = \left\lceil\frac{T'_0 + (t^{SL}_{y1} - t'^{SL}_{n'})}{T'_i}\right\rceil.$$

Wherein, $t'^{SL}_{n'}$ is the logical slot index corresponding to physical slot n or n'.

In a variant, the latest sensing period (e.g., periodic sensing occasion) $\min(K_1)$ can't be less than X, and is given by:

$$\min(K_i) = \max\left(\left\lceil\frac{T'_0 + (t^{SL}_{y1} - t'^{SL}_{n'})}{T'_i}\right\rceil, X\right).$$

Wherein, $t'^{SL}_{n'}$ is the logical slot index corresponding to physical slot n or n'. Wherein, X can be specified in the system specifications and/or (pre-)configured and/or updated by RRC signaling, MAC CE signaling and/or L1 control signaling.

In another example 4.18.10, the latest sensing period (e.g., periodic sensing occasion) min(K) across all periodicities is given by:

$$\min(K_i) = \left\lceil\frac{T'_0 + (t^{SL}_{y1} - t'^{SL}_{n'})}{\max(\{T'_i\})}\right\rceil.$$

Wherein, $t'^{SL}_{n'}$ is the logical slot index corresponding to physical slot n or n'.

In another example 4.18.11, the latest sensing period (e.g., periodic sensing occasion) min(K) across all periodicities can't be less than one, and is given by:

$$\min(K_i) = \max\left(\left\lceil\frac{T'_0 + (t^{SL}_{y1} - t'^{SL}_{n'})}{\max(\{T'_i\})}\right\rceil, 1\right).$$

Wherein, $t'^{SL}_{n'}$ is the logical slot index corresponding to physical slot n or n'.

In a variant, the latest sensing period (e.g., periodic sensing occasion) min(K) across all periodicities can't be less than X, and is given by:

$$\min(K_i) = \max\left(\left\lceil\frac{T'_0 + (t^{SL}_{y1} - t'^{SL}_{n'})}{\max(\{T'_i\})}\right\rceil, X\right).$$

Wherein, $t'^{SL}_{n'}$ is the logical slot index corresponding to physical slot n or n'.

Wherein, X can be specified in the system specifications and/or (pre-)configured and/or updated by RRC signaling, MAC CE signaling and/or L1 control signaling.

In another example 4.18.12, the latest sensing period (e.g., periodic sensing occasion) min(K) across all periodicities is given by:

$$\min(K_i) = \left\lceil\frac{T'_0 + (t^{SL}_{y1} - t'^{SL}_{n'})}{\max(\{T'_i\})}\right\rceil.$$

Wherein, $t'^{SL}_{n'}$ is the logical slot index corresponding to physical slot n or n'.

In a variant, the latest sensing period (e.g., periodic sensing occasion) min(K) across all periodicities can't be less than X, and is given by:

$$\min(K_i) = \max\left(\left\lceil\frac{T'_0 + (t^{SL}_{y1} - t'^{SL}_{n'})}{\max(\{T'_i\})}\right\rceil, X\right).$$

Wherein, $t'^{SL}_{n'}$ is the logical slot index corresponding to physical slot n or n'.

Wherein, X can be specified in the system specifications and/or (pre-)configured and/or updated by RRC signaling, MAC CE signaling and/or L1 control signaling.

In another example 4.19, one or more of the following can be specified in the system specifications and/or (pre-)configured and/or updated by RRC signaling and/or MAC CE signaling and/or L1 control signaling: (1) the earliest period (i.e., periodic sensing occasion) that the UE can sense, i.e., $\max(K_i)$ or max(K); (2) the latest period (i.e., occasions) that the UE can sense, i.e., $\min(K_i)$ or min(K), in one example, the latest period can be set to 1, e.g., the first period before slot $t'^{SL}_{y1}$, and in another example, the latest period is that which can occur within a sensing window; (3) the maximum time period $T'_{max}$ or $T_{max}$ of a sensed slot before slot n or slot n'. Wherein, slot n or slot n' is the slot of resource selection/re-selection, e.g., a slot in which the available candidate resources are determined or identified based on resource exclusion based on partial sensing (e.g. periodic based partial sensing) or a slot of resource (re-)selection trigger. Wherein, the maximum time can be in units of logical slots within a resource pool, logical slots that can be in a resource pool, physical slots or physical time. For example, $T_{max}$ can be $T_{sense}$, or $T'_{max}$ can be $T'_{sense}$ of example 4.17 and its sub-examples, in one example, $T_{sense}$ is $T_0$ of Rel-16 full sensing as described in para 0092; (4) the minimum time period $T'_{min}$ or $T_{min}$ of a sensed slot before slot n or slot n'. Wherein, slot n or slot n' is the slot of resource selection/re-selection, e.g., a slot in which the available candidate resources are determined or identified based on resource exclusion based on partial sensing (e.g. periodic based partial sensing) or a slot of resource (re-)selection trigger. Wherein, the minimum time can be in units of logical slots within a resource pool, logical slots that can be in a resource pool, physical slots or physical time. For example, $T_{min}$ can be $T_0$, or $T'_{min}$ can be $T'_0$ of example 4.18 and its sub-examples, in one example, $T_0$ is $T_{proc,0}^{SL}$ as described in Table 8.1.4-1 of TS 38.214, for example, $T_{proc,0}^{SL}$ is the sensing processing latency time; (5) the maximum number of periods (i.e., periodic sensing occasions) to sense for each periodicity $T_i$ or T; and (6) the minimum number of periods (i.e., periodic sensing occasions) to sense for each periodicity $T_i$ or T.

The above can be specified or configured separately for each periodicity $T'_i$, or configured commonly across all periodicities.

A UE can select a number of periodic sensing occasions based on its own implementation subject to the above specified or configured constraints.

In one example 5, a UE performs partial sensing across one or more sensing periodicities $\{T'_1, T'_2, \ldots, T'_I\}$, wherein $I \geq 1$.

In one example 5.1, a UE performs sensing across one sensing periodicity, i.e., I=1. Wherein, the sensing periodicity can be one of the following.

In one example 5.1.1, the periodicity $T_{per}$ of the periodic traffic the UE is transmitting.

In another example 5.1.2, if the UE is transmitting periodic traffic with more than one periodicity, the sensing periodicity can be one of the following: (1) the largest periodicity of the periodic traffic (i.e., the largest $T_{per}$); (2) the smallest periodicity of the periodic traffic (i.e., the smallest $T_{per}$); (3) the periodicity configured or indicated by higher layers; (4) the lowest common multiple among the periodicities of the periodic traffic of the UE. In one example, if the UE is configured with two or more periodicities e.g., $T_1$ and $T_2$, the UE finds the lowest common multiple periodicity $T_{LCM}$, if the ratio $T_{LCM}/T_1 < L$ and $T_{LCM}/T_2 < L$, the UE selects the lowest common multiple period, i.e., $T_{LCM}$ for sensing, else the UE selects $T_1$ and $T_2$ for sensing, where, L can be specified in system specification and/or (pre-)configured and/or updated by RRC signaling and/or MAC CE signaling and/or L1 control signaling. A large ratio $T_{LCM}/T_1$ indicates that the periodic sensed occasions are too far from the resource selection slot for period $T_1$, i.e., too many $T_1$ periods elapse without sensing, hence in this case period $T_1$ is selected instead of $T_{LCM}$; (5) the greatest common factor among the periodicities of the periodic traffic of the UE. In one example, if the UE is configured with two or more periodicities e.g., $T_1$ and $T_2$, the UE finds the greatest common divisor periodicity $T_{GCD}$, the periodic sensing occasions described in example 4.x are further determined such that the periodic sensed occasions correspond to occasions that would have been sensed if the period were to be $T_1$ and/or $T_2$; and/or (6) a function of the periodicities of the periodic traffic of the UE. For example, this function can be based on a subset of periodicities of the periodic traffic, it can also be based on the priority of the periodic traffic. For example, if the UE transmits traffic with more than one priority, the periodicity (or periodicities) of the traffic with the highest priority (i.e., lowest priority value) determines the sensing periodicity (or periodicities).

In another example 5.1.3, the periodicity configured for the resource pool, when a single periodicity, $P_{reserve}$, is configured for the resource pool. The possible resource reservation periods allowed in a resource pool is configured or provided by sl-ResourceReservationPeriodList. In one example, the resource reservation period of a SL resource pool is (pre-)configured by a separate parameter for partial sensing than that configured for full sensing.

In another example 5.1.4, if the resource pool is configured with more than one resource reservation period, $P_{reserve}$, as configured or provided by sl-ResourceReservationPeriodList, or a corresponding parameter for partial sensing. The sensing periodicity can be one of the following: (1) the largest periodicity for resource reservation (i.e., the largest $P_{reserve}$) of a resource pool; (2) the smallest periodicity for resource reservation (i.e., the smallest $P_{reserve}$) of a resource pool; (3) the periodicity configured or indicated by higher layers among the configured $P_{reserve}$ values of a resource pool; (4) the first or nth periodicity in sl-ResourceReservationPeriodList; (5) the lowest common multiple among the periodicities of resource reservation of a resource pool. In one example, if the UE is configured with two or more periodicities e.g., $P_1$ and $P_2$, the UE finds the lowest common multiple periodicity $P_{LCM}$, if the ratio $P_{LCM}/P_1 < L$ and $P_{LCM}/P_2 < L$, the UE selects the lowest common multiple period, i.e., $P_{LCM}$ for sensing, else the UE selects $P_1$ and $P_2$ for sensing; (6) wherein, L can be specified in system specification and/or (pre-)configured and/or updated by RRC signaling and/or MAC CE signaling and/or L1 control signaling. A large ratio $P_{LCM}/P_1$ indicates that the periodic sensed occasions are too far from the resource selection slot for period $P_1$, i.e., too many $P_1$ periods elapse without sensing, hence in this case period $P_1$ is selected instead of $P_{LCM}$; (7) the greatest common factor among the periodicities of resource reservation of a resource pool. In one example, if the UE is configured with two or more periodicities e.g., $P_1$ and $P_2$, the UE finds the greatest common divisor periodicity $T_{GCD}$, the periodic sensing occasions described in example 4.x are further determined such that the periodic sensed occasions correspond to occasions that would have been sensed if the period were to be $P_1$ and/or $P_2$; and (8) a function of the periodicities of resource reservation of a resource pool. For example, this function can be based on a subset of periodicities for resource reservation of a resource pool.

In another example 5.1.5, if a UE is transmitting periodic traffic, the sensing periodicity is based on a combination or function of the periodicity $T_{per}$ of the periodic traffic the UE is transmitting, and the periodicity configured for the resource pool $P_{reserve}$ For example, the sensing periodicity can be one of the following: (1) the largest periodicity of the periodic traffic and periodicity for resource reservation of a resource pool (i.e., the largest among $T_{per}$ and $P_{reserve}$); (2) the smallest periodicity of the periodic traffic and periodicity for resource reservation of a resource pool (i.e., the smallest among $T_{per}$ and $P_{reserve}$); (3) the periodicity configured or indicated by higher layers among the configured $T_{per}$ for periodic traffic and $P_{reserve}$ values of a resource pool; (4) the lowest common multiple among the periodicities of the periodic traffic and the periodicities of resource reservation of a resource pool. In one example, if the UE is configured with two or more periodicities e.g., $T_1$ and $T_2$, the UE finds the lowest common multiple periodicity $T_{LCM}$, if the ratio $T_{LCM}/T_1 < L$ and $T_{LCM}/T_2 < L$, the UE selects the lowest common multiple period, i.e., $T_{LCM}$ for sensing, else the UE selects $T_1$ and $T_2$ for sensing; (5) wherein, L can be specified in system specification and/or (pre-)configured and/or updated by RRC signaling and/or MAC CE signaling and/or L1 control signaling. A large ratio $T_{LCM}/T_1$ indicates that the periodic sensed occasions are too far from the resource selection slot for period $T_1$, i.e., too many $T_1$ periods elapse without sensing, hence in this case period $T_1$ is selected instead of $L_{LCM}$; (6) the greatest common factor among the periodicities of the periodic traffic and the periodicities of resource reservation of a resource pool. In one example, if the UE is configured with two or more periodicities e.g., $T_1$ and $T_2$, the UE finds the greatest common divisor periodicity $T_{GCD}$, the periodic sensing occasions described in example 4.x are further determined such that the periodic sensed occasions correspond to occasions that would have been sensed if the period were to be $T_1$ and/or $T_2$; and/or (7) a function of the periodicities of the periodic traffic of the UE and of resource reservation for a resource pool. For example, this function can be based on a subset of periodicities of periodic traffic and the periodicities of resource reservation of a resource pool.

In another example 5.1.6, if a UE is transmitting aperiodic traffic, the sensing periodicity is based on the periodicity for resource reservation as given by example 5.1.3 and example 5.1.4.

In one example 5.2, a UE performs sensing across one or more sensing periodicities, i.e., M≥1. Wherein, the sensing periodicity can be one of the following:

In one example 5.2.1, if the UE is transmitting periodic traffic with one or more periodicities, the sensing periodicity can be one of the following: (1) the largest M periodicities of the periodic traffic (i.e., the largest M $T_{per}$). Wherein, M can be specified in system specification and/or (pre-)configured and/or updated by RRC signaling and/or MAC CE signaling and/or L1 control signaling; (2) the smallest M periodicity of the periodic traffic (i.e., the smallest M $T_{per}$). Wherein, M can be specified in system specification and/or (pre-)configured and/or updated by RRC signaling and/or MAC CE signaling and/or L1 control signaling; (3) M sensing periodicities configured or indicated by higher layers. Wherein, the M sensing periodicities can be specified in system specification and/or (pre-)configured and/or updated by RRC signaling and/or MAC CE signaling and/or L1 control signaling; (4) a function of the periodicities of the periodic traffic of the UE that provides M values. For example, this function can be based on a subset of periodicities of the periodic traffic, it can also be based on the priority of the periodic traffic. For example, if the UE transmits traffic with more than one priority, the M periodicities of the traffic with the highest priority (i.e., lowest priority value) determines the sensing periodicities. Wherein, M can be specified in system specification and/or (pre-)configured and/or updated by RRC signaling and/or MAC CE signaling and/or L1 control signaling; (5) in the above examples, M can equal the number of periodicities of the periodic traffic; and/or (6) in the above example, M can equal 1.

In another example 5.2.2, if the resource pool is configured with one or more resource reservation periods, $P_{reserve}$, as configured or provided by sl-ResourceReservationPeriodList, or a corresponding parameter for partial sensing. The sensing periodicity can be one of the following: (1) the largest M periodicities for resource reservation of a resource pool (i.e., the largest M $P_{reserve}$) Wherein, M can be specified in system specification and/or (pre-)configured and/or updated by RRC signaling and/or MAC CE signaling and/or L1 control signaling; (2) the smallest M periodicities for resource reservation of a resource pool (i.e., the smallest M $P_{reserve}$) Wherein, M can be specified in system specification and/or (pre-)configured and/or updated by RRC signaling and/or MAC CE signaling and/or L1 control signaling; (3) M sensing periodicities configured or indicated by higher layers among the configured $P_{reserve}$ values of a resource pool. Wherein, the M sensing periodicities can be specified in system specification and/or (pre-) configured and/or updated by RRC signaling and/or MAC CE signaling and/or L1 control signaling; (4) the first M periodicities or a fixed M subsets of periodicities in sl-ResourceReservationPeriodList. Wherein, M can be specified in system specification and/or (pre-) configured and/or updated by RRC signaling and/or MAC CE signaling and/or L1 control signaling; (5) a function of the periodicities of resource reservation of a resource pool that provides M values. For example, this function can be based on a subset of periodicities for resource reservation of a resource pool. Wherein, M can be specified in system specification and/or (pre-)configured and/or updated by RRC signaling and/or MAC CE signaling and/or L1 control signaling; (6) in the above examples, M can equal the number of periodicities for periodic resource reservation of a resource pool; (7) in the above example, M can equal 1; and/or (8) M periodicities from sl-ResourceReservationPeriodList, wherein M can depend on one or more of the following parameters.

In one example 5.2.2.1, M depends on a maximum number of HARQ re-transmissions.

In another example 5.2.2.2, M depends on a packet delay budget.

In another example 5.2.2.3, M depends on a length of the resource selection/reselection window, i.e., $T_2-T_1$.

In another example 5.2.2.4, M depends on a priority level of SL traffic.

In another example 5.2.2.5, M depends on a CBR.

In another example 5.2.2.6, M depends on a HARQ error rate.

The dependence of M on the one or more parameters can be specified in the system specifications and/or (pre-)configured and/or updated by higher layers for example by configuring a M for each parameter range as illustrated in TABLE 5.

TABLE 5

Example of configuration of M for each parameter range

| Parameter (P) (e.g., Number of HARQ retransmissions, packet delay budget, etc.) Range | M Value |
| --- | --- |
| P < R1 | $M_0$ |
| R1 ≤ P < R2 | $M_1$ |
| ... | ... |
| R_N ≤ P | $M_N$ |

The $M_i$ periodicities for each parameter range, can be chosen to be the first $M_i$ periodicities or the last $M_i$ periodicities in sl-ResourceReservationPeriodList. Alternatively, the list of $M_i$ periodicities for each parameter range can be configured and/or updated by higher layers.

In another example 5.2.3, if a UE is transmitting periodic traffic, the sensing periodicity is based on a combination or function of the periodicity(ies) $T_{per}$ of the periodic traffic the UE is transmitting, and the periodicity(ies) configured for the resource pool $P_{reserve}$ For example, the sensing periodicity(ies) can be one of the following: (1) the largest M periodicity(ies) of the periodic traffic and periodicity(ies) for resource reservation of a resource pool (i.e., the largest M among $T_{per}$ and $P_{reserve}$) Wherein, M can be specified in system specification and/or (pre-) configured and/or updated by RRC signaling and/or MAC CE signaling and/or L1 control signaling; (2) the largest M periodicity(ies) of the periodic traffic and periodicity(ies) for resource reservation of a resource pool (i.e., the largest M among $T_{per}$ and $P_{reserve}$), where at least one sensing periodicity is based on the periodicity(ies) of periodic traffic and one sensing periodicity is based on periodicity(ies) configured for a resource pool. Wherein, M can be specified in system specification and/or (pre-)configured and/or updated by RRC signaling and/or MAC CE signaling and/or L1 control signaling; (3) the largest $M_1$ periodicity(ies) of the periodic traffic and the largest $M_2$ periodicity(ies) for resource reservation of a resource pool (i.e., the largest $M_1$ among $T_{per}$ and largest $M_2$ among $P_{reserve}$) Wherein, $M_1$ and $M_2$ can be specified in system specification and/or (pre-)configured and/or updated by RRC signaling and/or MAC CE signaling and/or L1 control signaling; (4) the smallest M periodicity(ies) of the periodic traffic and periodicity(ies) for resource reservation of a resource pool (i.e., the smallest M among $T_{per}$ and $P_{reserve}$); (5) the smallest M periodicity(ies) of the periodic traffic and periodicity(ies) for resource reservation of a resource pool (i.e., the smallest M among $T_{per}$ and $P_{reserve}$), where at least one sensing periodicity is based on the periodicity(ies) of periodic traffic and one sensing periodicity is based on periodicity(ies) configured for a resource pool. Wherein, M can be specified in system specification and/or (pre-)configured and/or updated by RRC signaling and/or MAC CE signaling and/or L1 control signaling; (6) the smallest $M_1$ periodicity(ies) of the periodic traffic and the smallest $M_2$ periodicity(ies) for resource reservation of a resource pool (i.e., the smallest $M_1$ among $T_{per}$ and smallest $M_2$ among $P_{reserve}$) Wherein, $M_1$ and $M_2$ can be specified in system specification and/or (pre-)configured and/or updated by RRC signaling and/or MAC CE signaling and/or L1 control signaling; (7) M sensing periodicities configured or indicated by higher layers among the configured $T_{per}$ for periodic traffic and $P_{reserve}$ values of a resource pool. Wherein, the M sensing periodicities can be specified in system specification and/or (pre-)configured and/or updated by RRC signaling and/or MAC CE signaling and/or L1 control signaling; (8) $M_1$ sensing periodicities configured or indicated by higher layers among the configured $T_{per}$ for periodic traffic and the $M_2$ periodicities configured or indicated by higher layers among the provided or configured $P_{reserve}$ values of a resource pool. Wherein, the $M_1$ sensing periodicities and the $M_2$ sensing periodicities can be specified in system specification and/or (pre-)configured and/or updated by RRC signaling and/or MAC CE signaling and/or L1 control signaling; (9) a function of the periodicities of the periodic traffic of the UE and of resource reservation for a resource pool that provides M sensing periodicity values. For example, this function can be based on a subset of periodicities of periodic traffic and the periodicities of resource reservation of a resource pool. Wherein, the M sensing periodicities can be specified in system specification and/or (pre-)configured and/or updated by RRC signaling and/or MAC CE signaling and/or L1 control signaling; (10) a function of the periodicities of the periodic traffic of the UE and of resource reservation for a resource pool that provides $M_1$ sensing periodicities of periodic traffic and $M_2$ sensing periodicities of resource reservation periods of a resource pool. For example, this function can be based on a subset of periodicities of periodic traffic and the periodicities of resource reservation of a resource pool. Wherein, the $M_1$ sensing periodicities and the $M_2$ sensing periodicities can be specified in system specification and/or configured and/or updated by RRC signaling and/or MAC CE signaling and/or L1 control signaling; (11) in the above examples, M can equal the number of periodicities of periodic traffic and the number of periodicities for periodic resource reservation of a resource pool; (12) in the above examples, $M_1$ can equal the number of periodicities of periodic traffic; (13) in the above examples, $M_2$ can equal the number of periodicities for periodic resource reservation of a resource pool; (14) in the above examples, $M_1$ can equal 1; (15) in the above examples, $M_2$ can equal 1; and/or (16) M periodicities as a combination of the periodicity of the traffic and sl-ResourceReservationPeriodList, wherein M can depend on one or more of the following parameters. In some examples, M can consist of a pair of values M1 periodicities of the periodic traffic and M2 periodicities from sl-ResourceReservationPeriodList.

In one example 5.2.3.1, M depends on a maximum number of HARQ re-transmissions.

In another example 5.2.3.2, M depends on a packet delay budget.

In another example 5.2.3.3, M depends on a length of the resource selection/reselection window, i.e., $T_2-T_1$.

In another example 5.2.3.4, M depends on a priority level of SL traffic.

In another example 5.2.3.5, M depends on a CBR.

In another example 5.2.3.6, M depends on a HARQ error rate.

The dependence of M on the one or more parameters can be specified in the system specifications and/or (pre-)configured and/or updated by higher layers for example by configuring a M for each parameter range as illustrated in TABLE 6.

TABLE 6

Example of configuration of M for each parameter range

| Parameter (P) (e.g., Number of HARQ retransmissions, packet delay budget, etc.) Range | M Value |
|---|---|
| P < R1 | $M_0$ |
| R1 ≤ P < R2 | $M_1$ |
| ... | ... |
| R_N ≤ P | $M_N$ |

The $M_i$ periodicities for each parameter range, can be chosen to be a combination of $M1_i$ periodicities of the periodic traffic and the first $M2_1$ periodicities or the last $M2_1$ periodicities in sl-ResourceReservationPeriodList. Alternatively, the list of $M_1$ periodicities for each parameter range can be (pre-)configured and/or updated by higher layers.

In another example 5.2.4, if a UE is transmitting aperiodic traffic, the sensing periodicity is based on the periodicity for resource reservation as given by example 5.2.2.

In one example 5.3, a UE performs sensing across one or more sensing periodicities, i.e., I≥1. Wherein, the sensing periodicity or periodicities is determined by the UE's implementation.

In one example 5.3.1, if the UE is transmitting periodic traffic with one or more periodicities, the UE determines by its implementation the sensing periodicity (or periodicities) from the periodicity (or periodicities) of the periodic traffic (i.e., $T_{per}$).

In another example 5.3.2, if the resource pool is configured with one or more resource reservation periods, $P_{reserve}$, as configured or provided by sl-ResourceReservationPeriodList, or a corresponding parameter for partial sensing, the UE determines by its implementation the sensing periodicity (or periodicities) from the periodicity (or periodicities) for resource reservation of a resource pool (i.e., $P_{reserve}$).

In another example 5.3.3, if a UE is transmitting periodic traffic, the UE determines by its implementation the sensing periodicity (or periodicities) from a combination of the periodicity (or periodicities) $T_{per}$ of the periodic traffic the UE is transmitting, and the periodicity (or periodicities) configured for the resource pool $P_{reserve}$.

In another example 5.3.4, if a UE is transmitting aperiodic traffic, UE determines by its implementation the sensing periodicity (or periodicities) based on the periodicity (or periodicities) of resource reservation as given by example 5.3.2.

In another example 5.3.5, the UE determines by its implementation one or more periodicities I for example 5.3.1, example 5.3.2, example 5.3.3 and example 5.3.4. Wherein I can be specified in system specification and/or (pre-)configured and/or updated by RRC signaling and/or MAC CE signaling and/or L1 control signaling. In a variant example, the UE determines at least I periodicities.

In one example 6, slot n is the slot for resource selection/reselection, e.g., a slot in which the available candidate resources are determined or identified based on resource exclusion based on partial sensing (e.g. periodic based partial sensing) or a slot of resource (re-)selection trigger.

In one example 6.1, slot n is a physical slot number.

In another example 6.2, slot n corresponds to logical slot index $t_n^{SL}$ of a slot that can be in a resource pool.

In another example 6.3, slot n corresponds to logical slot index $t'_n{}^{SL}$ of a slot that is in a resource pool.

In one example 6.4, a UE is provided or determines slot n for resource selection/reselection and a periodicity $T_{per}$ for periodic traffic. The UE determines the slots for resource/reselection for future periods as: for a future period i, wherein i=1, 2, . . . the slot for resource selection/reselection is $n_i$, wherein: $n_i = n + i \times T_{per}$.

A UE can determine periodic sensing occasions for future resource selection/re-selection slots.

In one example 6.4.1, n is a physical slot number and $T_{per}$ is provided or configured in number of physical slots or in a physical duration scaled by the slot duration. Alternatively, $T_{per}$ is provided in a different time unit and is converted to physical slots.

In another example 6.4.2, n corresponds to a logical slot $t_n^{SL}$ that can be in a resource pool. If n is provided as a physical slot that is not in the slots that can be in a resource pool, the logical slot is the next (or pervious) slot after (or before) slot n that can be in a resource pool. $T'_{per}$ is the duration in logical slots that can be in a resource pool. $T'_{per}$ is provided or configured in logical slots that can be in a resource pool, or is provided or configured in a different time unit and is converted to logical slots that can be in a resource pool.

In another example 6.4.3, n corresponds to a logical slot $t_n^{SL}$ that is within a resource pool. If n is provided as a physical slot (or a logical slot that can be in a resource pool) and that is not in the slots that are within the resource pool, the logical slot is the next (or pervious) slot after (or before) slot n that is within the resource pool. $T'_{per}$ is the duration in logical slots that is within a resource pool. $T'_{per}$ is provided or configured in logical slots that is within a resource pool, or is provided or configured in a different time unit and is converted to logical slots that is within a resource pool.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE), comprising:
a transceiver configured to transmit, on a sidelink (SL) interface, traffic with a periodicity; and
a processor operably coupled to the transceiver, the processor configured to:
operate in a transmit (TX) resource pool with a parameter sl-MultiReserveResource set to enabled;
perform at least partial sensing including to:
determine a resource selection window,
select Y slots $\{t'_y{}^{SL}\}$ within the resource selection window, wherein y=0 . . . Y−1, and
for each slot $t'_y{}^{SL}$, sense a set of slots, $\{t'_{y-K_i \times T'_i}{}^{SL}\}$, wherein:
$T'_i$ is a periodicity of sensing from a set of sensing periodicities $\{T'_1, T'_2, \ldots, T'_I\}$,
I is a number of sensing periodicities and I≥1, and
$K_i$ is a set of periodic sensing occasions that are sensed $\{k_{i,0}, k_{i,1}, \ldots\}$ and is associated with a sensing periodicity $T'_i$, and
determine candidate resources available in the resource selection window after resource exclusion based on the at least partial sensing, and
perform resource selection within the available candidate resources.

2. The UE of claim 1 wherein:
the TX resource pool is configured with one or more resource reservation periods, $P_{reserve}$, provided by a parameter sl-ResourceReservationPeriodList, and
the I sensing periodicities are selected from among the configured $P_{reserve}$ resource reservation periods of the TX resource pool.

3. The UE of claim 1 wherein the set of periodic sensing occasions that are sensed is the same across the set of sensing periodicities, $K_1 = K_2 = \ldots = K_I = K$, $K = \{k_0, k_1, \ldots\}$.

4. The UE of claim 1, wherein one of the set of sensing periodicities is a periodicity of the SL traffic.

5. The UE of claim 1, wherein the processor is further configured to:
trigger SL resource selection in a slot n,
determine an earliest sensing time, $T_{sense}$, and
sense no earlier than $T_{sense}$ before the slot n.

6. The UE of claim 1, wherein:
an earliest of the Y selected slots is $t'_{y0}{}^{SL}$,
the processor is further configured to determine the candidate resources in a slot n, and
the slot n is a resource selection processing time, $t_{proc,1}{}^{SL}$, before $t'_{y0}{}^{SL}$.

7. The UE of claim 1, wherein:
the processor is further configured to determine the candidate resources in a slot n, and
a latest periodic sensing occasion is earlier than a sensing processing latency time, $t_{proc,0}{}^{SL}$, before the slot n.

8. The UE of claim 1, wherein the number of sensing periodicities I used for sensing is based on a channel busy ratio (CBR).

9. The UE of claim 1, wherein:
the TX resource pool is further configured with at least random resource selection and is configured with a priority threshold,
for SL traffic with priority values less than or equal to the priority threshold, random resource selection and other sensing methods are allowed, and
otherwise, only the other sensing methods are allowed.

10. The UE of claim 1, wherein:

the TX resource pool is configured with a set of SL resources and a priority threshold, within the set of configured SL resources, for SL traffic with priority values less than or equal to the priority threshold, at least random resource selection is allowed, and outside the set of configured SL resources, for SL traffic with priority values greater than the priority threshold, at least random resource selection is allowed.

11. A method of operating a user equipment (UE), the method comprising:

transmitting, on a sidelink (SL) interface, traffic with a periodicity;

operating in a transmit (TX) resource pool with a parameter sl-MultiReserveResource set to enabled;

performing at least partial sensing including:
  determining a resource selection window,
  selecting Y slots $\{t'^{SL}_y\}$ within the resource selection window, wherein y=0 ... Y−1, and
  for each slot $t'^{SL}_y$, sensing a set of slots, $\{t'^{SL}_{y-K_i \times T'_i}\}$, wherein;
    $T'_i$ is a periodicity of sensing from a set of sensing periodicities $\{T'_1, T'_2, \ldots T'_I\}$,
    I is a number of sending periodicities and I≥1, and
    $K_i$ is a set of periodic sensing occasions that are sensed $\{k_{i,0}, k_{i,1}, \ldots\}$ and is associated with a sensing periodicity $T'_i$;

determining candidate resources available in the resource selection window after resource exclusion based on the at least partial sensing; and performing resource selection within the available candidate resources.

12. The method of claim 11 wherein, the TX resource pool is configured with one or more resource reservation periods, $P_{reserve}$, provided by a parameter sl-ResourceReservationPeriodList, and the I sensing periodicities are selected from among the configured $P_{reserve}$ resource reservation periods of the TX resource pool.

13. The method of claim 11 wherein the set of periodic sensing occasions that are sensed is the same across the set of sensing periodicities, $K_1=K_2=\ldots=K_I=K$, $K=\{k_0, k_1, \ldots\}$.

14. The method of claim 11, wherein one of the set of sensing periodicities is a periodicity of the SL traffic.

15. The method of claim 11, further comprising:

triggering SL resource selection in a slot n, determining an earliest sensing time, $T_{sense}$, and sensing no earlier than $T_{sense}$ before the slot n.

16. The method of claim 11, wherein:

an earliest of the Y selected slots is $t'^{SL}_{y0}$, the method further comprises determining the candidate resources in a slot n, and the slot n is a resource selection processing time, $t^{SL}_{proc,1}$, before $t'^{SL}_{y0}$.

17. The method of claim 11, further comprising:

determining the candidate resources in a slot n, wherein a latest periodic sensing occasion is a sensing processing latency time, $t^{SL}_{proc,0}$, before the slot n.

18. The method of claim 11, wherein the number of sensing periodicities I used for sensing is based on a channel busy ratio (CBR).

19. The method of claim 11, wherein:

the TX resource pool is further configured with at least random resource selection and is configured with a priority threshold, for SL traffic with priority values less than or equal to the priority threshold, random resource selection and other sensing methods are allowed, and otherwise, only the other sensing methods are allowed.

20. The method of claim 11, wherein:

the TX resource pool is configured with a set of SL resources and a priority threshold, within the set of configured SL resources, for SL traffic with priority values less than or equal to the priority threshold, at least random resource selection is allowed, and outside the set of configured SL resources, for SL traffic with priority values greater than the priority threshold, at least random resource selection is allowed.

* * * * *